(12) United States Patent
Dent

(10) Patent No.: US 8,497,743 B2
(45) Date of Patent: Jul. 30, 2013

(54) PASSIVE FOURIER TRANSFORM CIRCUITS AND BUTLER MATRICES

(75) Inventor: Paul Wilkinson Dent, Pittsboro, NC (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1617 days.

(21) Appl. No.: 11/963,884

(22) Filed: Dec. 24, 2007

(65) Prior Publication Data

US 2009/0160576 A1 Jun. 25, 2009

(51) Int. Cl.
*H03H 7/00* (2006.01)
*H01P 1/00* (2006.01)

(52) U.S. Cl.
USPC ........................... 333/24 R; 333/24 C

(58) Field of Classification Search
USPC .................. 333/117, 24 R, 24 C; 455/73, 78, 455/91, 103, 130, 132; 708/404, 405
See application file for complete search history.

(56) References Cited

U.S. PATENT DOCUMENTS

| 5,777,579 A | 7/1998 | Goetz et al. |
| 5,831,977 A * | 11/1998 | Dent ............................ 370/335 |
| 6,202,148 B1 * | 3/2001 | McCanny et al. ................. 713/1 |
| 6,411,653 B1 * | 6/2002 | Arunachalam et al. ....... 375/260 |
| 2004/0140862 A1* | 7/2004 | Brown et al. ................. 333/117 |
| 2004/0259497 A1* | 12/2004 | Dent ............................ 455/13.3 |

FOREIGN PATENT DOCUMENTS

| EP | 0056205 A1 | 7/1982 |
| WO | 2004/021593 A1 | 3/2004 |

* cited by examiner

*Primary Examiner* — Dean O Takaoka
*Assistant Examiner* — Alan Wong
(74) *Attorney, Agent, or Firm* — Coats & Bennett, P.L.L.C.

(57) ABSTRACT

The coupling circuit described herein comprises passive analog components for coupling a transceiver to an antenna, such as an antenna array. The coupling circuit transforms an input signal into an appropriate format for each element of the antenna array. The coupling circuit comprises a coupling network having a plurality of inputs and a plurality of outputs. The inputs provide quadriphase versions of at least one input signal. In one embodiment, the coupling circuit performs a Discrete Fourier Transform (DFT) on the input signal. In another embodiment, the coupling circuit performs a Fast Fourier Transform (FFT) on the input signal. In still another embodiment, the FFT performed by the coupling circuit implements a Butler matrix.

24 Claims, 36 Drawing Sheets

$Z1=(Qo-Q2)-(I1-I3)$
$Z2=(Qo-Q2)+(I1-I3)$
$Z3=(Io-I2)-(Q1-Q3)$
$Z4=(Io-I2)+(Q1-Q3)$

US 8,497,743 B2

PASSIVE FOURIER TRANSFORM CIRCUITS AND BUTLER MATRICES

BACKGROUND OF THE INVENTION

The present invention generally relates to the field of radio frequency circuits, filters, antenna beamforming, mobile communications network stations, and satellites, and more particularly relates to analog implementations of circuits that couple transceivers to antennas.

Orthogonal Frequency Division Multiplex (OFDM) and Orthogonal Frequency Division Multiple Access (OFDMA) are digital data communications techniques that originated before the 1970's as a method of transmitting data over HF Ionosphere radio paths and are enjoying a new resurgence in connection with possible future public wireless communications systems.

Early OFDM system were known variously as multi-tone modems or Kineplex, and divided a data stream for transmission into perhaps 32 low data rate streams, which were each modulated onto one of 32 orthogonally spaced subcarriers. The generation of 32 modulated carriers was carried out by applying 32 symbol-representative signal values to the inputs of a 32-point Discrete Fourier Transform circuit, likely implemented as a Fast Fourier Transform, and the 32 output values of the Fourier Transform, when transmitted sequentially in time, form the desired 32-tone signal. In these early implementations, even an FFT of size 32 was a significant digital signal processing computational burden, because of the embryo state of digital integrated circuits. Today, the proposed sizes of FFT for future OFDM systems is of the order of 1024-4096, and while modern digital signal processors have advanced significantly in speed and performance, the frequency with which FFTs of this size must be performed, such as every 63.5 microseconds in one proposal, is still a burden for a small, battery-powered device such as a cellphone. The solution is likely to be a custom chip design block that efficiently implements all or key operations of an FFT. Current thinking is that such an implementation would be exclusively in digital logic for carrying out numerical arithmetic. However, future products could benefit from other solutions to render the need to perform large Fourier Transforms frequently less burdensome in cost and power consumption. Therefore, analog and passive circuits are shown herein to offer such advantages.

It was also known in the prior art that a passive radio frequency circuit could be constructed with N input ports and N output ports, such that the RF signal into input port (k) divided between the output ports with phase shifts 0, $2\pi k/N$, $2(2\pi k/N)$, ..., $(N-1)((2\pi k/N)$. The network therefore has the N×N port transfer function of a Fourier matrix. A passive RF network of hybrids and couplers realizing such a network is known as a Butler Matrix, and is often used in connection with antenna beamforming. The prior art Butler matrix was generally constructed with N a power of two, and the resulting structure resembles the flow diagram of a base-2 Fast Fourier Transform. RF Butler matrices operate within a limited bandwidth around a carrier frequency and do not work at baseband, e.g., down to zero frequency.

SUMMARY

The present invention provides a coupling circuit comprising passive analog components for coupling a transceiver to an antenna, such as an antenna array. The coupling circuit transforms an input signal into an appropriate format for each element of the antenna array. In one embodiment, the coupling circuit performs a Discrete Fourier Transform (DFT) on the input signal. In another embodiment, the coupling circuit performs a Fast Fourier Transform (FFT) on the input signal. In still another embodiment, the FFT performed by the coupling circuit implements a Butler matrix.

In one exemplary embodiment, the coupling circuit comprises a coupling network having a plurality of inputs and a plurality of outputs. The inputs provide quadriphase versions of at least one input signal. The quadriphase versions include positive (non-phase-inverted) and negative (phase-inverted) In-phase (I) or real signals, respectively designated as I+ and I−, and positive and negative Quadrature (Q) signals, respectively designated as Q+ and Q−. In one embodiment, the input signals may comprise the quadriphase input signals. In another embodiment, the coupling circuit may generate the quadriphase versions of the input signal at each input. The outputs of the coupling network are coupled to one or more of the I+, I−, Q+, and Q− signals such that a desired phase shift is produced between each input and output and such that the frequency response between any input and output is substantially identical except for the desired phase shift. The amount of coupling between the I+ and/or I− signals and a given output is proportional to the cosine of the desired phase shift. The amount of coupling between the Q+ and/or Q− signals and a given output is proportional to the sine of the desired phase shift. The couplings between the inputs and the outputs may be achieved via capacitive couplings, quarter-wave line couplings, acoustic wave couplings, or any other passive circuit. In one embodiment, the couplings between different inputs and the same output are orthogonal to prevent the signal from reflecting from any one output back to any of the inputs.

In one embodiment, the coupling circuit performs an FFT decomposition of the DFT. The coupling circuit according to this embodiment comprises a plurality of stages connected in cascade, where each stage comprises at least one coupling network. Each stage has some fraction of the total number of inputs and outputs for the coupling circuit. For example, when N represents the number of inputs and outputs for the DFT, where N is equivalent to N1·N2, the FFT decomposition may be achieved by interconnecting a first stage of N2 coupling networks that implement N1-point DFTs in cascade with a second stage of N1 coupling networks that implement N2-point DFTs. When necessary, the interconnection between the stages may include phase twiddling circuitry to rotate the phase a stage's output signals by some desired amount.

FFT decomposition reduces the number of arithmetic operations in a digital algorithm, and therefore the complexity. Thus, by analogy, FFT decomposition may be used to reduce the number of analog components used to implement the coupling circuit for an analog DFT. For example, when N=256 and N1=N2=16, the number of passive components required to implement the coupling circuit reduces from 521,208 components for the N-point DFT coupling circuit to 59,136 components for the FFT decomposition of the coupling circuit (not including any components required for phase twiddling), which provides significant component savings.

When the inventive coupling circuit described herein performs a DFT or an FFT decomposition, another embodiment may select the couplings between the inputs and outputs of the coupling circuit to implement a Butler matrix. Unlike conventional Butler matrices, which are limited to N inputs and N outputs where N is a factor of 2, the Butler matrix produced using the inventive coupling circuit may have any number of inputs and outputs, even those that are not factors of two, including a prime number of inputs and outputs.

According to another exemplary embodiment, the coupling circuit described herein may combine a transceiver bandpass filtering function with a Butler matrix operation. In so doing, this embodiment eliminates the need for both a Butler matrix circuit and a filter circuit between a transceiver and an antenna, which reduces throughput losses between the transceiver and antenna. For this embodiment, a resonator circuit is connected to each of multiple ones of the inputs and outputs. Each resonator circuit comprise a shunt inductor, a series inductor, an inductor-capacitor combination, a coaxial resonator, and/or a surface acoustic wave resonator. Each resonator circuit is configured to adapt the frequency response of the coupling circuit such that the coupling circuit has a bandpass frequency response comprising a desired bandwidth around a desired center frequency.

The coupling circuit described herein enables the use of passive, lossless analog components to implement complex Fourier transform operations. The inputs to the coupling circuit may have balanced or unbalanced quadriphase input signals. Further, the coupling circuit may have any number of inputs and outputs include a prime number of inputs and outputs.

DETAILED DESCRIPTION

Figure 1:
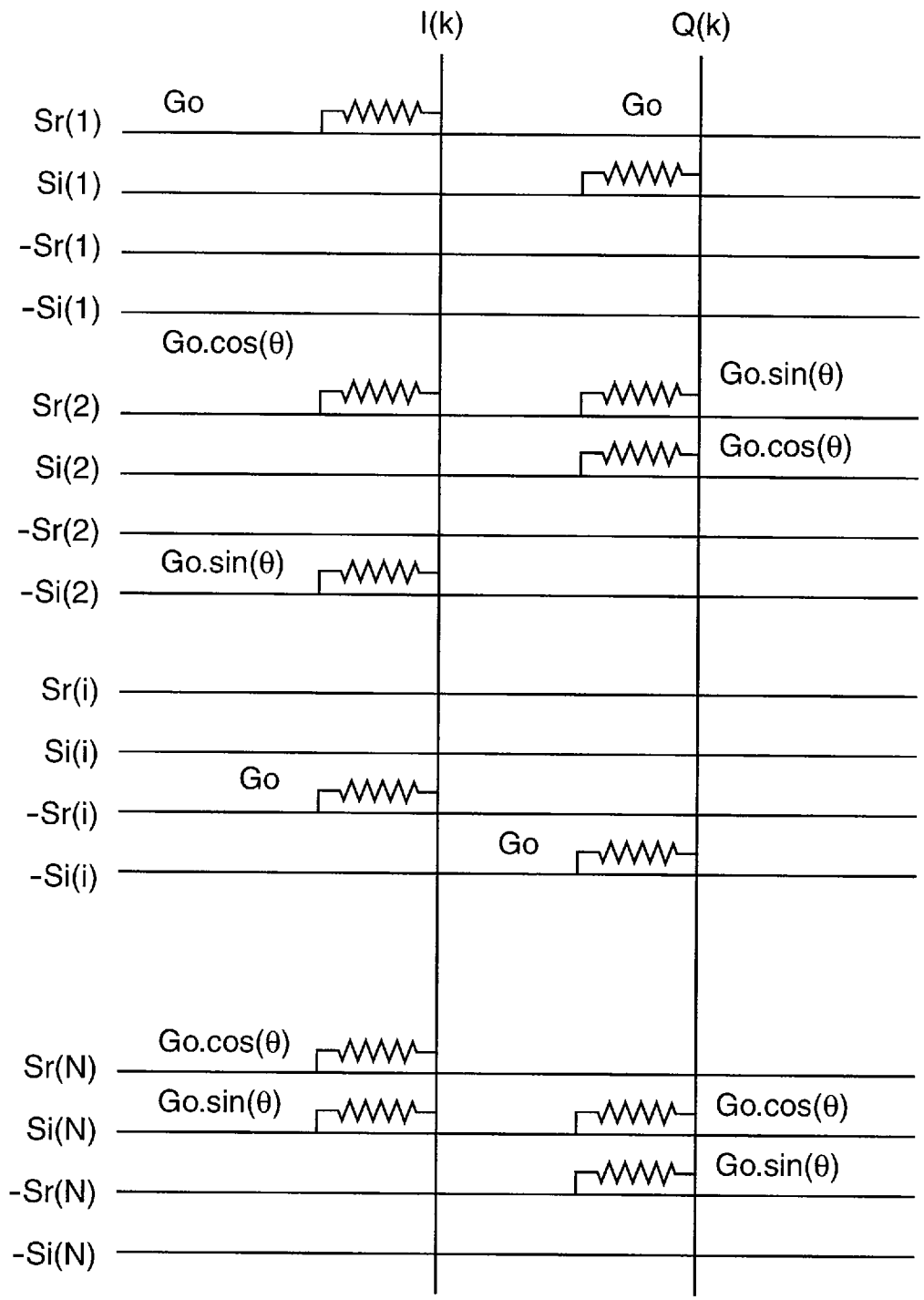
FIG. 1 shows an exemplary resistor-based DFT.

A coupling circuit according to the present invention comprises passive analog components for coupling a transceiver to an antenna, such as an antenna array. The coupling circuit transforms an input signal into an appropriate format for each element of the antenna array to perform a Discrete Fourier Transform (DFT) on the input signal, a Fast Fourier Transform (FFT) on the input signal, and/or to implement a Butler matrix.

The coupling circuit comprises a coupling network having a plurality of inputs and a plurality of outputs, where the inputs provide quadriphase versions of at least one input signal. The quadriphase versions include positive (non-phase-inverted) and negative (phase-inverted) In-phase (I) or real signals, respectively designated as I+ and I−, and positive and negative Quadrature (Q) signals, respectively designated as Q+ and Q−. The outputs of the coupling network are coupled to one or more of the I+, I−, Q+, and Q− signals such that a desired phase shift is produced between each input and output and such that the frequency response between any input and output is substantially identical except for the desired phase shift. The amount of coupling between the I+ and/or I− signals and a given output is proportional to the cosine of the desired phase shift. The amount of coupling between the Q+ and/or Q− signals and a given output is proportional to the sine of the desired phase shift.

Implementation of the DFT using Passive Components.

A Discrete Fourier Transform (DFT) is the formation of N differently weighted combinations of N input signals or values. The N input values and the N output values are in general complex, as are the weights. The weights for forming the $k^{th}$ combination are given by:

$$1 w^k w^{2k} w^{3k} \ldots w^{(N-1)k}, \quad (1)$$

where $$w = \cos(2\pi/N) + j \sin(2\pi/N) = e^{j2\pi/N}. \quad (2)$$

The choice of the above value for w results in all the combinations being orthogonal, permits a "Fast" algorithm for the computation of all combinations, and results in the Transform being its own inverse simply by replacing w with its complex conjugate:

$$w^* = \cos(2\pi/N) - j\sin(2\pi/N) = e^{-j2\pi/N}. \quad (3)$$

The DFT may also be written as a matrix multiplication according to:

$$(C) = [W](S), \quad (4)$$

where S represents the vector of N input signals or values, C represents the vector of N output combinations, and W represents the N×N matrix of weights where the element in column(i) and row(j) is given by:

$$w^{(i-1)(j-1)}, \quad (5)$$

where indices i and j range from 1 to N. The transform may also be written as:

$$C(k) = \sum_{i=0}^{i=N-1} W^{ik} S(i) \quad (6)$$

when the indices i and k range from 0 to N−1.

To represent complex numbers in electronic circuits, two values or signals are used. In numerical computers, these are the Real and Imaginary parts which are stored in associated memory elements, while in analog circuits the Real and Imaginary parts are usually termed I and Q signals respectively, for "In-Phase" and "Quadrature". It is common to create modulated radio signals by generating I and Q modulation signals, modulating the I signal on to a cosine wave at the desired radio carrier frequency, modulating the Q signal on to a sine wave at the same radio carrier frequency, and adding the modulated cosine and modulated sine waves to obtain the desired modulated signal. The I signal may represent a first stream of binary data bits and the Q signal may represent a second stream of binary data bits, so that at each instant the radio wave is carrying two bits of information, one bit on the cosine wave and one bit on the sine wave. This Quadrature Phase Shift Keying modulation is in common use. Other more complex modulations such as 16-QAM carry two bits on each of the I and Q signals by using four signal levels on each to represent respectively 00, 01, 11, and 10. Assigning adjacent levels to bit pairs differing only by one bit is called Grey coding, and reduces the probability of bit errors.

Each column of the DFT matrix W may be regarded as a sequence of samples of a cosine and a sine wave superimposed, and since the column multiplied by one of the input values S(i), W may be regarded as a modulation matrix that modulates a carrier frequency with an input symbol-representative value S(i). Different columns multiply other symbols with different carrier frequencies. Thus the DFT performs simultaneous modulation of a set of symbols S on to respective carrier frequencies. In OFDM systems, a DFT is therefore performed for every symbol set presented for transmission. Reception comprises receiving the sequentially transmitted signal samples C which are output from the DFT, and when a complete set of N is available, performing the inverse DFT to reproduce the set of symbols.

While numerical transforms may be as accurate as necessary by selecting the word length of the processor to be sufficiently long, extreme accuracy is not required for OFDM. Inaccuracies in the DFT will typically have little to no effect on the transmitted spectrum, and will result in the inverse DFT at the receiver incompletely separating the symbols, so that a little inter-symbol coupling across the symbol set will result. However, this is also caused by signal fading during the transmission of the C's, which effectively also corrupts the weights given to each C value. Thus there is no point in the DFT being substantially more ideal than the transmission medium. If such inter-symbol coupling is a problem, the OFDM system will already have considered means to mitigate the problem, such as estimating the coupling with the aid of known symbols and compensating for it. Since the coupling introduced by an imperfect DFT is constant for a long time, while signal fading is variable, it is substantially easier to compensate, if indeed any compensation is necessary. Thus, the possibility exists to construct a DFT circuit for OFDM purposes using components of finite tolerance, such as transistors, resistors, capacitors, and suchlike. In fact, a DFT may be constructed using entirely passive components such as resistors. Such a passive component DFT circuit operates as an extremely fast parallel transform, and consumes no power other than the power of the input signal that is propagated through the circuit.

FIG. 1 shows a resistor circuit that forms one of the desired combinations C(k) of N input values S(i). Input signals are represented as balanced quadriphase signals (Sr,−Sr) for the real part and (Si,−Si) for the imaginary part on a total of four wires each. Alternatively, the quadriphase signals may be denoted by (I+, I−) for the real part and (Q+, Q−) for the imaginary part. Balanced signals facilitate implementing negative weights when required by simply reversing connections between Sr and −Sr or Si and −Si, so that all weights may be implemented by positive component values. FIG. 1 shows forming one output combination $$C(k) = \{I(k), Q(k)\} \quad (7)$$

by weighted combination of the N input signals.

The weight applied to S(1) is unity for all outputs in the case of the standard Fourier matrix. Other variations exist in which the weight would not be unity, for example, in the case of a half-channel offset Fourier Matrix. A reference resistance value Ro, conductance value Go=1/Ro is chosen to represent unity and connected from the real signal input line Sr(1) to the real combination output line I(k), and also from the imaginary input signal line Si(1) to the imaginary combination output line Q(k). The weight applied to input signal S(2) is cos(θ)+jsin(θ), which results in I(k) collecting an amount:

$$Go \cdot \cos(\theta) \cdot Sr(2) - jGo \cdot \sin(\theta) \cdot Si(2), \quad (8)$$

and Q(k) collects an amount Go·cos(θ)·Si(2)+jGo·sin(θ)·Sr(2), $$Go \cdot \cos(\theta) \cdot Si(2) - jGo \cdot \sin(\theta) \cdot Sr(2), \quad (9)$$

where θ=2πk/N. The above equations thus give the conductance values. For I(k), the resistor connects to the −Si(2) line to realize the negative coefficient. If desired, signals −I(k) and −Q(k) may also be formed by a second set of resistors connected to the reverse polarities of Sr and Si as the first set of resistors, if it is desired to retain the balanced signal configuration at the output.

Different Fourier transform components generated by the above means do not all have the same scaling. The scaling for the first Fourier component with N real weights of 1, 1, 1, . . . , 1 will be 1/N, as expected. However, the scaling for the second Fourier component with weights 1, cos(θ), cos(2θ), . . . , cos((N−1)θ) from the real inputs to the real output, weights of 0, sin(θ), sin(2θ), . . . , sin((N−1)θ) from the imaginary inputs to the real output, and the same weights from the imaginary to imaginary and from the real to imaginary except for a sign change of the sine weights is not 1/N, but rather $1/\{\Sigma|\cos(k\theta)|+|\sin(k\theta)|\}$, which tends to π/4N when N is large. Other Fourier components have similar scalings, the component with the scaling deviating most from 1/N being the component corresponding to weights such as 1, $(1+j)/\sqrt{2}$, j, $(-1+j)/\sqrt{2}$, ..., which is $2(\sqrt{2}-1)/N$.

Figure 2:
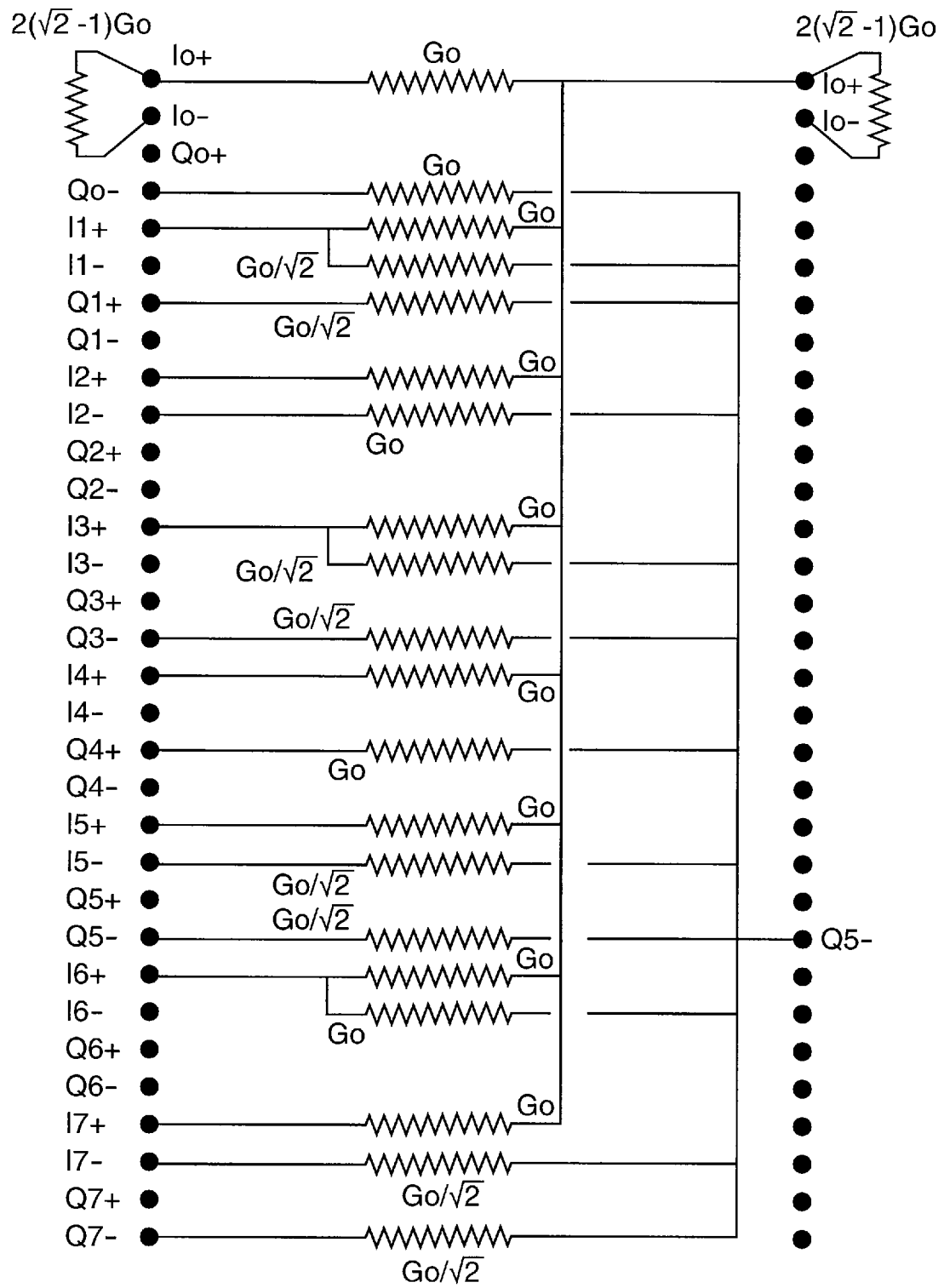
FIG. 2 shows a shunt scaling resistor circuit for an 8-point transform.

If, as is usual, it is desired that all Fourier components be formed with the same scaling, then larger components are attenuated to produce the same scaling as the smallest. This may be done by adding an appropriate shunt resistor between the + and − outputs, which has the effect of also making the output impedances the same for all outputs. To preserve input output symmetry/reversibility, the same value of shunt resistor may be added between the corresponding + and − inputs. This is shown for an 8 point transform in FIG. 2. In FIG. 2, only the resistors for forming output components Io and Q5− are shown for clarity. There are only two scalings in the case of the 8-point transform, and FIG. 2 illustrates one of each. I5+, I5−, Q5+, Q5− have the smallest scaling, so are not adjusted. Io+, Io−, Qo+, and Qo− are scaled by a lesser factor, and therefore need a shunt resistor to effect a further scaling by the factor $2(\sqrt{2}-1)$. The shunt resistor is simply calculated to make the impedance between terminals Io+, Io− at either input or output the same as the impedance between terminals Q5+, Q5− and equal to $2/(N \cdot Go)$. In the case of the 8-point DFT circuit of FIG. 2, the shunt resistor is placed at even numbered ports (which only have single coupling resistors from input to output) to equalize the impedance and scaling with odd-numbered ports, which each have two coupling resistors from input to output. In general, a $2^2$-point DFT only needs single coupling resistors from input to output for ports 0, N/4, N/2 and 3N/4 due to the corresponding Fourier coefficients being either purely real (+1 or −1) or purely imaginary (+j or −j). All other ports use two coupling resistors as the corresponding Fourier coefficients are complex (cos+jsin) and have a real and an imaginary part.

The scaling described above is only used when the Fourier Transformer is regarded as operating as a voltage-in, voltage-out device or a current-in, current-out device. If it is regarded as a voltage-in, current-out device or vice versa, no scaling is used as the transconductance determined only by the input to output coupling resistors already exhibits equal scaling.

There are two practical issues with the DFT realization of FIG. 1 for large transforms:

The number of resistors is approximately 2N−4 for each output signal line, a total of about 64 million for a 2048-point transform with four output lines per combination to preserve the balanced signal format.

The ratio of maximum to minimum resistor values is approximately equal to N, or 2048 for a 2048-point transform. This may hinder construction of all resistors using the same technology, which in turn hinders accurate matching of values to the correct ratios. The latter problem may be solved by using ladder networks as disclosed in U.S. Pat. No. 6,429,798 to Applicant, which is hereby incorporated by reference herein. A ladder network produces increasing attenuation of a signal inserted at a point along the ladder as the signal propagates through the ladder. As the attenuation can only increase, the desired weightings are sorted in order of magnitude in order to design the ladder. The input signals +Sr(i), −Sr(i), +Si(i), or −Si(i) are then inserted at a point in the ladder giving the desired weighting via a crisscross wiring scheme that sorts in order of weight magnitude. Because some weighting coefficients are the same for one or more input S-values, they may be connected to the same ladder point, and the number of ladder sections reduced accordingly. Unfortunately, using ladder networks does not reduce the number of resistors. However, ladder networks do allow all resistors to be made in the same technology. If a suitable analysis program is available to calculate the characteristics of distributed sheets of resistive material, a distributed rather than discrete resistor solution may alternatively be used, as suggested in U.S. Pat. No. 5,594,941 to Applicant for antenna beamforming networks, which is hereby incorporated by reference herein.

The first problem may be alleviated by using FFT decompositions of the DFT circuit, which are described more fully below. FFT decomposition of digital DFTs are used to reduce the number of arithmetic operations. The use of FFT decompositions for analog DFT circuits reduces the number of components correspondingly. Before discussing refinements to the passive DFT circuit, the potential application to OFDM transmitters and receivers will be explained with the aid of FIGS. 3 and 4.

Figure 3:
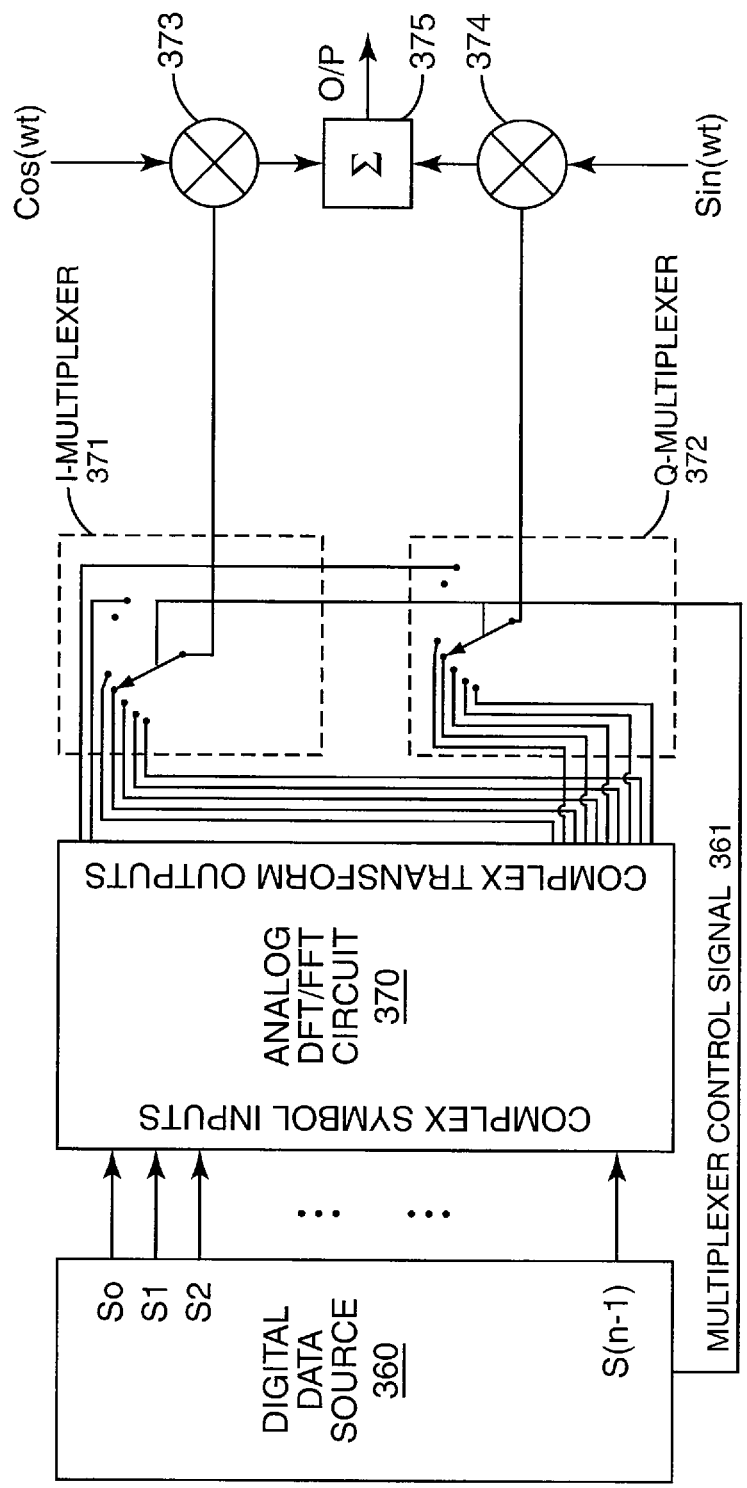
FIG. 3 shows an exemplary analog DFT/FFT circuit for an OFDM transmitter.

FIG. 3 illustrates an OFDM transmitter using analog DFT circuit 370. A digital circuit 360 is the source of digital data symbols for transmission. Digital data source 360 may include any combination of source encoders, such as voice encoders, picture encoders or cameras, net browsers or e-mail programs, error detection and correction encoders, interleaving, and mapping of bits to multi-bit symbols represented by complex numbers in the modulation plane. The complex symbol representations So, S1, S2, ..., S(n−1) are then presented in parallel to the n-complex-input DFT circuit 370. The DFT circuit may be constructed as a direct DFT or may be decomposed internally according to the FFT principle into a cascade of smaller DFTs. An analog DFT circuit operates extremely rapidly in any event to output signals which are the Fourier Transform of the inputs. Therefore, almost immediately, e.g., within 1 microsecond, after presentation of the complex symbols So ... S(n−1) to the inputs, the Fourier Transform values are available at the output. The output values are also complex, and the real signal parts are connected to real or In-phase multiplexer 371, while the imaginary or Quadrature signal parts are connected to Q-multiplexer 372. The multiplexers 371, 372 are clocked in unison by multiplexer control signal 361 to sequentially output the n complex signal values to quadrature modulator (373, 374, 365). Quadrature modulators are well known in the art and modulate a cosine carrier wave cos(wt) with the real or I-signal and a sine carrier wave sin(wt) with the imaginary or O-signal to create a modulated carrier at frequency w. For example, quadrature modulators that operate with balanced signals are disclosed in U.S. Pat. No. 5,530,722 entitled "Quadrature Modulators with Integrated Distributed I,Q Filters," 5,867,537 entitled "Balanced Transversal I,Q Filters for Quadrature Modulators," and U.S. Pat. No. 6,768,391 entitled "Class-B Biased Gilbert Cells and Quadrature Modulators" to current Applicant et al. The above patents are hereby incorporated by reference herein.

Because many of the analog DFT circuits described herein are based on balanced (e.g., push-pull) signal paths, balanced signals may be obtained at the output of analog DFT circuit 370 and the balanced signal structure maintained through multiplexers 371,372, pre-modulation filters, and quadrature modulator (373, 374, 375). The pre-modulation filters are not shown, but are disclosed to be integrable with balanced quadrature modulators in the above-incorporated references. To relax the cut-off requirements of the pre-modulation filters, it is useful to oversample the signal to be transmitted by a factor of perhaps two. This may be done by over-dimensioning the Fourier Transform circuit 370 to have more inputs and outputs than the n symbols. For example, the number of inputs and outputs may be the nearest power of two to 2n, and the additional inputs not fed with symbols are fed with zero signal values. For example, in the case of balanced inputs, a symbol input comprises Si and −Si, while a supernumeray input would have both the + and − input connected to a reference potential, preferably half way between a symbol value and its inverse.

Figure 4:
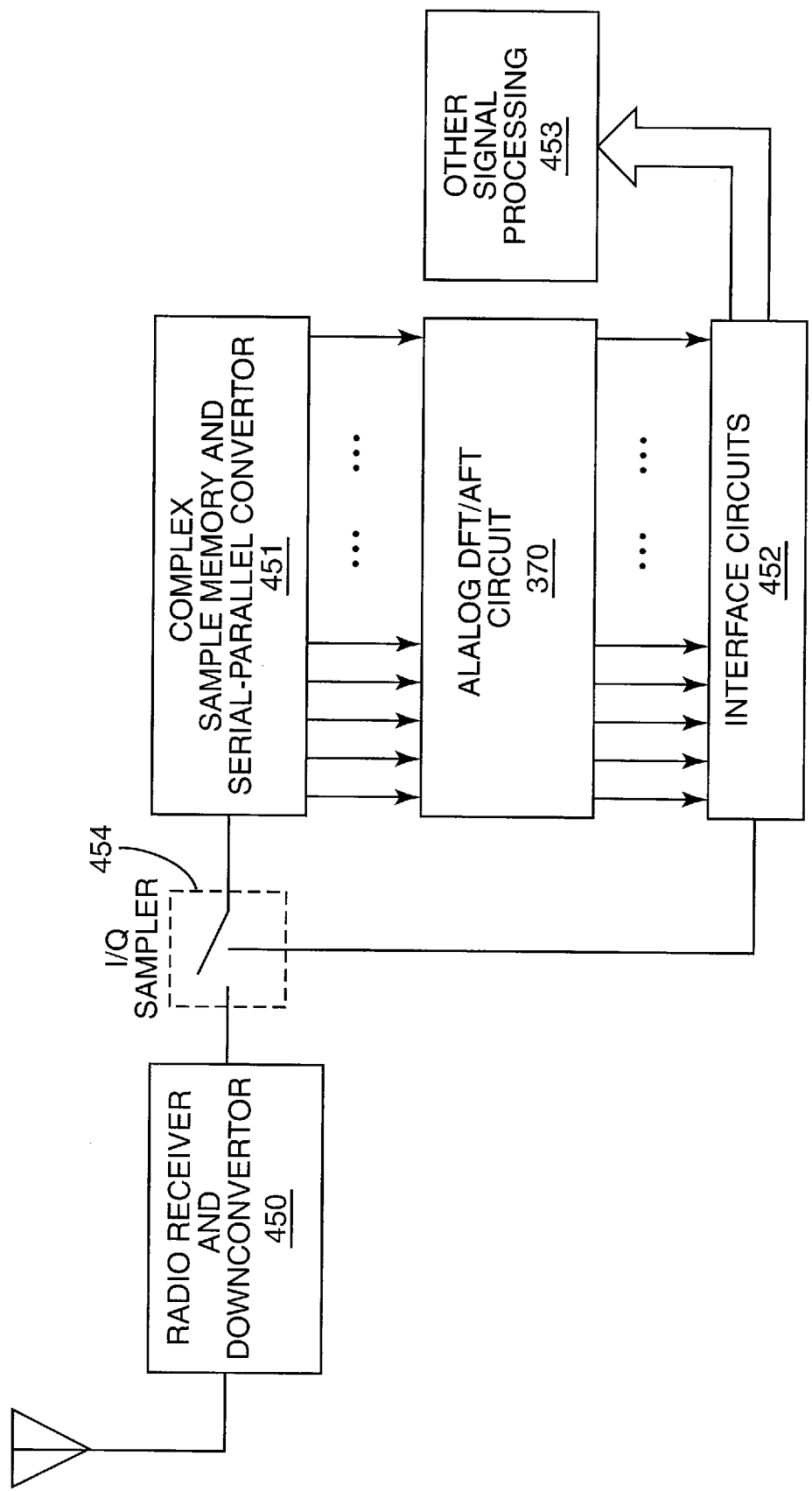
FIG. 4 shows an exemplary analog DFT circuit for an OFDM receiver.

FIG. 4 illustrates the same analog DFT circuit used in reverse for reception and decoding of DFT signals. The received signal is downconverted and resolved into its Inphase and Quadrature components by downconvertor 450, which may be a homodyne receiver front-end. Complex signal samples are assembled into a block in sample memory 451 for presentation in parallel to analog DFT circuit 370. While the memory could be an analog memory using capacitor sample and hold circuits, a more advantageous solution is to employ high-clock-rate sigma-delta (or delta) modulation to Analog-to-Digital (AtoD) convert the input I and Q signals. The sigma-delta modulation output bit stream is delayed in a long shift register which is tapped at intervals of one sample. This would be every L bits if the sigma-delta modulator used a factor of L oversampling. In this case, analog DFT circuit 370 performs a fully parallel transform for every bit-shift, and the n desired symbol outputs of the DFT circuit may be integrated over a symbol period to produce analog versions of the output symbols (soft symbol outputs). These may be further AtoD converted for digital processing in error-correction decoding circuits for example, using copy of the pre-transform AtoD circuits, or may be left in analog form for processing by an analog error correction decoding circuit. Alternatively, digital samples may be presented in word-serial form to the transform circuit, least significant bits first. The outputs of the transform circuit for bits of successively higher significance then have to be combined with increasing powers of two scaling. The latter operation may be accomplished by using the principle disclosed in U.S. patent application Ser. No. 11/612,551 to Applicant, entitled "Simple, Fast, High Resolution, Fixed Point, Floating Point or Logarithmic DtoA Converter" and filed 19 Dec. 2006, which is hereby incorporated by reference herein. The outputs of the transform circuit are loaded with a capacitor to create a time constant such that earlier outputs decay by a factor of two per bit period. After clocking in the most significant bit, the capacitor voltages are then sampled and held for further processing, which may involve converting them to digital form using a copy of the pre-transform AtoD circuit for each voltage in turn, or alternatively, using several instances of a slower AtoD circuit operating simultaneously. For example, a very simple AtoD circuit comprises a transistor switch operated by a counter to remove charge from the above-mentioned capacitors until they are discharged, and counting the number of cycles. Such a device may be satisfactory when, as here, 8 bits accuracy is likely to be sufficient.

In the transmitter circuit of FIG. 3, it may be of interest to employ analog DFT/FFT circuits that are not entirely passive in order to reduce the signal attenuation through the various stages of smaller DFTs and twiddling circuits into which a large DFT would be decomposed. For example, emitter followers or source followers may be employed between stages to reduce the loading effect of one stage on its predecessor. In that case, variations in scaling do not need to be compensated by a shunt resistor at an input or output; instead, the varying scaling of different intermediate outputs is taken into account when calculating the coupling admittance from each intermediate output to the intermediate output of the next stage. An analog Fourier Transform circuit according to this concept therefore comprises:

a set of input terminal pairs for signals and their phase inverses;

a set of coupling components that couple one of each input terminal pair to one terminal of an intermediate output terminal pair, and the other terminals of the input terminal pair to the other terminal of the intermediate output terminal pair, wherein the ratio of the values of the coupling components to any output are chosen to provide a desired, pre-twiddled Fourier signal combination for that output;

emitter followers or other active buffer circuit to buffer the output signals from each intermediate output terminal pair; and a set of coupling components that couple at least one of each buffered, intermediate output terminal pair to one terminal of a second intermediate set of intermediate output terminal pairs, the values of these coupling components being selected to provide a desired amount of coupling reduced or increased by the scaling of the signal on the first intermediate outputs, such that each second intermediate output signal is a desired, pre-twiddled Fourier combination of the first intermediate outputs.

The circuit is then continued through successive stages of buffers and coupling components until the final outputs are formed to be the Fourier transform of the input signal values. The final outputs, if their cumulative scaling turns out to be unequal, have their scaling equalized by suitable shunt components if necessary.

FFT and Butler Matrix Implementations.

In one embodiment, the coupling circuit described herein performs an FFT decomposition of the DFT. For this embodiment, the coupling circuit comprises a plurality of stages connected in cascade, where each stage comprises at least one coupling network. Each stage has some fraction of the total number of inputs and outputs for the coupling circuit. For example, when N represents the number of inputs and outputs for the DFT, where N is equivalent to N1·N2, the FFT decomposition may be achieved by interconnecting a first stage of N2 coupling networks that implement N1-point DFTs in cascade with a second stage of N1 coupling networks that implement N2-point DFTs. As discussed further herein, the couplings between the inputs and outputs of the coupling circuit may be selected to implement a Butler matrix.

Figure 5:
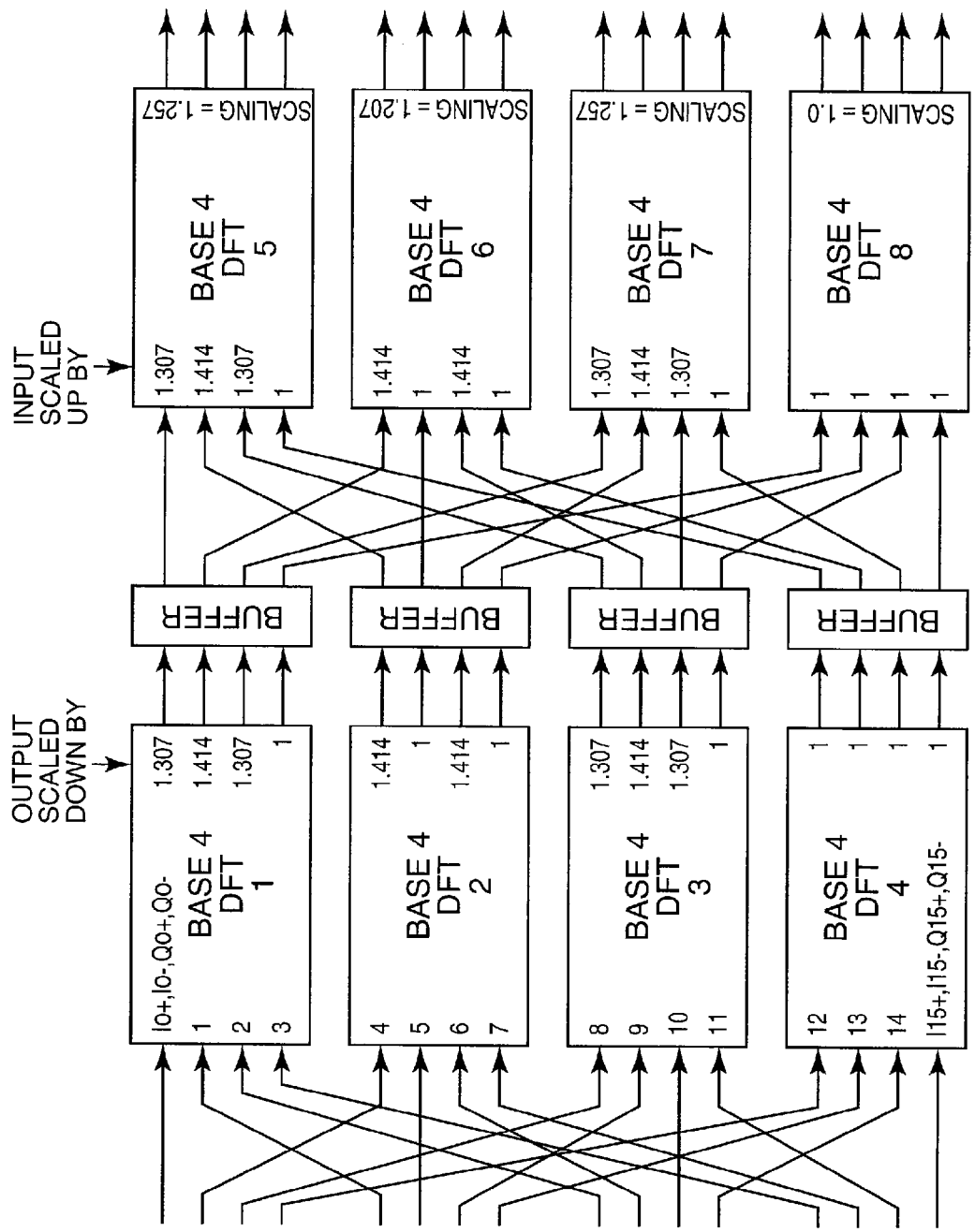
FIG. 5 shows an exemplary 16-point FFT circuit using transform circuits and inter-stage buffers.

FIG. 5 shows an exemplary 16-point transform circuit using two stages of 4-point transform circuits (with built-in pre-twiddling), and inter-stage buffers. Each stage in the illustrated transform circuit includes four coupling networks, where each coupling network implements a 4-point DFT. The use of buffers eliminates the loading of the second stages on the first stages, so eliminates the need to match input and output impedances. Furthermore, the second stages (5, 6, 7, 8) use coupling component values calculated to compensate for unequal scaling of the outputs of the first stages (1, 2, 3, 4). Tables 1-6 show exemplary coupling admittances for the eight, 4-point transforms.

TABLE 1

Coupling admittances for transforms 1 & 5

| ip | I1+ | Q1+ | I1− | Q1− | I2+ | Q2+ | I2− | Q2− | I3+ | Q3+ | I3− | Q3− | I4+ | Q4+ | I4− | Q4− |
|---|---|---|---|---|---|---|---|---|---|---|---|---|---|---|---|---|
| I1+ | 1.00 | | | | 1.00 | | | | 1.00 | | | | 1.00 | | | |
| I2+ | 1.00 | | | | | | | 1.00 | | | 1.00 | | | 1.00 | | |
| I3+ | 1.00 | | | | 1.00 | | | | | 1.00 | | | | | 1.00 | |
| I4+ | 1.00 | | | 1.00 | | | | | | | 1.00 | | | | | 1.00 |

TABLE 2

Coupling admittances for transform 2

| ip | I1+ | Q1+ | I1− | Q1− | I2+ | Q2+ | I2− | Q2− | I3+ | Q3+ | I3− | Q3− | I4+ | Q4+ | I4− | Q4− |
|---|---|---|---|---|---|---|---|---|---|---|---|---|---|---|---|---|
| I1+ | 1.00 | | | 1.00 | | | | | 1.00 | | | | 1.00 | | | |
| I2+ | 0.92 | | 0.38 | | | 0.38 | 0.92 | | | 0.38 | 0.92 | | 0.38 | 0.92 | | |
| I3+ | 0.71 | | 0.71 | | | 0.71 | | | 0.71 | | | 0.71 | | 0.71 | 0.71 | |
| I4+ | 0.38 | | 0.92 | 0.92 | 0.38 | | | | | 0.92 | 0.38 | | | | 0.92 | 0.38 |

TABLE 3

Coupling admittances for transform 3

| ip | I1+ | Q1+ | I1− | Q1− | I2+ | Q2+ | I2− | Q2− | I3+ | Q3+ | I3− | Q3− | I4+ | Q4+ | I4− | Q4− |
|---|---|---|---|---|---|---|---|---|---|---|---|---|---|---|---|---|
| I1+ | 1.00 | | | | 1.00 | | | | 1.00 | | | | 1.00 | | | |
| I2+ | 0.71 | | | 0.71 | | | 0.71 | 0.71 | | 0.71 | 0.71 | | 0.71 | 0.71 | | |
| I3+ | | | 1.00 | | | 1.00 | | | | | | 1.00 | | 1.00 | | |
| I4+ | | 0.71 | 0.71 | 0.71 | | | 0.71 | 0.71 | 0.71 | | | | | | 0.71 | 0.71 |

TABLE 4

Coupling admittances for transform 4

| ip | I1+ | Q1+ | I1− | Q1− | I2+ | Q2+ | I2− | Q2− | I3+ | Q3+ | I3− | Q3− | I4+ | Q4+ | I4− | Q4− |
|---|---|---|---|---|---|---|---|---|---|---|---|---|---|---|---|---|
| I1+ | 1.00 | | | | 1.00 | | | | 1.00 | | | | 1.00 | | | |
| I2+ | 0.38 | | | 0.92 | | | 0.92 | 0.38 | | 0.92 | 0.38 | | 0.92 | 0.38 | | |
| I3+ | | | 0.71 | 0.71 | 0.71 | 0.71 | | | | | 0.71 | 0.71 | 0.71 | 0.71 | | |
| I4+ | | 0.38 | 0.92 | | | | 0.38 | 0.92 | 0.92 | | | | 0.38 | 0.38 | 0.92 | |

TABLE 5

Coupling admittances for transforms 6 & 8

| ip | I1+ | Q1+ | I1− | Q1− | I2+ | Q2+ | I2− | Q2− | I3+ | Q3+ | I3− | Q3− | I4+ | Q4+ | I4− | Q4− |
|---|---|---|---|---|---|---|---|---|---|---|---|---|---|---|---|---|
| I1+ | 1.00 | | | | 1.31 | | | | 1.41 | | | | 1.31 | | | |
| I2+ | 1.00 | | | | | | | 1.31 | | | 1.41 | | | 1.31 | | |
| I3+ | 1.00 | | | | | 1.31 | | | 1.41 | | | | | | 1.31 | |
| I4+ | 1.00 | | | 1.31 | | | | | | | 1.41 | | | | | 1.31 |

TABLE 6

Coupling admittances for transform 7

| ip | I1+ | Q1+ | I1− | Q1− | I2+ | Q2+ | I2− | Q2− | I3+ | Q3+ | I3− | Q3− | I4+ | Q4+ | I4− | Q4− |
|---|---|---|---|---|---|---|---|---|---|---|---|---|---|---|---|---|
| I1+ | 1.00 | | 1.41 | | | | | | 1.00 | | | | 1.41 | | | |
| I2+ | 1.00 | | | | | | 1.41 | | | | 1.00 | | | 1.41 | | |
| I3+ | 1.00 | | | | | 1.41 | | | 1.00 | | | | | | 1.41 | |
| I4+ | 1.00 | | | | 1.41 | | | | | | 1.00 | | | | | 1.41 |

When these admittances are used, the outputs shown on the right of FIG. 5 exhibit a downscaling by the average of the admittances connected to each output. This is constant for the four outputs of the same 4-point transforms (5, 6, 7, or 8), but different for each of those transforms. Therefore, a final shunt admittance may be needed to attenuate the outputs of transforms 5 and 7 to have the same scaling as the outputs of transforms 6 and 8. Alternatively, if FIG. 5 is but one 16-point transform of the FFT decomposition of a larger DFT, then the admittances of the next stage may be scaled by the appropriate factors, according to which of the outputs of transforms 5, 6, 7, or 8 the admittance was connected.

Another passive realization of the DFT involves capacitive coupling. Because capacitive coupling only passes signal changes, the input signals may be suddenly applied to the inputs and the voltage changes at the outputs are the transform combinations. The circuit charges may then be reset by connecting the inputs and outputs to a reference potential, such as ground, or a mid-rail potential, prior to applying the next set of input signals. A structure which forms one of the output combinations of the DFT is shown in FIG. 6.

Figure 6:
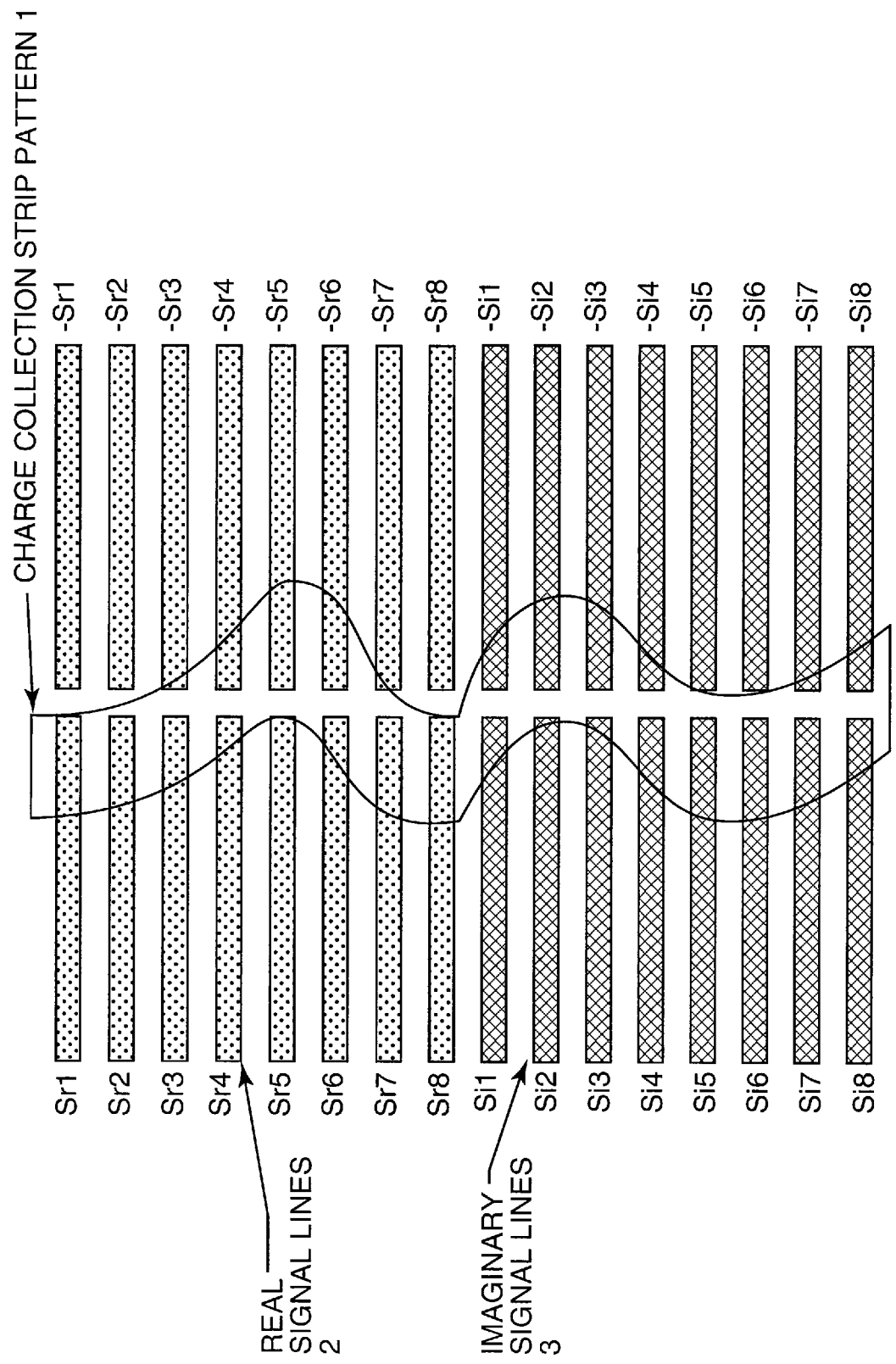
FIG. 6 shows an exemplary capacitive coupling-based DFT circuit.
Figure 7:
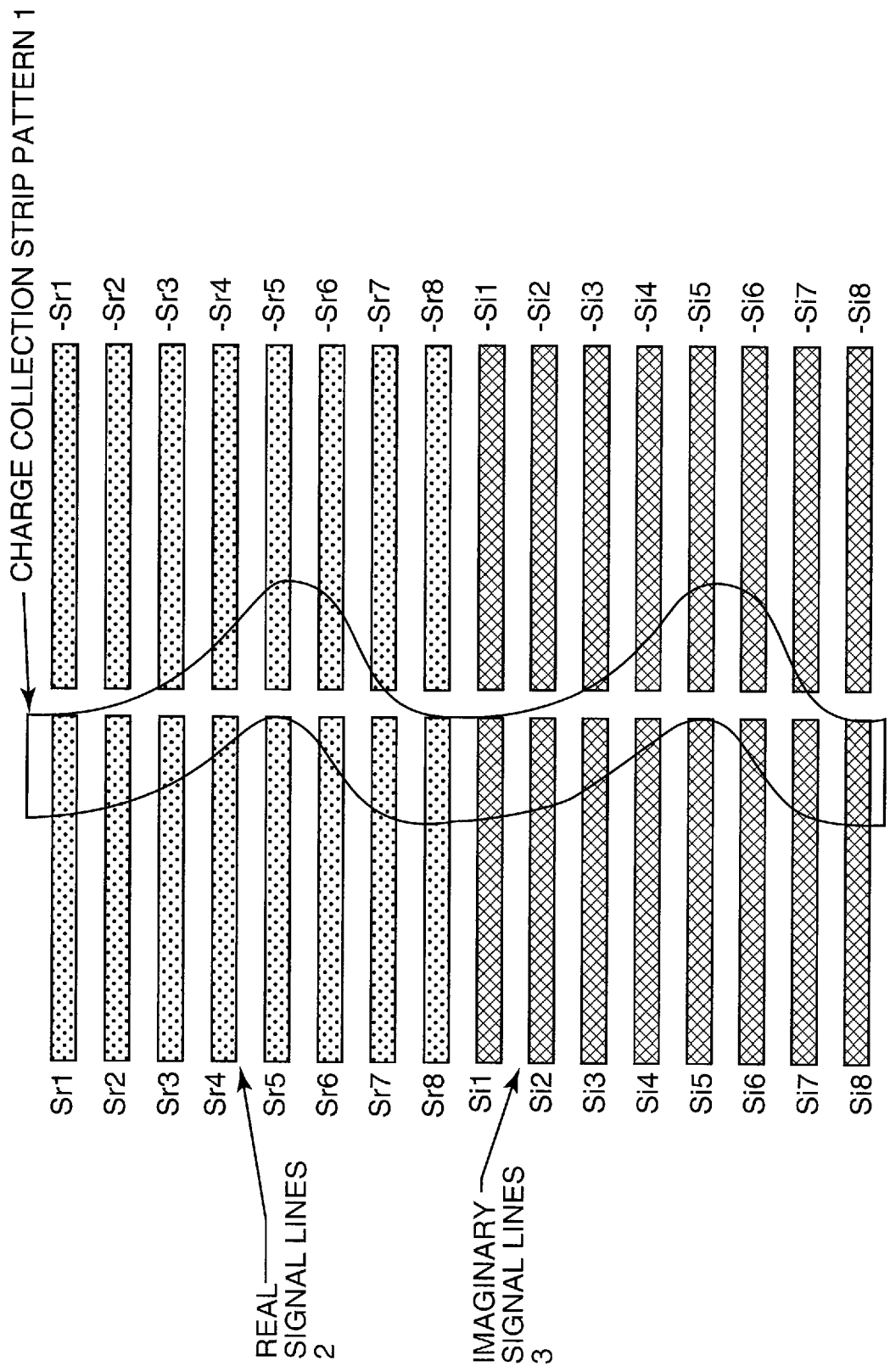
FIG. 7 shows another exemplary capacitive coupling-based DFT circuit.
Figure 8:
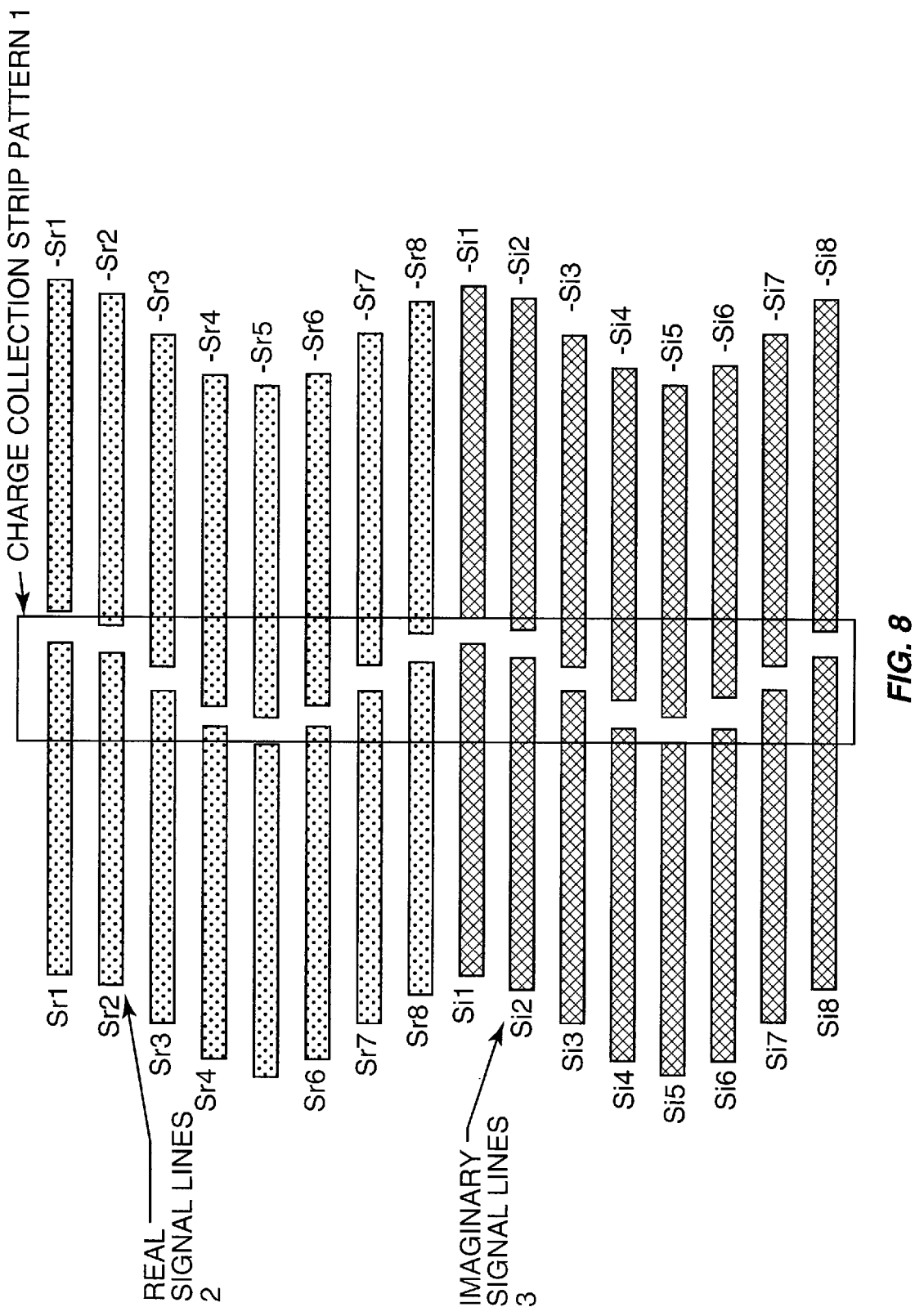
FIG. 8 shows another exemplary capacitive coupling-based DFT circuit.

In FIG. 6, a charge collection strip (1) meanders back and forth over a set of signal lines (2) carrying the real parts of the signals (r) and their negatives, and over a set of signal lines (3) carrying the imaginary parts of signals (i) and their negatives. The collection strip is separated from the signal lines by a thin insulating dielectric layer such as an oxide of silicon or a polyamide, both being available to be deposited using integrated circuit chip processes. The collection strip lies over the positive signal line when the corresponding weighting coefficient is positive, over the negative signal line when the coefficient is negative, and partly over both when the coefficient is small to zero. Because the coefficients along a column of the DFT matrix vary sinusoidally, the shape of the charge collection strip will vary sinusoidally. The shape will actually resemble a cosine over the real signal lines and a sine over the imaginary signal lines. A second collection strip with the sine and cosine patterns interchanged and one of them mirror-imaged will form the other of the two complex parts of the combination. Because the sine-shaped part is the same as the cosine shaped part except for a shift, which shift may instead be applied by rotating the order of the imaginary signal component lines, a single meander shape may be used, as shown in FIG. 7. Yet another variation comprises a straight collection strip, with the position of the gap between the positive and negative signal lines varied instead, as shown in FIG. 8.

The collection strip shapes shown in FIGS. 6 and 7 execute a single cycle over 8 signal values. The first combination formed by a DFT has all coefficients equal to +1, so would be a straight strip covering only the positive real signal lines, and optionally exactly straddling the + and − imaginary signal lines to realize a zero imaginary part of the weighting coefficient. The second combination formed by the DFT has real coefficients that are samples along one cycle of a cosine function, and imaginary parts of the coefficients that are samples along one cycle of a sine function. In the case of a base-2 DFT, the following pattern may be discerned among the coefficients for the second combination when indices vary from 1 to N:

$$\text{Real}\{W(1,i)\}=\text{Real}\{W(2,N-i+1)\} \text{ when indices vary from 1 to N,} \quad (10)$$

or when indices vary from 0 to N−1:

$$\text{Real}\{W(1,i)\}=\text{Real}\{W(1,N-i)\}=-\text{Real}\{W(1,N/2+i)\}=-\text{Real}\{W(1,N/2-i)\}=\text{Imag}\{W(1,N/4+i)\}=\text{Imag}\{W(1,N/4-i)\}=-\text{Imag}\{W(1,3N/4+i)\}=-\text{Imag}\{W(1,3N/4-i)\} \quad (11)$$

Figure 9:
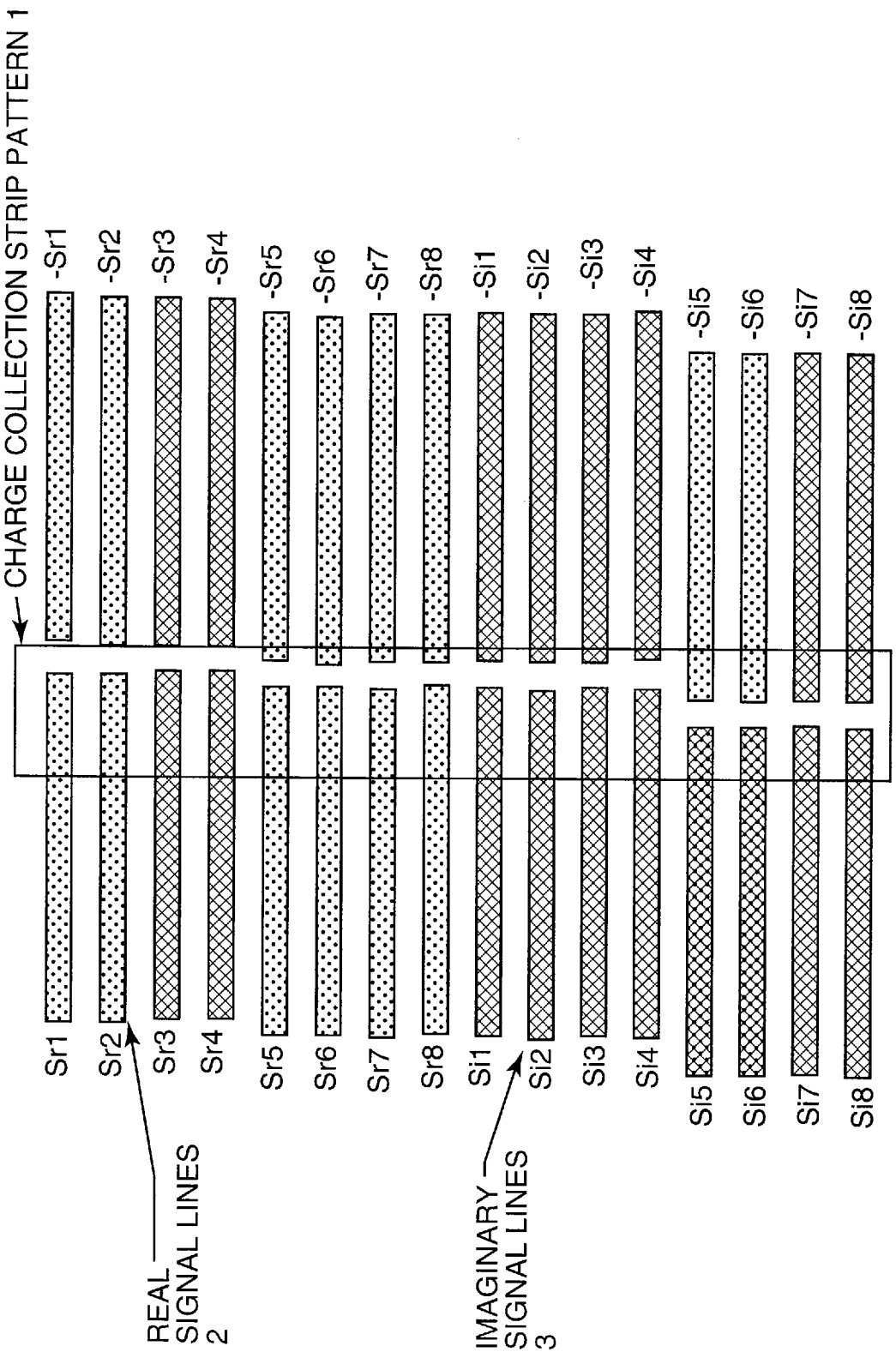
FIG. 9 shows another exemplary capacitive coupling-based DFT circuit.

FIG. 9 shows one way to exploit this 8-fold recurrence of coefficients that have the same magnitude. The coefficients for the 8-point DFT combination are 1, j, −1, and −j, which are applied to S1, S3, S5, and S7 respectively, which contribute +Sr(1), −Si(3), −Sr(5), and +Si(7) to the real part of the exemplary combination, and $1/\sqrt{2}+j/\sqrt{2}$, $-1/\sqrt{2}+j/\sqrt{2}$, $-1/\sqrt{2}-j/\sqrt{2}$, and $1/\sqrt{2}-j/\sqrt{2}$, which contribute $1/\sqrt{2}$ times Sr2, −Sr4, −Sr6, Sr8, Si2, Si4, −Si6, and −Si8 to the real part of the combination under consideration. The final signals Sr3, Sr7, Si1, and Si5 have zero coefficients. To form the imaginary part of the DFT combination, the same structure is used with the real signals replaced by the imaginary signals, and the imaginary signals replaced by the real signals of reverse sign.

Depending on whether a DFT or its inverse is being computed, it is only necessary to reverse the sign of the imaginary components. If the negative counterpart of a signal combination is used to maintain a balanced signal structure, the same pattern is used with the positive and negative versions of the real and imaginary signal lines interchanged. Thus, by sorting the coefficients by magnitude and criss-crossing or interleaving the signal lines accordingly, the displacement between the signal line gaps and the center of the collection strip lie on a smooth, monotonic curve, which process clearly has an analogy with the magnitude sorting of the ladder network filter design of the above-incorporated '798 patent.

When the DFT is constructed as a single stage, as in FIG. 8, and is not intended to be cascaded with circuits that could load the outputs, it is not necessary for the capacitances to be matched as between collector strips for different output Fourier combinations. However, if matching is desired, then the total capacitance from any collector strip to all the signal lines should be the same. For example, if the sum of the capacitances from a positive and a negative signal line such as Sr2+ and Sr2− is made equal for all signal lines to some chosen value Co, and the difference is to be equal to Co cos(θ) in order to realize a coupling coefficient cos(θ), then the capacitance from the +signal line is $0.5*(1+\cos(\theta))Co$ and the capacitance to the − signal line is $0.5(1-\cos(\theta))Co$. Keeping the output capacitance or impedance thereby the same for the collector strip for each Fourier combination allows the circuit to be cascaded with other circuits without affecting the accuracy. This solution to the scaling issue may also be used with resistor networks, e.g., always using a conductance from both the negative and positive inputs, the sum of which is Go and the difference of which is the desired Fourier weight. This results in the output voltages being scaled by a constant factor of ½N instead of 0.828/N with the previously-described scaling. Conversely, the minimum scaling solution for the resistor network may also be applied to a capacitor network to reduce the total capacitance from 2NCo to NCo/0.828=1.207NCo.

Figure 10:
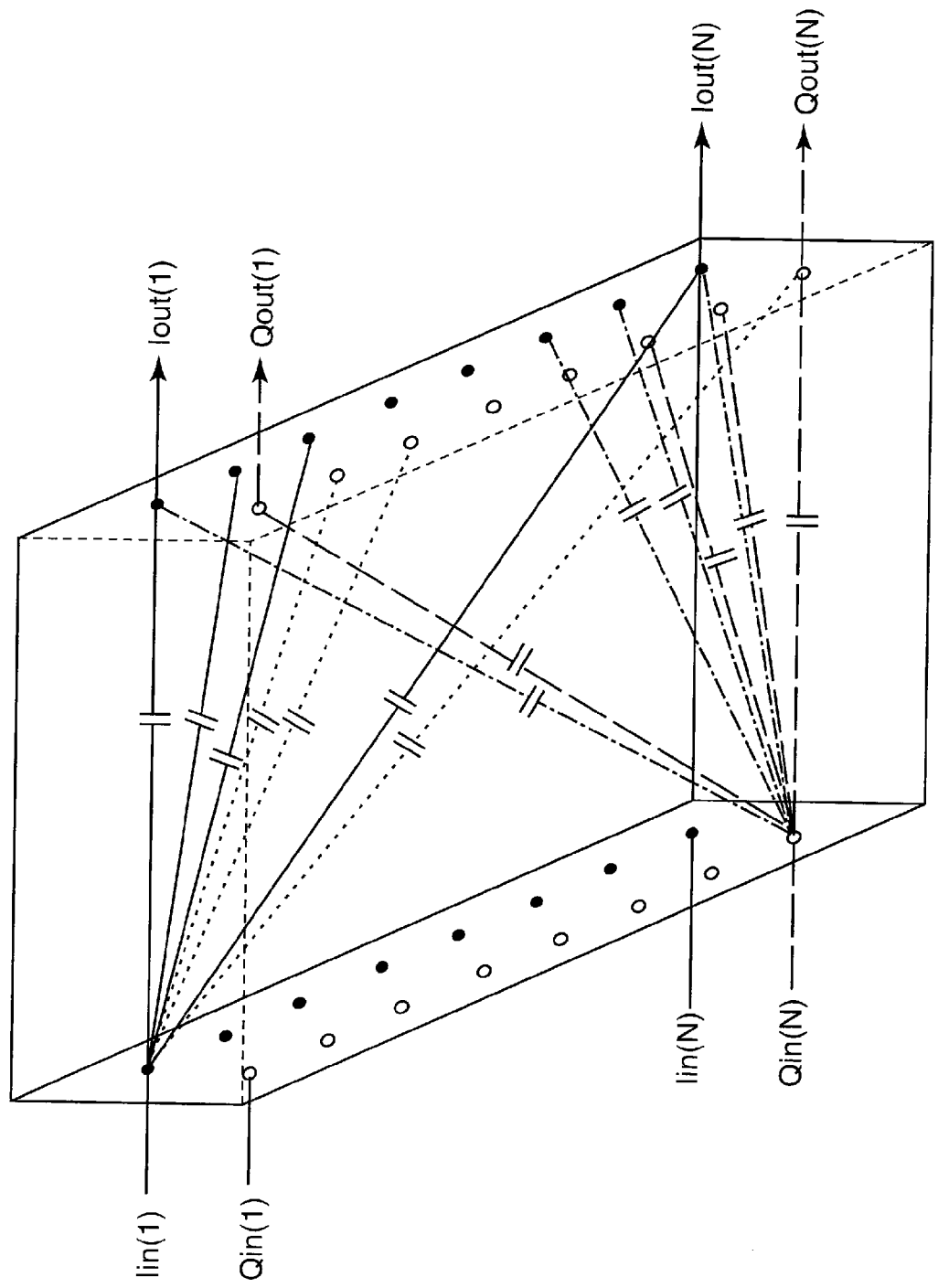
FIG. 10 shows an exemplary 2N-port coupling capacitor network.

FIG. 10 illustrates a general 2N-port network of coupling capacitors. There are N I-input ports for the real parts of the inputs and N Q-input ports for the imaginary parts of the inputs. Likewise there are N I-output and N Q-output ports. In general, there is coupling capacitance from every input port to every output port, the net coupling capacitances for a Fourier Transform network being Co·cos(kθ) from an I-input port terminal to an I-output port terminal and from a Q-input port terminal to a Q-output port terminal, −Co·sin(kθ) from a Q-input port terminal to an I-output port terminal, and Co·sin (kθ) from an I-input port terminal to a Q-output port terminal, where θ=2π/N, and k=(i−1)(j−1) where i is the input port number (1 to N) and j is the output port number (1 to N).

Although FIG. 10 is illustrated as an unbalanced (single-ended) coupling network for clarity, it will be understood that each input and output port may comprise a balanced port having a pair of + and − terminals, and that each coupling capacitor illustrated is actually a pair of capacitors connected from the + input terminal to the + output terminal and the − input terminal to the − output terminal for positive coefficients, or from the + input terminal to the − output terminal and from the − input terminal to the +output terminal for negative coefficients. Also, in order to keep total terminal capacitance the same for all terminals, each coupling capacitance that is less than Co (e.g., cos(kθ)<1) may be formed by a coupling capacitance of 0.5Co{1+cos(kθ)} from + to + and − to − terminals and a coupling capacitance of 0.5Co{1−cos (kθ)} from + to − and − to + terminals.

A balanced network of this type receives signals in the form of push-pull charge injections and develops voltages on the output terminals which equate to the Discrete Fourier Transform of the input signal charges. The network may therefore be made to operate at the I,Q baseband.

Such a network may also be used to produce an RF Butler Matrix operating within a certain bandwidth around a center frequency. Firstly, the total port capacitance at each port is tuned out with an inductor at each port that resonates with the total port capacitance at a desired center frequency. By keeping the total port capacitance the same, equal to NCo, as described above, all inductors have the same value. A Butler matrix divides the power input to one input port equally to all output ports with sequentially different phases. Thus the output power from each pair of I and Q ports will be the same and equal to 1/N th of the input power.

It may be shown that, if Wo is the angular frequency of operation and Ro is the desired input and output port characteristic impedance, then:

$$Co = \frac{1}{WoRo\sqrt{2N}}. \quad (12)$$

The total port capacitance is then $2NCo=\sqrt{2N}/(WoRo)$, and this is resonated with the port tuning inductor to produce a working Q-factor of $\sqrt{2N}$ at all ports. For example, a 256-port device would have a working Q of 32, which, using inductors with an unloaded Q factor of 320, would give 1 dB total power insertion loss. This could be less than achieved with directional coupler-based Butler matrices using an 8-stage FFT structure. For reasons of losses as well as complexity, it is not known if Butler Matrices as large as 256 have ever been constructed. However, the inventive coupling network seems to make larger Butler matrices possible for lower frequencies where transmission line-based directional coupler solutions would be excessively large.

A minimum capacitance solution uses capacitors of value Co·cos(θ) connected between the I+ input and output, the I− input and output, the Q+ input and output, and the Q− input and output, and a capacitance of Co·sin(kθ) between an I input and a Q output and vice versa. Capacitance equalization would then add a capacitance $Co(\sqrt{2}-1)N/4$ across the Io and Qo input and output ports, and a lesser capacitance across other ports, to make the total capacitance equal to that of ports N/8, 3N/8, 5N/8, and 7N/8, that is to $(0.5+1/\sqrt{2})NCo$ single-ended, and half that amount balanced. The Q factor of an N-port Butler matrix constructed in this way is $\sqrt{1.207N}$, e.g., 4.395 for a 16+16-port coupler and 17.58 for a 256+256 port coupler, which would be less lossy for the same inductor Q-factor than the solution with total terminal capacitance of 2NCo. Such a coupler also has a second-order maximally flat frequency response.

Figure 11:
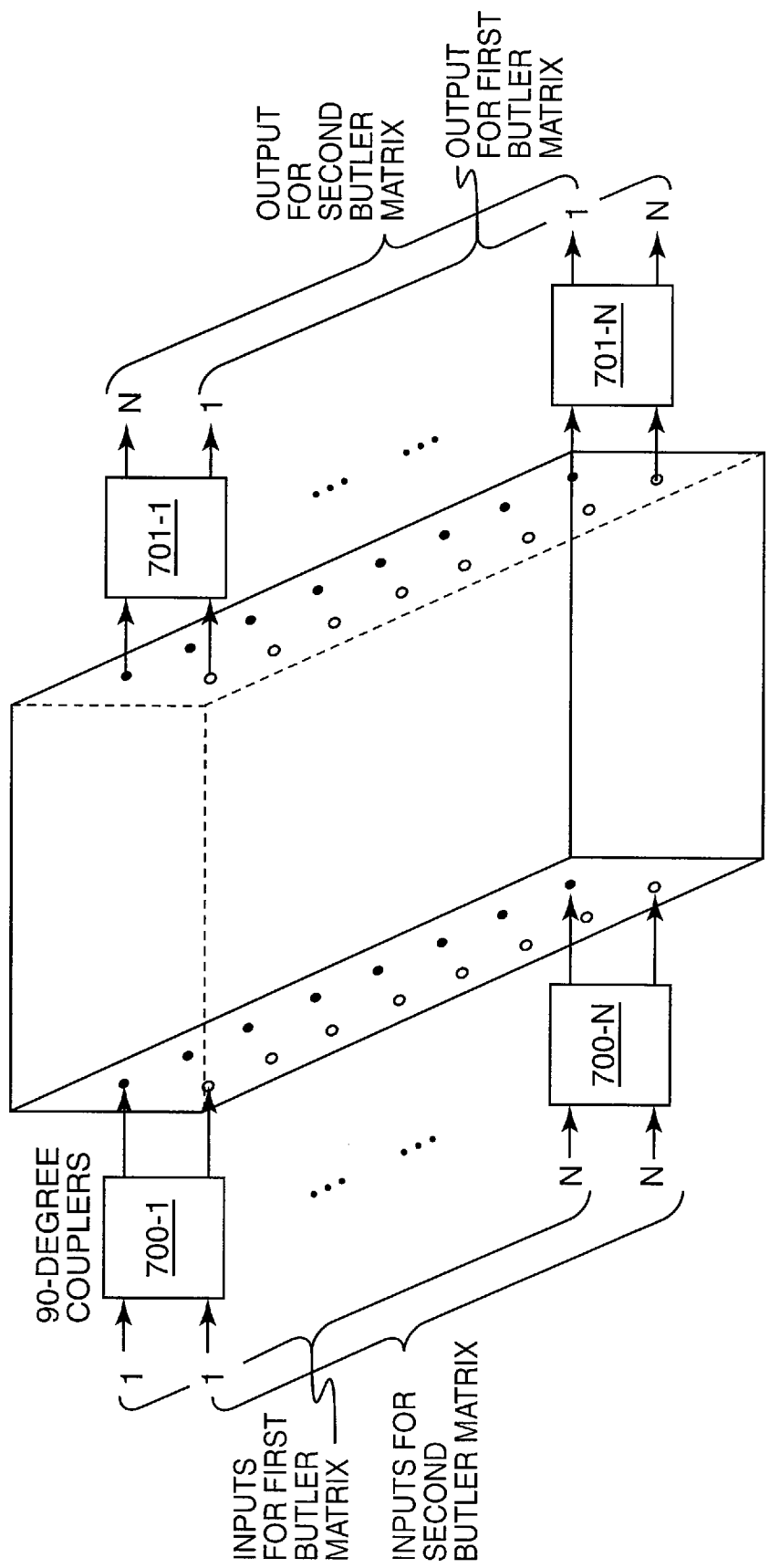
FIG. 11 shows an exemplary Butler matrix circuit using the coupling capacitor network of FIG. 10.

To complete a device having the same characteristic as a Butler Matrix, a 90° directional coupler may be added at each pair of (I, Q) input ports to split input signals into I and Q parts, and likewise for recombining I and Q signals at the outputs. The device analyzed together with the input and output couplers has then the function of a pair of nominally decoupled (e.g., independent) (N+N) port Butler matrices, the first Butler matrix function existing between first input coupler ports and second output coupler ports, and the second Butler matrix function existing between second input coupler ports and first output coupler ports, as clarified by FIG. 11.

A significant feature of the inventive Butler Matrix described herein is that N is not constrained in any way, and may be a prime number such as 3 or 17. The second Butler matrix actually realizes the complex conjugate of the signal split of the first Butler matrix, which however is the same if the output port indexing is reversed, as shown. New realizations of Butler matrices are thus one aspect of the current invention. Another aim of the invention is to realize low-power or cheaper alternatives to digital baseband FFTs, for OFDM transmission or reception, for example. Returning to the passive resistor-based DFT, it is desired to reduce the total number of resistances used to form the desired outputs. This may be achieved by variations based on the Fast Fourier Transform (FFT) structure.

Figure 12:
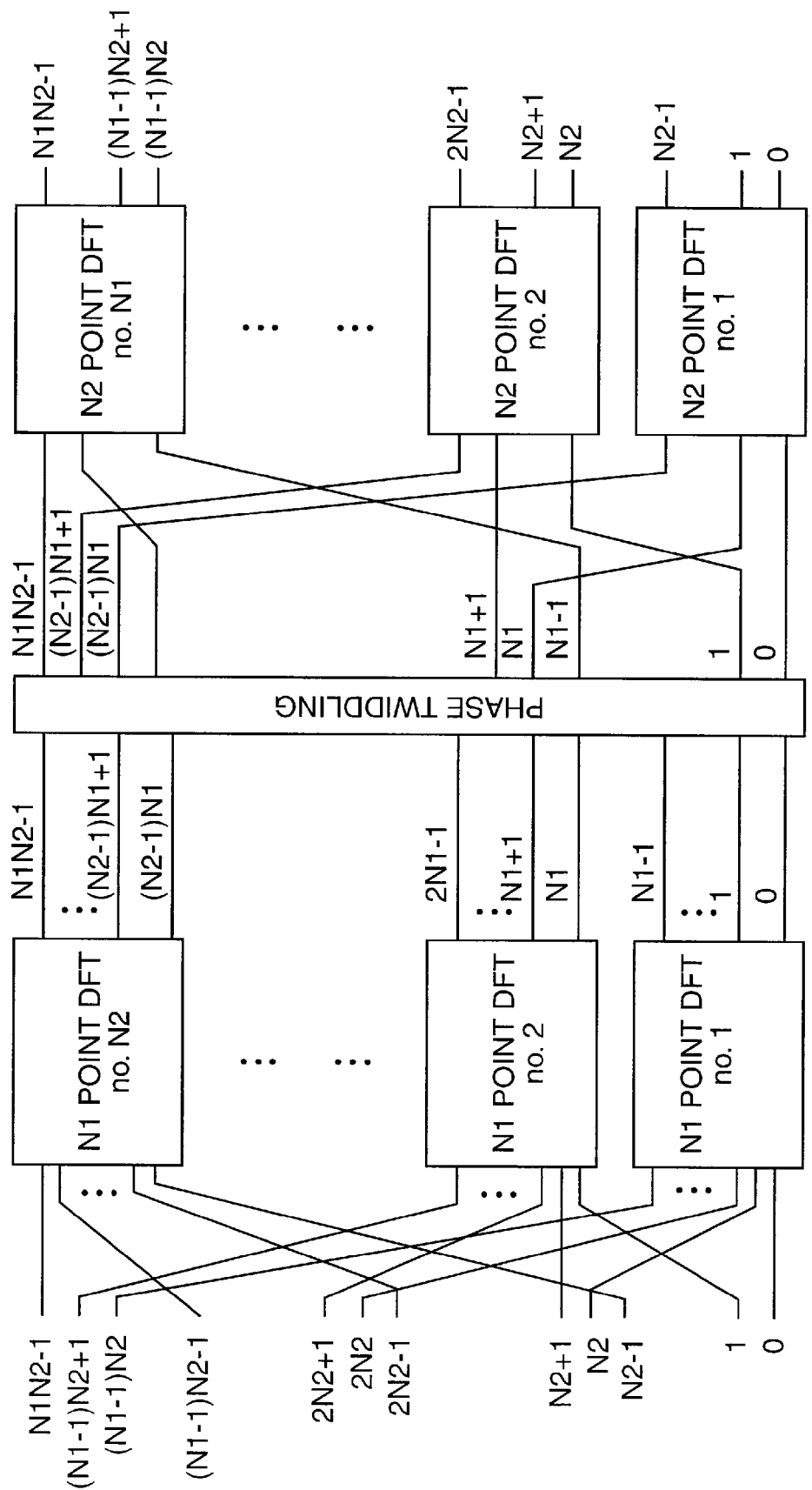
FIG. 12 shows an exemplary FFT circuit.

An FFT structure is possible when N is not a prime and may be factorized into at least two factors, N1 and N2. The structure of an FFT for N=N1·N2 is shown in FIG. 12. FIG. 12 illustrates that the FFT structure for an N-point DFT for N=N1·N2 starts by performing a set of N2, N1-point DFTs, with each N1-point FFT having as its inputs every $N_2$th of the input signal values. The output values of the first stage of DFTs are then subjected to a set of phase rotations, the operation being known as "twiddling" to experts in the field of FFTs. The twiddled values are then subjected to a set of N1, N2-point DFTs, with each N2-point DFT having as its inputs every N1$^{th}$ output of the twiddler.

Figure 13:
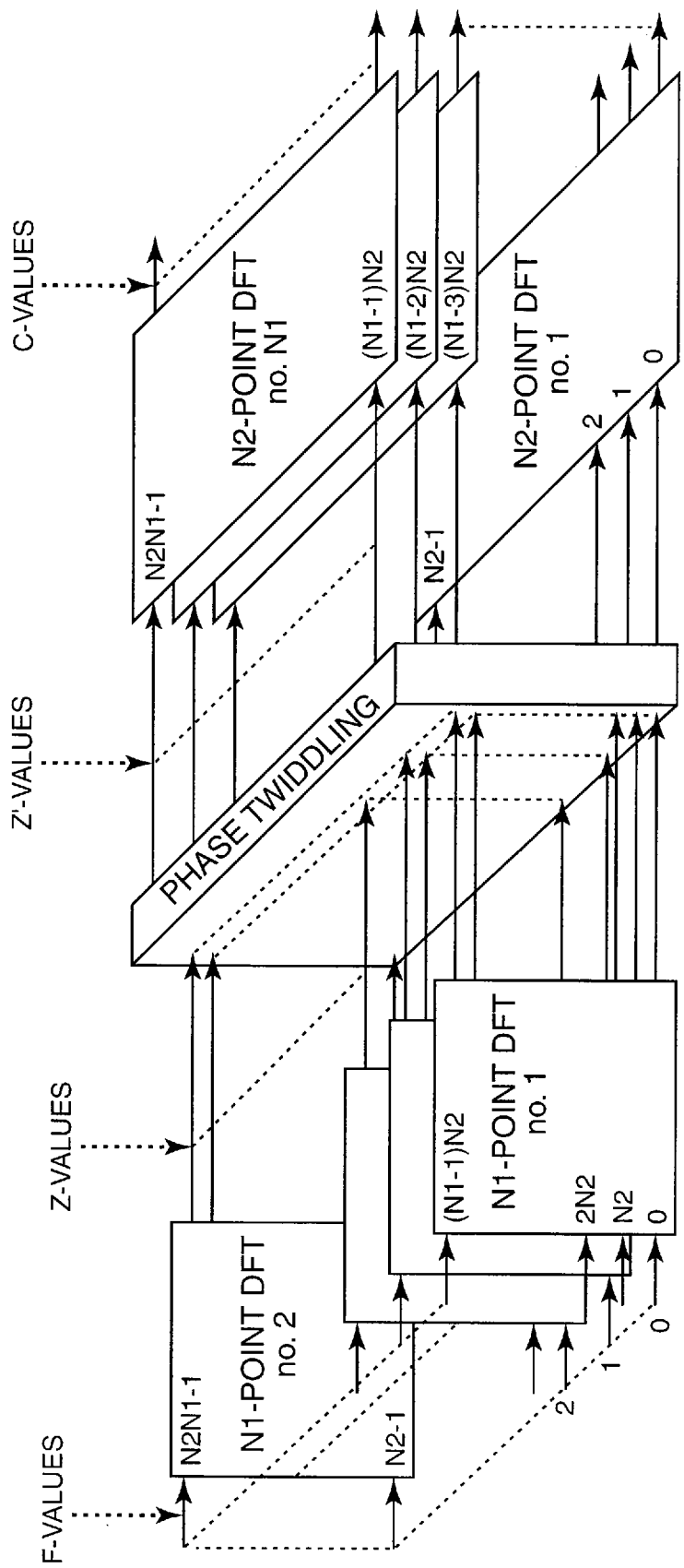
FIG. 13 further shows details of the exemplary FFT circuit.

FIG. 13 illustrates that the FFT structure in fact decomposes the N-point DFT into a two-dimensional DFT of an input signal value array of N1×N2 points. The first stage of N1-point DFTs operates down columns, while the second stage of N2-point DFTs operates along rows. Between the N1-point DFTs and the N2-point DFTs, the phases of the intermediate values are twiddled. The mathematical derivation of the FFT structure is as follows. For all values of k from 0 to N−1, where W is the $N^{th}$ principal root of unity or its conjugate, e.g., $W^N=1$, form:

$$C(k) = \sum_{i=0}^{N-1} W^{ik} F(i). \quad (13)$$

Now let the one-dimensional array of values $F_i$ be arranged as a two-dimensional array of values F(i1, io), where i=N2·i1+io, with io ranging from 0 to N2−1, and i1 ranging from 0 to N1−1, and N1·N2=N. Likewise let the one dimensional array C(k) be arranged as a two dimensional array C(k1,ko) where k=N1·k1+ko, and ko ranges from 0 to N1−1 and k1 ranges from 0 to N2−1. Thus, i and k are expressed in a radix N1, N2 number system with radix reversal for k compared to i, such that the row index for i is the column index for k and vice-versa. Now the power ik of W in Equation (13) may be expanded as:

$$ik = (N2 \cdot i1 + io)(N1 \cdot k1 + ko) = N1 \cdot N2 \cdot i1 \cdot k1 \cdot io + N2 \cdot i1 \cdot ko + io \cdot ko. \quad (14)$$

Thus, $W^{ik} = (W^{N1 \cdot N2 \cdot i1 \cdot k1}) \times (W^{N1 \cdot k1 \cdot io}) \times (W^{N2 \cdot i1 \cdot ko}) \times (W^{io \cdot ko})$. However, N1·N2=N and $W^N=1$. Therefore, the first term is unity and may be dropped. Thus, $$W^{ik} = W^{N1 \cdot k1 \cdot io} \times W^{N2 \cdot i1 \cdot ko} \times W^{io \cdot ko}. \quad (15)$$

Equation (13) is now expressed as a summation over all values of the 2-D array F(i1,io) by row and column as:

$$C(k) = \sum_{io=0}^{N2-1} \sum_{i1=0}^{N1-1} W^{N1 \cdot k1 \cdot io} W^{N2 \cdot i1 \cdot ko} W^{io \cdot ko} F(i1, io). \quad (16)$$

Moving powers of W that do not depend on i1 to the left of the inner summation produces:

$$C(k) = \sum_{io=0}^{N2-1} W^{N1 \times k1 \times io} W^{io \times ko} \sum_{i1=0}^{N1-1} W^{N2 \times i1 \times ko} F(i1, io). \quad (17)$$

The innermost summation may now be recognized as an N1-point DFT performed over a column of values of F indexed by summation variable i1 to compute a number of output values each for a different value of ko. Because ko and i1 both range over 0 to N1−1, the number of output values equals the number of input values N1, e.g., the transform is "square." Also, such a transform is carried out for each row of F-values, e.g., for each value of io from 0 to N2−1, a total of N2 transforms. The total number of output values is then N2·N1, which is the same as the number of input values. These intermediate values may be designated by Z(ko, io), as a Z value is formed for each value of ko and for each value of io.

The above describes the function performed by the leftmost stages of N2, N1-point DFTs of FIG. 13 to transform input F-values to intermediate Z-values. Now writing Equation (17) in terms of the intermediate values Z produces:

$$C(k) = \sum_{io=0}^{N2-1} W^{N1 \cdot k1 \cdot io} \{W^{io \cdot ko} Z(ko, io)\}. \quad (18)$$

The next step combines the multiplier $W^{ioko}$ with the corresponding intermediate value Z(ko,io) that it multiplies to get a "twiddled" intermediate value Z'(ko,io). Multiplying by a power of W simply rotates the phase angle of Z without changing its amplitude. This is the function performed by the Phase Twiddling unit of FIG. 13.

Re-writing Equation (18) in terms of twiddled values Z' produces:

$$C(k) = \sum_{io=0}^{N2-1} W^{N1 \cdot k1 \cdot io} Z'(ko, io) \quad (19)$$

This may be recognized as an N2-point DFT over columns of Z'-values indexed by io. The output values of each transform are indexed by k1, which ranges over the same number of values N2 as io. Thus the number of output values of each transform is N2, the same as the number of input values. Such a transform has to be performed for each value of ko ranging from 0 to N1−1. This gives rise to the N1, N2-POINT transforms which operate along rows, as shown on the right of FIG. 13.

For a balanced, scaling- and impedance-equalized passive, N-point DFT circuit, it was shown above that, at a minimum, 2N−4 passive admittances or components (e.g., resistors, capacitors, or other linear electronic component) were used for each output terminal, plus impedance equalizing admittances at all except four input and output ports, making a total of 4N(2N−4)+4N−8=8(N2−1)−12N admittances.

When the FFT decomposition of an N=N1·N2-point DFT is used however, as in FIG. 13, the total number of admittances for the N2, N1-point DFTs plus the N1, N2-point DFTs becomes:

$$N2((8(N1 2 -1) -12N1) + N1(8(N2 2 -1) -12N2). \quad (20)$$

For example, with N=256 and N1=N2=16, the admittance count without using the FFT structure is 521,208, which reduces to 59,136 for the 16×16 FFT structure, not including the phase twiddling components. Moreover, each N1 or N2 point DFT may be further decomposed, if the integers N1 and N2 have factors, thereby reducing the component count further. The component count for the fully-parallel, passive FFT circuit is very similar to the number of real arithmetic operations (adds, subtracts and multiplies) used for performing a digital DFT or FFT, and the savings of the FFT structures are thus similar in both cases. Any FFT formulation applicable for reducing the arithmetic complexity of digital DFTs may thus also be used to reduce the component count for the passive, analog DFTs disclosed herein.

There are many opinions on how best to decompose an N-point DFT when N is highly composite, such as a power of 2, in order to obtain the most efficient FFT. Different methods include base-2 decompositions, base-4 decompositions, base-8, successive square-rooting of N, and so forth. Because multiplies are only used for twiddling, and the exact nature of the twiddling is that which differs most between different FFT decompositions, it is the twiddling that is largely responsible for the differences between the efficiencies of different FFT decompositions. It is therefore useful to address the twiddling operation for passive FFTs in order to evaluate the advantages of one or other passive FFT structure.

Figure 14:
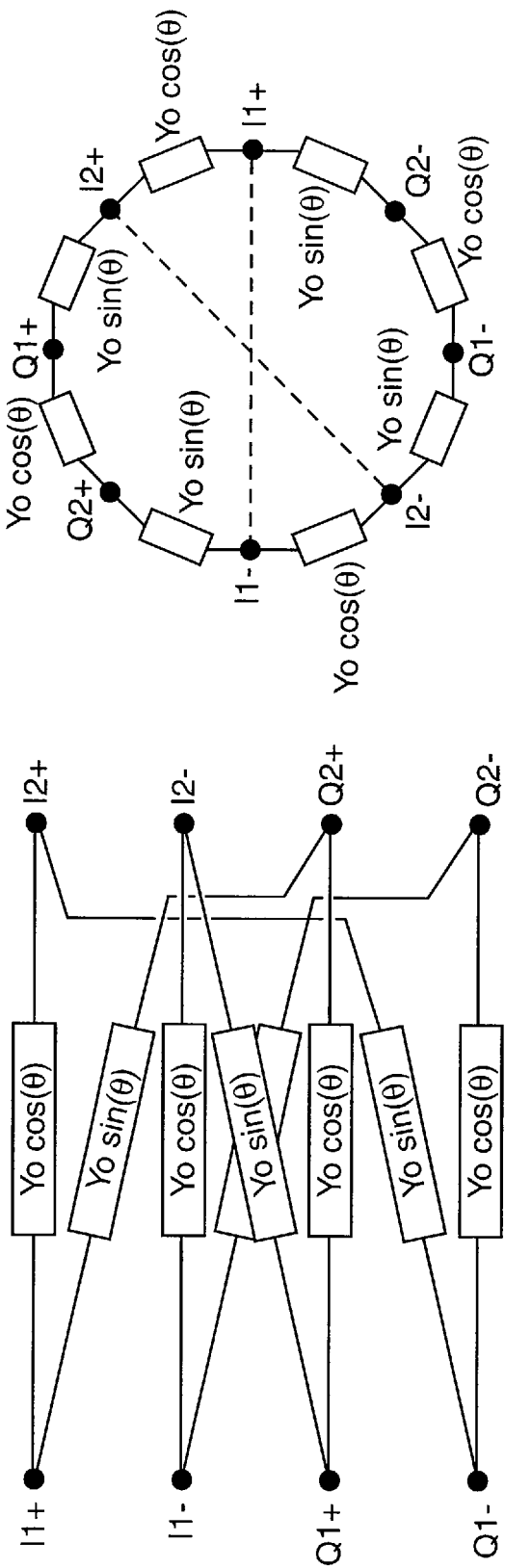
FIG. 14 shows an exemplary passive phase twiddling circuit.

A circuit of passive admittances may also be used to perform the phase twiddling operations, as shown in FIG. 14. FIG. 14 illustrates the circuit firstly with input terminals on the left and output terminals on the right, but then also shows the circuit re-drawn as a circular arrangement of admittances, from which it is easier intuitively to understand how the circuit produces a rotation of the I,Q signal. The input to the twiddle circuit comprises a balanced real signal part (I1+,I1−) and a balanced imaginary signal part (Q1+, Q1−). The outputs to be formed are I2+, I2−, Q2+, and Q2−, given by:

$$I2+=a[I1\cos(\theta)-Q1\sin(\theta)]$$

$$I2-=a[-I1\cos(\theta)+Q1\sin(\theta)]$$

$$Q2+=a[Q1\cos(\theta)+I1\sin(\theta)]$$

$$Q2-=a[-Q1\cos(\theta)-I1\sin(\theta)] \quad (21)$$

The above equations are implemented by the circuit of FIG. 14, where the constant of proportionality "a" may be given by:

$$a = \frac{1}{[|\cos(\theta)| + |\sin(\theta)|]}. \quad (22)$$

The value of "a" thus depends on the twiddling angle. The smallest value of "a" occurs when the twiddle angle is a multiple of 45°, and a $1/\sqrt{2}$.

In order to keep the same scaling for components twiddled though angles other than 45°, shunt resistors are used at the output ports, and also the input ports if preserving symmetry is desired. The value of the shunt admittance is that which makes the total port admittance the same value of $Yo/\sqrt{2}$ as for the 45° twiddle case, which would thus be $Yo(1/\sqrt{2}-0.5)$ for the 0° twiddle case, for example, where the total port admittance would otherwise only have been 0.5Yo.

Figure 15:
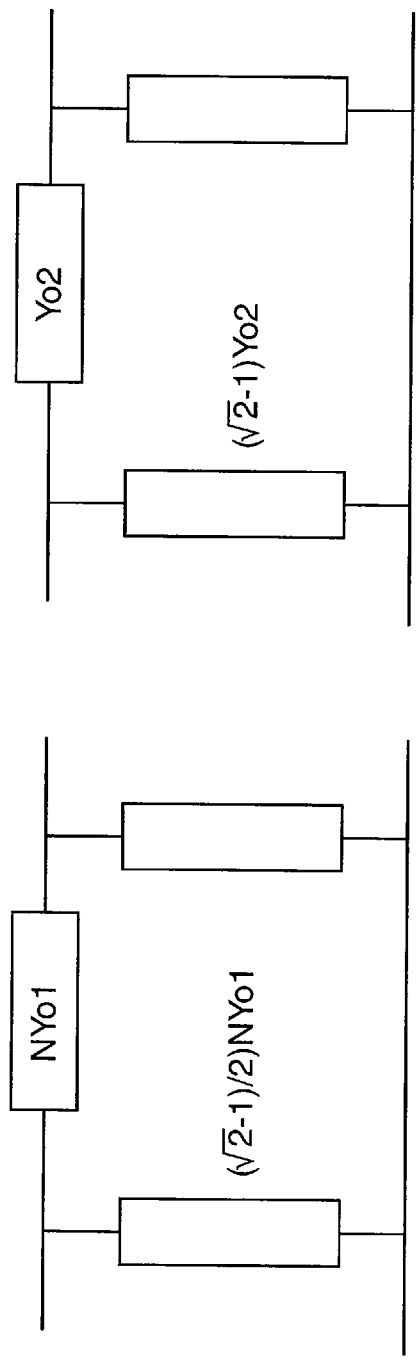
FIG. 15 shows exemplary unbalanced twiddling circuits.

One passive FFT realization of the DFT therefore comprises a cascade of DFT circuits, such as FIG. 2, interspersed with twiddling circuits such as FIG. 15. As already shown, when the scaling for each DFT output is equalized, the excess attenuation through a DFT circuit such as FIG. 2 is a minimum of 0.828 compared to 1/N. This may be improved slightly for small numbers of points such as 8, by offsetting the angles a small amount from the worst case 45° positions. However, without such offsetting, the attenuation through the FFT circuit of FIG. 13 is comprised of an attenuation of 0.828/N1 for the N1-point DFTs, 0.7071 or 3 dB for the twiddle circuits, 0.828/N2 for the N2-point DFTs, and an additional factor for loading of one stage by the next. The loading effect may be reduced by increasing the impedance level of successive stages; however, the reversibility of input and output is then lost. With input-output symmetry, the first stage of N1-point DFTs, the twiddle circuits, and the second stage of N2-point FFTs may be regarded as n-section attenuators, which are preferably of the same characteristic impedance, and have respective insertion losses which add to determine the total insertion loss of the circuit. The equivalent unbalanced attenuator sections for the purposes of estimating the insertion loss are shown in FIG. 15.

The insertion loss of the scaling-equalized twiddle circuits may be calculated to be a factor $1/(1+\sqrt{2})$ in voltage, which is −7.656 dB. The insertion loss of a stage of DFT is likewise calculated to be −5.5 dB. Therefore, for the FFT of FIG. 13, the total excess insertion loss between a matched source and load is 5.5+7.656+5.5=18.656 dB on top of the factor 1/N. The total insertion loss may be reduced by eliminating the phase twiddling circuit. This may be accomplished by arranging that the first stage DFTs are designed to form pre-twiddled values.

Consider FIG. 13 configured for a 16-point transform using a first set of four 4-point column transforms, a set of 4×4 twiddle factors, and a second set of four 4-point row transforms. The set of 4×4 phase twiddles is, in degrees:

TABLE 7

| 0 | 0    | 0   | 0     |
|---|------|-----|-------|
| 0 | 22.5 | 45  | 675   |
| 0 | 45   | 90  | 135   |
| 0 | 67.5 | 135 | 202.5 |

Thus, the first of the 4-point transforms does not need to compute pre-twiddled values, as the twiddle angles are zero.

Figure 16:
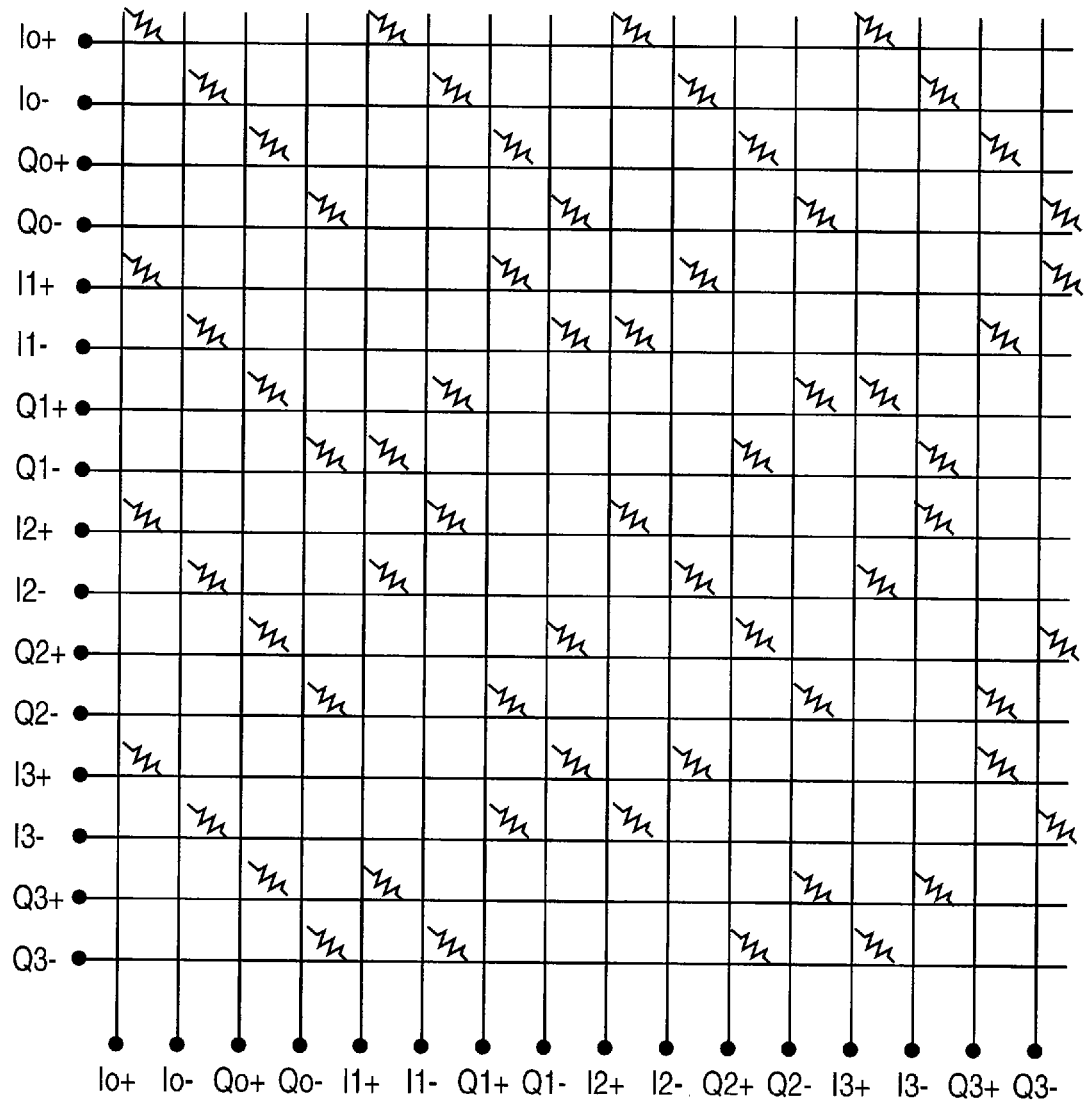
FIG. 16 shows an exemplary 4-point FFT circuit without pre-twiddling.

A four-point transform without pre-twiddling is shown in FIG. 16. It should be understood that the vertical wires and the horizontal wires are not connected at their crossings, and are only coupled by the resistors shown. The next 4-point transform computes pre-twiddled values for the angles 0°, 22.5°, 45°, and 67.5°. If an output was previously connected to a real input via a coupling admittance Yr and to an imaginary input via a coupling admittance Yi, in order to produce the output pre-twiddled through an angle ϕ the output is coupled to the real and imaginary inputs instead by admittances which are the real and imaginary parts of $(Yr+jYi)*(\cos(\phi)+j\sin(\phi))$, e.g., via an admittance given by:

$$Yr\cdot\cos(\phi)-Yi\cdot\sin(\phi) \quad (23)$$

to the real input, and via an admittance given by:

$$Yr\cdot\cos(\phi)+Yi\cdot\sin(\phi) \quad (24)$$

to the imaginary input. After all outputs have been twiddled through respective angles ϕ=0°, 22.5°, 45°, 67.5° in this way, their scalings are equalized by adding a shunt port capacitance to equalize the total port capacitance on each. As previously shown, the 45° case has the greatest total admittance as it involves equal admittances of $Yo/\sqrt{2}$ from each input, a total terminal admittance of $NYo\sqrt{2}$ or balanced port admittance of $NYo/\sqrt{2}$. To equalize admittance therefore, the outputs of the 4+4 port coupler that are twiddled by 0° have added shunt port admittances given by $NYo(1/\sqrt{2}-0.5)$, while the 22.5° and 67.5° twiddled outputs have added shunt admittances given by 0.5NYo(cos(45)+sin(45)−cos(22.5)−sin(22.5))=0.0538NYo. Thus, FIG. 16, when modified to produce pre-twiddled outputs, appears as in FIG. 17.

Figure 17:
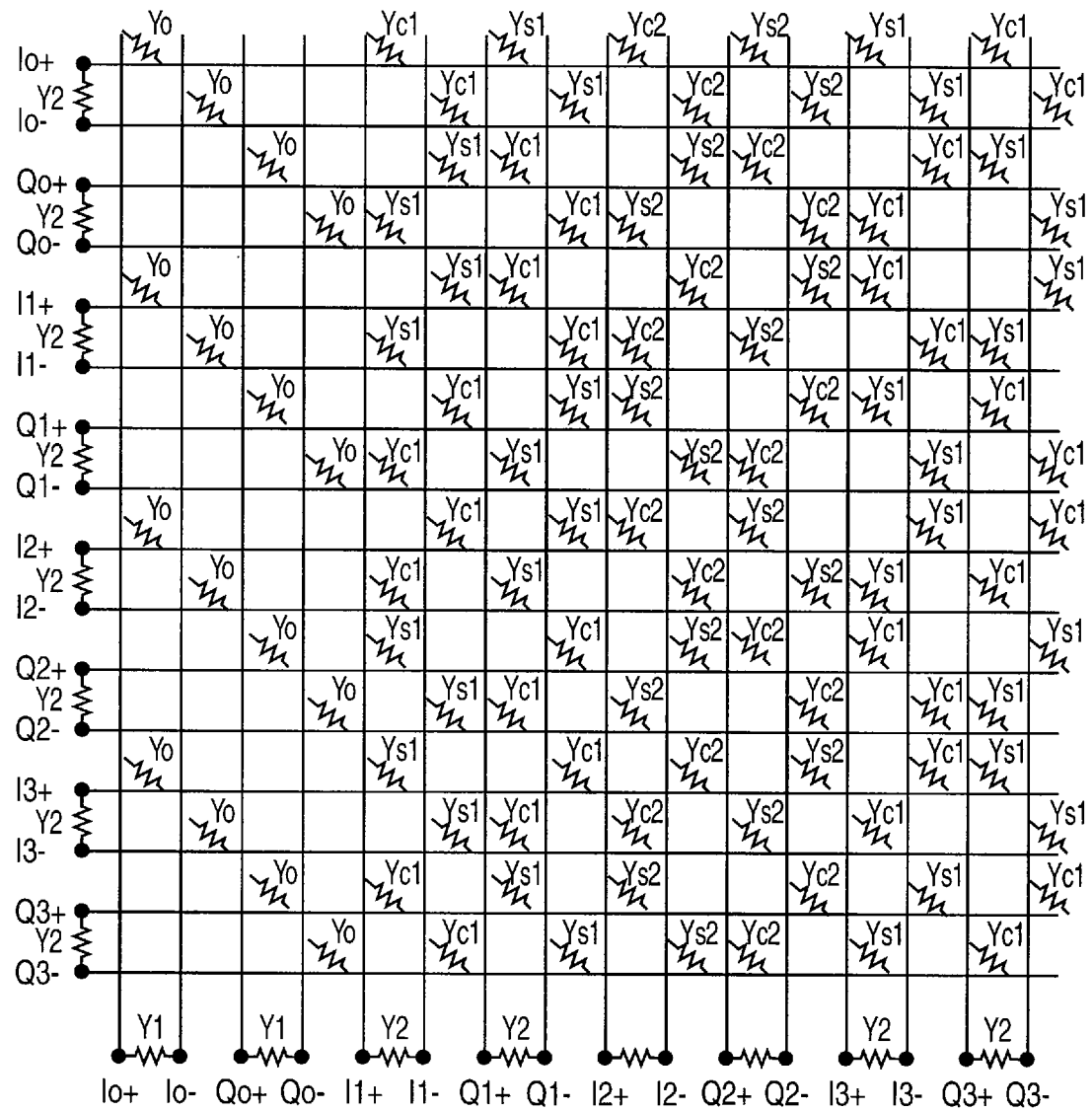
FIG. 17 shows an exemplary 4-point FFT circuit with pre-twiddling.

In FIG. 17, the admittance symbols refer to values:

$$Yc1 = Yo\cdot\cos(22.5)$$

$$Yc2 = Yo\cdot\cos(45)$$

$$Ys1 = Yo\cdot\sin(22.5)$$

$$Ys2 = Yo\cdot\sin(45) \quad (25)$$

Adding up the terminal admittances horizontally, input terminal admittances may be seen to be all equal to Yo+2Yc1+2Ys1+Yc2+Ys2, and the balanced input port admittance between pairs of terminals is half of this value. Adding up terminal admittances vertically, the output terminal admittances are seen to be:

terminal index 0: 4Yo terminal index 1: 4Yc1+4Ys1 terminal index 2: 4Yc2+4Ys2 terminal index 3: 4Yc1+4Ys1 (26)

The largest admittance is at output port 3 (terminal index 2), therefore shunt admittances are placed at all other ports to bring the total port admittance up to the value 2Yc2+2Ys2 of output port 3. This results in a shunt admittance of Y1=2 (Yc2+Ys2−Yo) at output ports index 0, Y2=2(Yc2+Ys2−Yc1−Ys1) at output ports indices 1 and 3, and then Yip=1.5 (Yc2+Ys2)−Ys1−Yc1−Yo/2 at all input ports.

In the above example of a pre-twiddled 4-point transform circuit, output port indices 1 and 3 have similar component values due to the twiddle angle of 67.5° being related to the twiddle angle of 22.5° through interchange of the cosine and sine. For other examples of twiddling, this is not necessarily so and the values Yc1 and Ys1, the use of which was repeated at port 3, would be replaced by different values Yc3, Ys3. Likewise, if it were desired to pre-twiddle port index 0 outputs, there would be values Yco and Yso disposed along the port index 0 output lines instead of Yo. However, the method of adding admittances along horizontal lines and vertical lines to determine total port admittance, and then equalizing to that of the highest port admittance of all transforms is the same procedure as already explained above.

It may be seen from FIG. 17 that the transform with pre-twiddled outputs no longer possesses input/output symmetry; however the scaling is equal and reciprocal. When capacitors are used as the admittances and the ports are tuned with an inductor to form an RF Butler matrix, the port Q-factors are also still equal. The transform circuit also has the property that the transform with input and output ports reversed is the conjugate transform, which is the inverse transform.

Instead of forming pre-twiddled outputs from the first stage of 4-point transforms in a 16-point FFT structure, it may also be arranged such that twiddling is performed at the inputs to the second stage of 4-point transforms. If an input is expecting a pre-twiddled value $Se^{j\Phi}$ and plans to couple it to an output with coupling factor $e^{j\theta}$, then if presented with a non-pre-twiddled value S, it couples it to the output with coupling factor $e^{j(\Phi+\theta)}$ in order to be equivalent.

The circuit of FIG. 17 will perform twiddling on input instead of output if inputs and outputs are reversed, but to avoid conjugation of the twiddle, the twiddle factors are also conjugated. This may be done by interchanging the Q+ and Q− terminals at all Q-ports, and also interchanging port indices 1 and 3 either at the input or at the output (but not both). The latter ensures that it is just the twiddle factors that are conjugated, and not the transform itself.

It is also possible to split the twiddle factor in any proportion between an output of the first stage transforms and the input of the second stage transform it feeds. For example, a transform circuit such as FIG. 17 could be constructed for twiddle factors of half the angles given in Table 7, and used for both the first and second stage transforms, with the input/output reversal described above for the second stage transforms. Table 8 below shows one possible division of the twiddle angles between the outputs of the first stage transforms and the inputs of the second stage transforms. The leftmost table of Table 8 relates to transforms along rows, while the rightmost table of Table 8 relates to transforms down columns. It may be seen that, since one table is the transpose of the other, the transform circuits are substantially identical, apart from the 90° twiddle which is discussed further below.

TABLE 8

| Twiddles on output of first stages | | | | Twiddles on input of second stages | | | |
|---|---|---|---|---|---|---|---|
| 0 | 0 | 0 | 0 | 0 | 0 | 0 | 0 |
| 0 | 11.25 | 22.5 | 78.75 | 0 | 11.25 | 2.5 | −11.25 |
| 0 | 22.5 | 90* | 67.5 | 0 | 22.5 | 0 | 67.5 |
| 0 | −11.25 | 67.5 | 101.25 | 0 | 78.75 | 67.5 | 101.25 |

*May be set to zero and implemented by I, Q connection rotation

The aim is to keep the twiddle angles as far from the 45°, 135°, 225°, and 315° points as possible, as twiddles of those angles may cause an increase in the total port capacitance, either attenuating the output signals more or resulting in higher Q factor and less bandwidth for an inductor-tuned realization. For that reason, the 67.5° twiddles were split into a twiddle of +78.75° and −11.25°, instead of two twiddles of 33.75°. The 90° twiddle was not split into 45° and 45° for the same reason, but left as 90° in the first stage and 0° in the second. This twiddle may be accomplished by switching the I and Q connections between the first and second stage for that particular connection, thus allowing identical sets of four transform circuits to be used for the first and second stages respectively.

Figure 18:
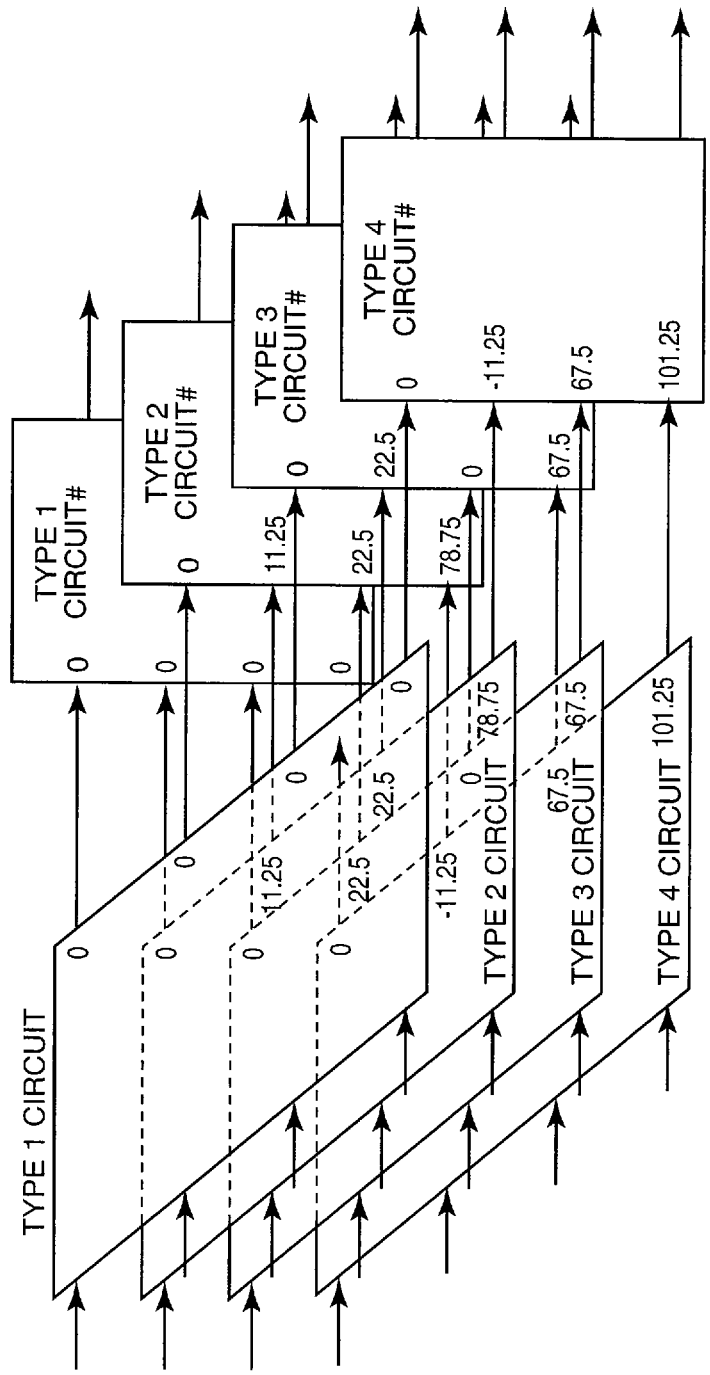
FIG. 18 shows an exemplary 16-point Butler matrix circuit.

Thus, a 16-point Fourier Transform circuit may be constructed as shown in FIG. 18. Examining the twiddle angles, it may be seen that four types of 4-point transform circuits may be used for both the first and second stages. The second stages are reversed and their connections permuted as discussed above to implement twiddling on input rather than twiddling on output. This way of using a circuit is distinguished in labeling the second stages by use of the conjugate transpose symbol #. The 90° twiddle is implemented by a rotation of the I+, Q+, I+, and I− signals upon connecting that output of the first stage type-3 circuit to the corresponding input of the second stage type-3 circuit.

Combined Filter and Butler Matrix Implementation.

The coupling circuit described herein may combine a transceiver bandpass filtering function with a Butler matrix operation. In so doing, this embodiment eliminates the need for both a Butler matrix circuit and a filter circuit between a transceiver and an antenna, which reduces throughput losses between the transceiver and antenna. For this embodiment, a resonator circuit is connected to each of multiple ones of the inputs and outputs. Each resonator circuit is configured to adapt the frequency response of the coupling circuit such that the coupling circuit has a bandpass frequency response comprising a desired bandwidth around a desired center frequency.

In one embodiment, the combination filter and Butler matrix is achieved by tuning the intermediate input and output interconnections between the stages. There are two ways to tune the intermediate input/output interconnections between the first stage circuits and the second stage circuits.

Figure 19A:
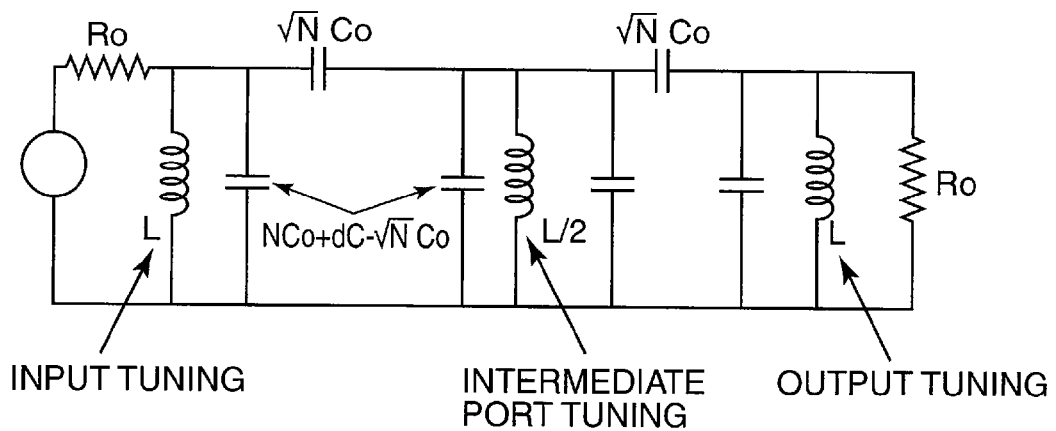
FIGS. 19A and 19B show exemplary filter circuits for a transform circuit.
Figure 20:
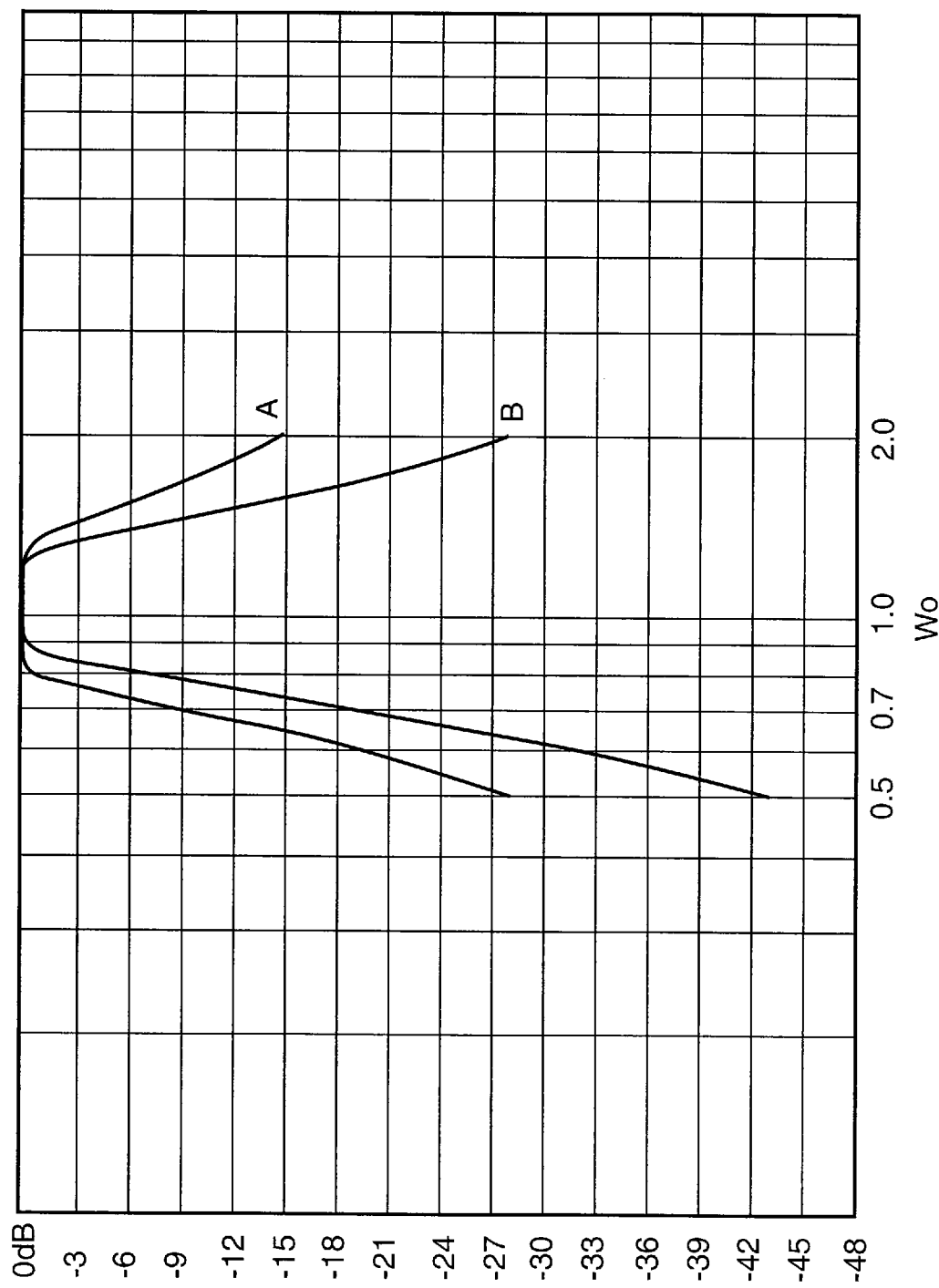
FIG. 20 shows the frequency response for the circuits of FIGS. 19A and 19B.

The first method uses shunt inductors of 0.5L to shunt the intermediate ports, where L is the inductance used at the leftmost input ports and rightmost output ports. This produces the overall input to output port frequency response of the bandpass filter structure of FIG. 19A. In FIGS. 19A (and 19B), dC signifies the extra capacitance over and above the minimum NCo caused by adding admittance equalization capacitors at the ports. Also Ro=1/(WoCo√N). Each 4-point transform is 2nd-order flat when tuned with equal inductors at input and output, and the cascade of FIG. 19A is automatically 3rd-order flat. A −0.25 dB bandwidth of approximately half an octave is achieved, and the frequency response is shown in FIG. 20, curve A.

Figure 19B:
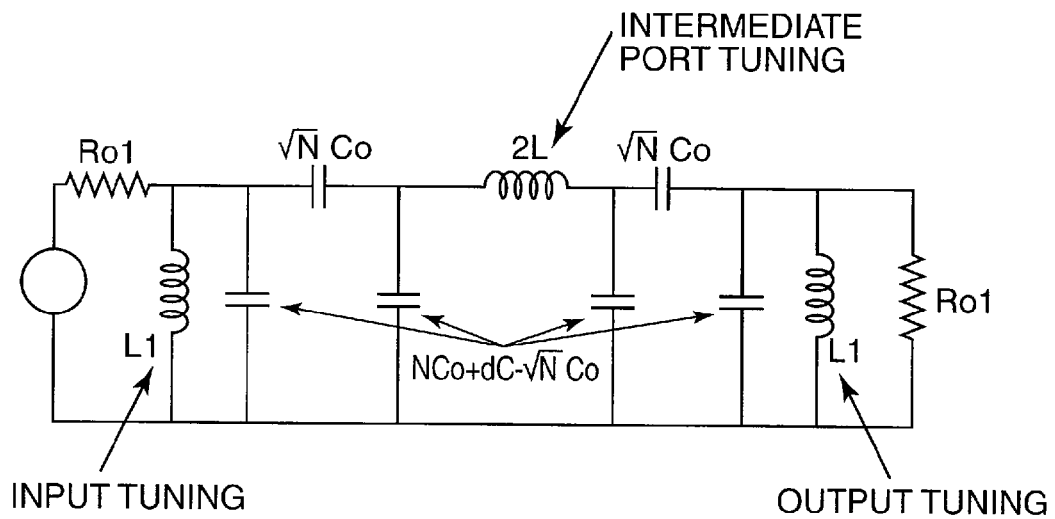

The second method is to connect a series inductance of 2L between each first stage output and each first stage input. This produces the frequency response of the bandpass filter of FIG. 19B, which is shown in FIG. 20, curve B. In FIG. 19B, the termination impedances are modified from Ro to Ro1 and the input and output tuning inductors are modified from L to L1, as discussed further below. The circuit of FIG. 19A has an asymmetrical frequency response when Q-factors are small. The circuit of FIG. 19B, however, is an exact transformation of a canonical bandpass filter structure and thus has a classical bandpass filter response, which is symmetrical on a logarithmic frequency scale. For the transformation involved in deriving FIG. 19B from a canonical bandpass filter, the input inductors are altered in value to resonate with a capacitance of:

$$NCo + dC - \frac{NCo^2}{NCo + dC}, \quad (27)$$

instead of NCo+dC. In addition, the termination impedances are increased to Ro1=1.4 Ro in order to obtain the flat frequency response of FIG. 20 curve B with the circuit of FIG. 19B. This is delving into the realms of filter design, and an advantageous approach, instead of designing a Butler Matrix Fourier Transform circuit first and then conforming it to a bandpass filter, is to start with a bandpass filter and then to derive a bandpass Butler Matrix from it, according to the method now to be described.

First, a canonical bandpass filter is designed having a desired center frequency, bandwidth, and terminating impedances. The order of the filter may be anything, but at least one more than the number of FFT stages into which it is planned to decompose the Butler Matrix DFT. If a maximum bandwidth, minimum loss solution is desired, decomposing the DFT into the maximum number of FFT stages is likely to be best—for example, a base-two or base-4 structure, if N is a power of two. In the just-explained 16-point transform example, a single 16-point transform with input and output tuning would have yielded a Butler Matrix with a $2^{nd}$-order flat frequency response and Q-factor of just over 4. The two-stage base-4 solution yields a $3^{rd}$-order flat response with a Q-factor of just over 2. The loss of the latter is slightly less than the former. In the case of a larger Butler Matrix, which, if realized in a single stage would have a higher Q-factor, the advantage of an FFT decomposition is larger. The loss in dB of various decompositions of an N=2m point Butler Matrix Transform designed for minimum loss and maximum bandwidth is given approximately by:

$$2n \cdot \log_{10}\left(1 + \frac{2^{m/n}}{Qu}\right) \quad (28)$$

for an n-stage FFT decomposition, where Qu is the unloaded Q-factor of the tuning inductors.

If a specific bandwidth is desired, which is narrower than the bandwidth of a single stage with no decomposition, then decomposing will only increase losses. When a specific bandwidth is desired that is narrower than the maximum achieved with a complete FFT decomposition, it is likely due to having to meet an out-of-band rejection requirement. In that case, the normal trade-offs of filter order versus bandwidth and loss specifications would first be made to arrive at a starting filter design. The order of the chosen filter would then determine into how many FFT sections the Butler Matrix could be decomposed. The number of points N of the Transform Circuit is also pre-supposed to have at least that number of factors. If the order of the filter needed to meet a selectivity requirement is greater than that needed to decompose the Butler matrix, then some of the filter sections may be left outside of the Butler matrix.

Figure 21A:
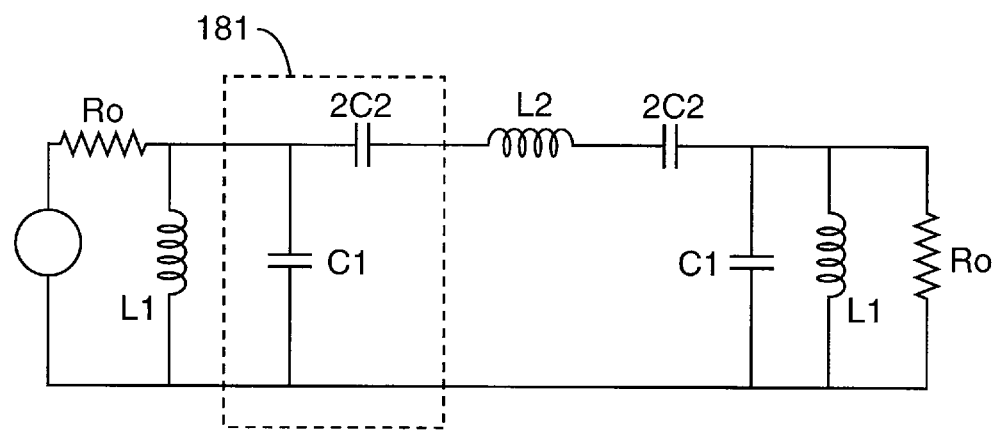
FIGS. 21A and 21B show exemplary canonical bandpass filter structures.
Figure 21B:
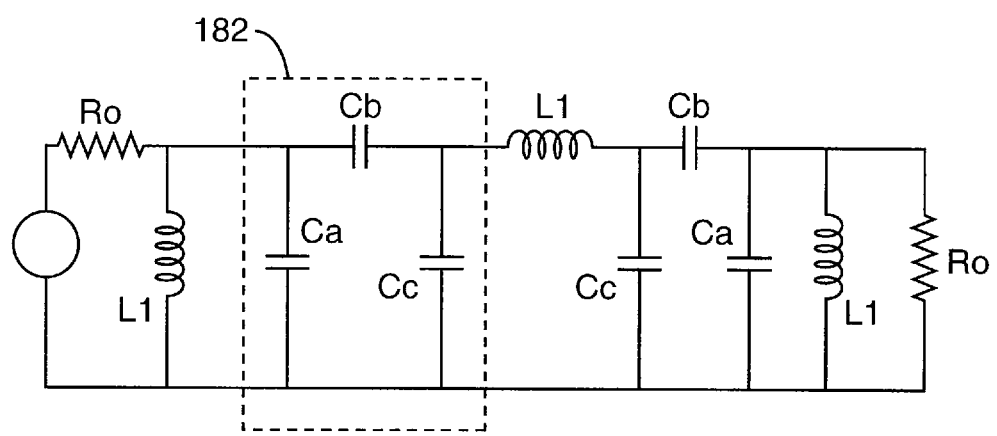

The canonical bandpass filter structure is shown in FIG. 21A, and is then transformed into an "impedance equalized" filter shown in FIG. 21B. The design of bandpass filters, such as those of FIG. 21A is well known in the art. A known practical problem with the canonical bandpass filter structure is that the ratio of L2 to L1 is of the order of QL2, where QL is the loaded Q or center frequency to bandwidth ratio. For example, for a 10% bandwidth, the ratio of L2 to L1 is of the order of 100, making L2 impractically large for narrowband filters. To overcome this problem with the canonical bandpass filter structure, the transformation of FIG. 21A to 21B aims to make all inductances equal to L1, and has been described in text books on circuit theory. The technique is to choose the values of Ca, Cb, and Cc such that the T-network 182 of Ca, Cb, and Cc is equivalent to the inverted-L network 181 of C1 and 2C2, followed by an ideal transformer of turns ratio n:1 with n=$\sqrt{L2/L1}$=$\sqrt{C1/C2}$. The equations for Ca, Cb, and Cc are:

$$Cc = 2n(n-1)C2 \quad (29)$$

$$Cb = 2nC2$$

$$Ca = \left(1 - \frac{2(n-1)}{n^2}\right)C1$$

which for the inductor-equalizing value of n=$\sqrt{C1/C2}$ gives:

$$Cc=2(C1-\sqrt{C1C2})$$

$$Cb=2\sqrt{C1C2}$$

$$Ca=C1+2C2-2\sqrt{C1C2} \quad (30)$$

The exemplary $3^{rd}$-order circuit is end-to-end symmetrical, but this is not a limitation. In the end-to-end symmetrical case, the impedance transformations n1,n2 for the first half of the sections is cancelled by the same impedance transformations reversed in the second half of the sections such that source and load resistances remain equal. In the case of non-symmetrical filters, the impedance transformations are chosen with the constraint that their product be unity, if it is desired to maintain equal source and load.

In the case of the balanced networks that have been proposed for constructing Butler Matrices, the inter-stage series inductors would be equal to half the input/output port tuning inductors when the design is based on the equal-inductor unbalanced prototype filter of FIG. 21B. Other transformations may be made to obtain non-equal inductors for the filter of FIG. 21B, if desired, which would yield other values of Ca, Cb, and Cc. For example, if the canonical filter is impedance transformed to yield a center inductor that it twice the end inductors in the unbalanced configuration, the inter-stage inductors will equal the end inductors in the balanced configuration. The value of n to achieve this is n=$\sqrt{C1/2C2}$, giving:

$$Ca=C1-\sqrt{2C1C2}$$

$$Cb=\sqrt{2C1C2}$$

$$Cc=C1+4C2-2\sqrt{2C1C2} \quad (31)$$

Figure 22A:
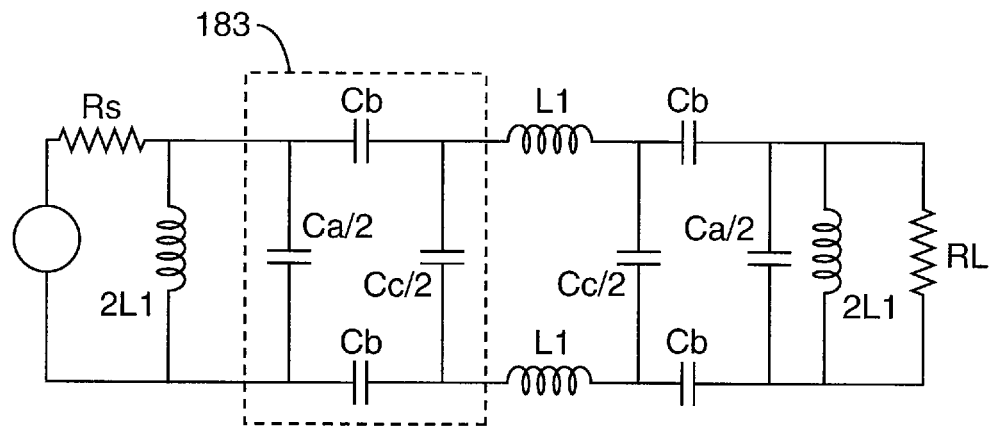
FIGS. 22A and 22B show exemplary balanced, impedance-equalized filters.
Figure 22B:
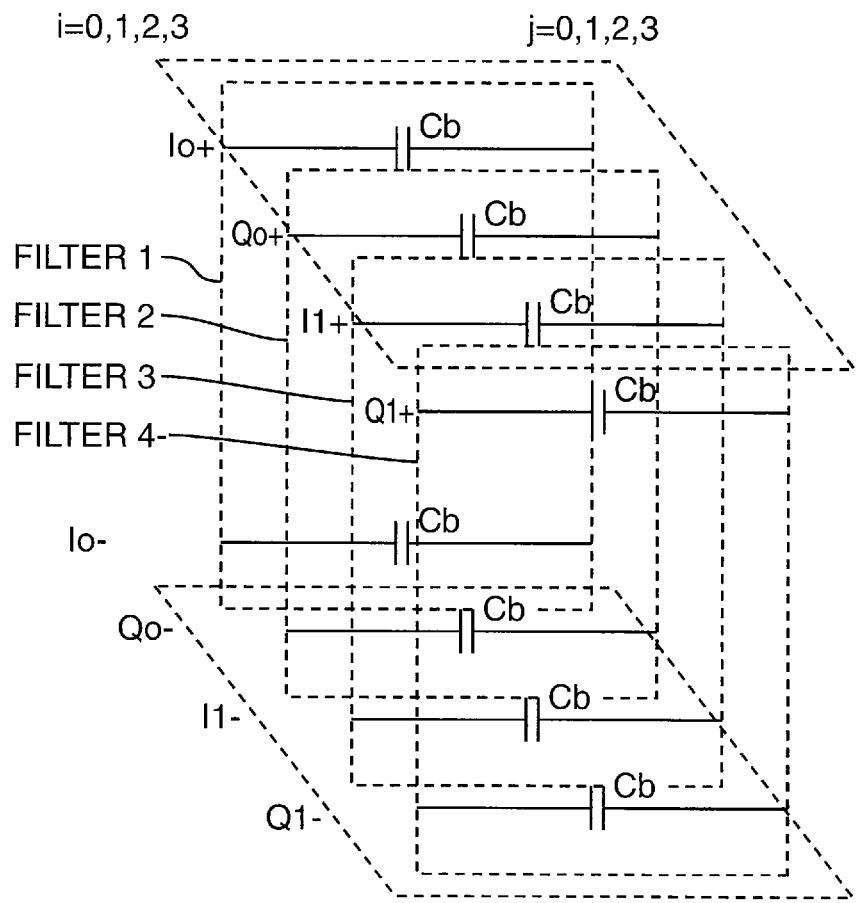

The conversion of FIG. 21B to a bandpass Butler Matrix then involves first using the balanced form of the filter in FIG. 22A and then replicating the filter 2N times, as depicted in FIG. 22B, the factor of 2 corresponding to In-Phase and Quadrature signal paths and the factor of N corresponding to the number of input and output ports desired. Then N is split into a number of factors less than the order of the filter, the maximum being the order of the filter minus one (e.g., 2, in the case of the exemplary 3rd order filter of FIG. 21B). Corresponding to the previous example of a 16-point transform, N=16 could be split into 4×4, or in general N=N1·N2.

N2 groups of 2N1 filters are then designated. Alternatively, if A 3-stage FFT decomposition is desired, using a $4^{th}$-order or higher order prototype filter as the starting point, and N=N1·N2·N3, then N2·N3 groups of 2N1 filters are designated. For each group, the N1 networks of capacitors 183 are replaced by a network of capacitors that provides the inter-filter couplings needed to realize the first, N1-point FFT stages with pre-twiddled outputs. This involves replacing the two planes of N1 capacitors Cb shown in FIG. 22B with a network of coupling capacitors such that:

1. the capacitance from In-phase terminal Ii+ to in-phase terminal Ij+ equals $Co \cdot cos(2ij\pi/N1+\theta_j)$;
2. the capacitance from In-phase terminal Ii− to in-phase terminal Ij− equals $Co \cdot cos(2ij\pi/N1+\theta_j)$;
3. the capacitance from Quadrature terminal Qi− to In-phase terminal Ij+ equals $Co \cdot sin(2ij\pi/N1+\theta_j)$;
4. the capacitance from Quadrature terminal Qi+ to In-phase terminal Ij− equals $Co \cdot sin(2ij\pi/N1+\theta_j)$;
5. the capacitance from In-phase terminal Ii+ to quadrature terminal Qj+ equals $Co \cdot sin(2ij\pi/N1+\theta_j)$;
6. the capacitance from In-phase terminal Ii− to quadrature terminal Qj− equals $Co \cdot sin(2ij\pi/N1+\theta_j)$;
7. the capacitance from Quadrature terminal Qi+ to Quadrature terminal Qj+ equals $Co \cdot cos(2ij\pi/N1+\theta_j)$; and
8. the capacitance from Quadrature terminal Qi− to Quadrature terminal Qj− equals $Co \cdot cos(2ij\pi/N1+\theta_j)$, The convention for the indices i and j is that they start at zero, $\theta_j$ is the desired pre-twiddle angle for output j of the transform in question, selected from Table 8 for example, and Co is chosen such that:

$$Cb^2 = Co^2 \sum_{j=0}^{N-1} \cos^2(2ij\pi/N1 + \theta_j) + \sin^2(2ij\pi/N1 + \theta_j). \quad (32)$$

Because the sum of the squares of the cosines and sines is N, Co =Cb/√N. The reason that the sum of the squares of the coupling capacitors equals $Cb^2$ is to ensure that the sum of the resistive load contributions from each output j reflected to any input i is the same as in the case of a single filter. On the other hand, the linear sum of the coupling capacitors from any input terminal equals the total terminal and port capacitance. The linear sum may be determined according to:

$$Co \sum_{j=0}^{N-1} \cos(2ij\pi/N1 + \theta_j) + \sin(2ij\pi/N1 + \theta_j). \quad (33)$$

The excess of the above over Cb is subtracted from Ca and Cc, without going negative, and corresponds to the need for the initial values of Ca and Cc to be augmented by at least the admittance equalization admittances shunting the ports in FIG. 17. If, upon subtracting the excess capacitance from Ca or Cc a negative result is obtained, then it signifies that the originally selected canonical filter bandwidth was too wide. The bandwidth should be reduced until all capacitors in positions equivalent to Ca and Cc are positive or zero after subtracting the excess as above.

The next step is to group the filters into Ni groups of N2 filters, or, in the case of a 3-stage FFT decomposition, N1·N3 groups of 2N2 filters. The two planes of 2N2 coupling capacitors Cb are then replaced as described above by capacitive coupling networks that yield N2-point transforms with twiddle-on-input. In addition, if a further stage of FFT decomposition follows, the second stage of FFTs not only twiddles-on-input, but also twiddles-on-output to match the requirements for mating with the $3^{rd}$ stage. Twiddling on input involves modifying capacitors that couple a given input to each output, while twiddling on output involves modifying the capacitors that couple a given output to each input. Thus all capacitors get modified twice when twiddling on both input and output takes place. This provides a further opportunity to distance the net effect on total capacitance from the worst case increase caused by 45° twiddles.

Thus, by starting with a bandpass filter of desired bandwidth, impedance transforming it to rationalize the values of inductors, replicating the filter to obtain 2N uncoupled filters, and then replacing the sets of 1:1 inter-section couplings with sets of one-to-many/many-to-one couplings to produce a set of 2N coupled filters, a bandpass Butler Matrix may be synthesized. The examples given herein have concentrated on so-called top-capacitance coupling, but other forms of coupling may be used—for example top-inductive coupling, mutual inductive coupling, or quarter-wave lines. All forms of coupling between resonators to form a bandpass filter may be shown to have the property of an impedance inverter, which has the chain matrix:

$$\begin{bmatrix} 0 & jZo \\ jYo & 0 \end{bmatrix}, \quad (34)$$

and this is the chain matrix of a quarter-wave line. The latter may be a practical construction for higher frequency, e.g., microwave, circuits, while capacitive coupling may be more practical below 300 MHz.

As disclosed earlier herein, to equate to the conventional Butler matrix, a quadrature coupler is used at each I,Q input and each I,Q output, with the result that a pair of nominally independent Butler Matrices is thereby synthesized. In certain applications, these couplers may not be necessary. An example of the use of a bandpass Butler Matrix will now be given for reducing the RF losses in a communications satellite, showing how the quadrature couplers could be omitted under certain circumstances.

Butler Matrix Implementation with Antenna.

Figure 23:
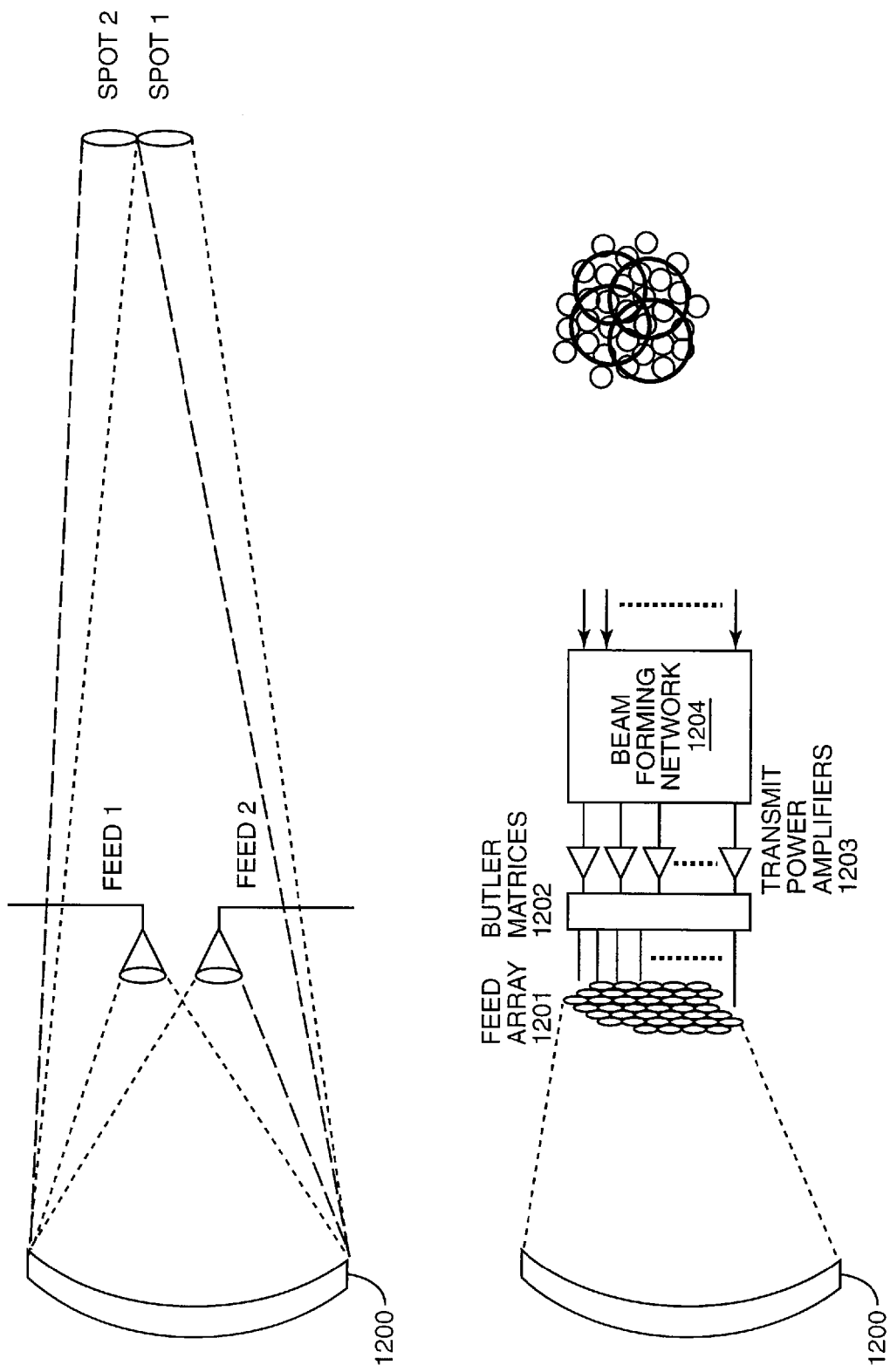
FIG. 23 shows a multiply-fed parabolic antenna for geostationary satellite communications.

FIG. 23 shows the multiply-fed parabola antenna used in geostationary communications satellites to create multiple spot beams. In geostationary orbit, and when only partial-earth coverage is desired, as in a regional communications satellite, the geometry is more favorable to the use of a multiply-fed parabolic reflector antenna as opposed to a directly-radiating phased array of antenna elements (DRA). Lower orbits or greater coverage requirements favor the use of DRAs. Wide-coverage, low earth orbit systems (LEO) have not proved economic, and most surviving successful systems are regional coverage, geostationary systems (GEO).

The multiply-fed parabolic antenna uses an array of feed elements 1201, an image of which is in principle focused on to the ground by the curved reflector 1200, thus creating a corresponding set of spot beam coverage areas on the earth. However, there may be difficulties in getting two feeds such as feed 1 and feed 2 close enough together to form contiguous spots on the ground. This because a large feed is required to produce an accurate reflector illumination pattern, which is ideally uniform illumination of the reflector with no spillover. Feeds which would approximate this ideal feed pattern would be so large that they would mechanically overlap. This is solved by using many smaller feeds, and feeding groups of them to synthesize a desired reflector illumination pattern. The groups that are fed for one signal may overlap with the groups that are fed with another signal, thus each feed is fed with the sum of several signals, the sum being created before power amplifiers 1203 by beamforming unit 1204. In the case that each power amplifier connects one-for-one to each feed element, the power output for a power amplifier would be proportional to the amount of traffic in the vicinity of the geographical region corresponding to that feed element, and thus not necessarily all equal. To obtain more equal loading of all power amplifiers 1203, a Butler Matrix is used to divide all signals between all power amplifiers in equal proportions but in orthogonal ratios to preserve separability. The input Butler matrix may be a true digital FFT and absorbed into the beamforming network 1204. The output Butler Matrix separates the signals once more to their intended feed elements by performing the inverse Transform using a low-loss RF network. Typical numbers of power amplifiers are in the range 64 to 128, but Butler Matrices of the full size have not been used hitherto because of complexity. Instead, groups of 8 geographically separated feeds are typically selected to be coupled to 8 power amplifiers via an 8+8-port Butler matrix.

Figure 24:
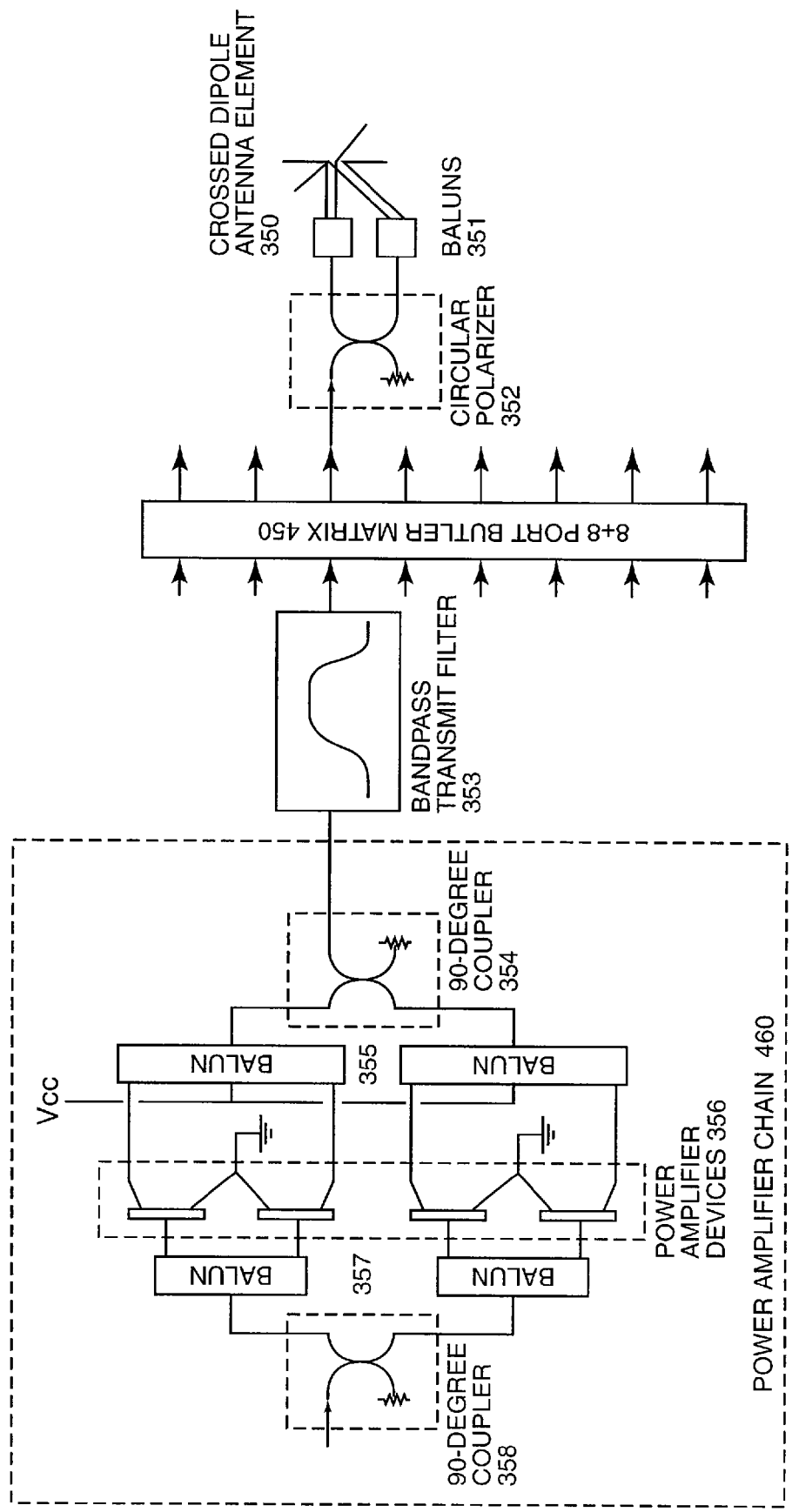
FIG. 24 shows an exemplary transmitter path from the power amplifier to the antenna.

FIG. 24 expands in more detail the RF path between a power amplifier and an antenna element, and includes some details about likely antenna element construction. Typically, a satellite transmits circular polarization so that it may be received using a simple linearly polarized antenna without concern about orientation, as would be the case with cell phones for example. A common circularly polarized antenna used for reflector feed elements or for a DRA element is a crossed cup-dipole. Two half-wave dipole antennas at right angles are contained within a cup-shaped cavity that serves to reinforce radiation in the desired direction. The two crossed dipoles 350 would typically be driven by a BALUNS 351 to convert from symmetrical to a single-ended connections, and then fed 90° out of phase using 90° coupler 352 in order to generate circular polarization. The whole antenna array may comprise many such elements (350,351,352) and groups of 8 are typically connected to groups of 8 power-amplifier chains such as power amplifier chain 460 via an 8+8 port Butler matrix 450.

At some point, either before or after the Butler Matrix 450, a bandpass transmit filter 353 is used to limit the transmitted spectrum, and in particular, to suppress noise at the receiver frequency. The receiver may be connected to the other port of coupler 352 in order to receive using the opposite polarization, or may be connected via a receive filter to a transmit filter 353 to form a transmit/receive duplexer, which is discussed later.

Power amplifier chain 460 itself comprises multiple elements. Pairs of power amplifier devices 356 form push-pull amplifiers which are connected via push-pull output transformers or BALUNs (355) at their outputs to form single ended connections and likewise by push-pull drive transformers or BALUNS (357) at their inputs. For simplicity, input/output tuning and matching components are not shown, but are typically necessary for high frequency operation. Two such push-pull amplifiers may be driven 90O0 apart by input coupler 358 and their outputs combined by output coupler 354. It may be seen that the RF path between power amplifier devices 356 and the radiating elements 350 comprises a plurality of elements in cascade—BALUNs 355, coupler 354, filter 353, Butler Matrix 450, circular polarizer 352, and BALUNs 352, all of which contribute to losses and inefficiency.

Figure 25:
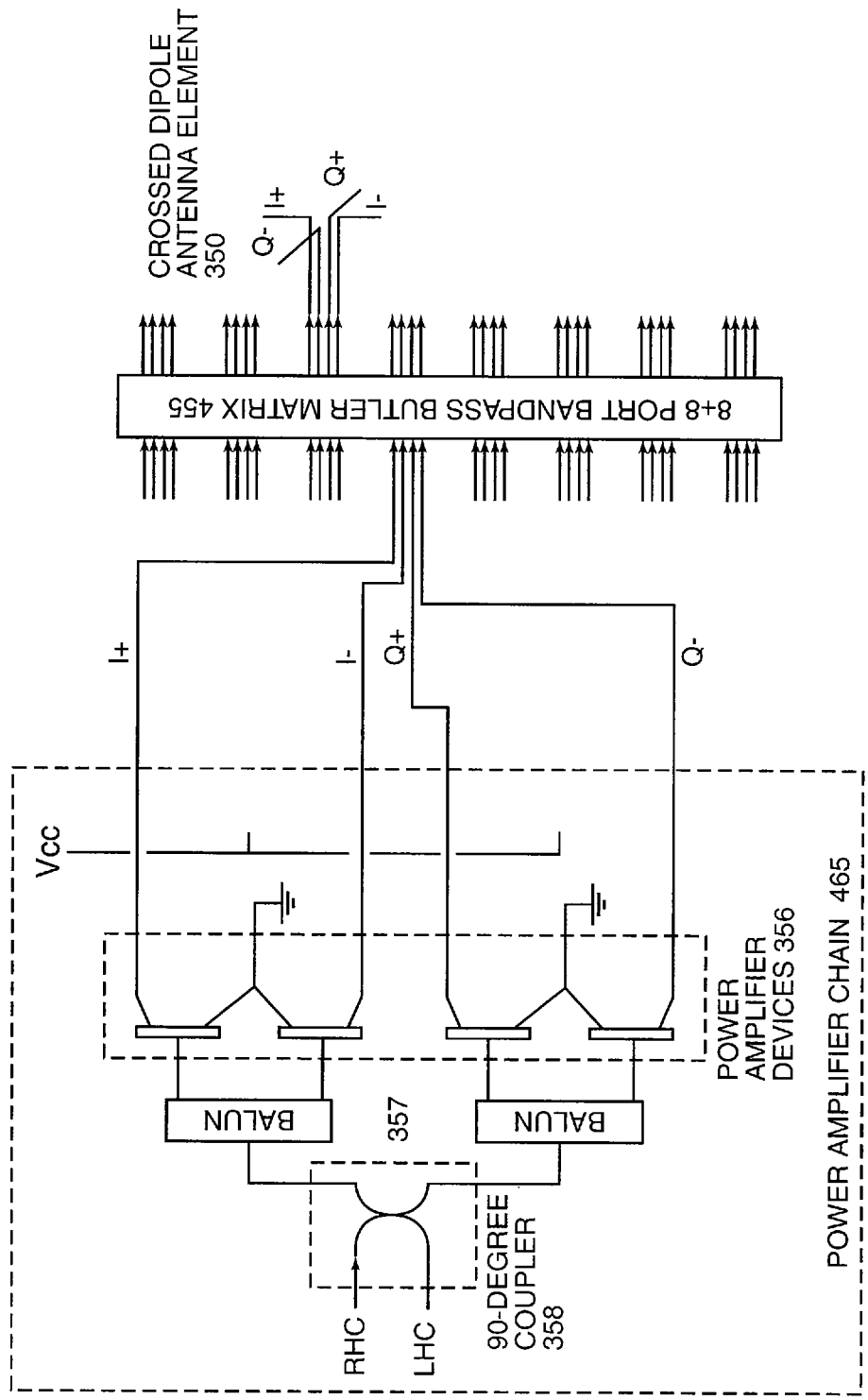
FIG. 25 shows an exemplary transmitter path according to the present invention from the power amplifier to the antenna.

FIG. 25 shows how the number of elements in the RF path may be reduced by using the inventive bandpass Butler Matrix described herein. After the outputs of power amplifier devices are tuned and matched, they no longer need to be combined with BALUNs 355 as the inventive balanced bandpass Butler matrix accepts balanced inputs. In addition, there is no need to combine the outputs of power amplifiers 356 with coupler 354, as the Butler matrix 455 just requires the input signal to be split once more into quadriphase signals I+, Q+, I−, and Q−. Therefore the quadrature couplers 354 at the outputs of the power amplifiers 460 and the quadrature couplers 700-1 to 700-N of FIG. 11 annihilate each other, and may be omitted.

The bandpass filters 353 may also be eliminated, as the bandpass characteristic of the bandpass Butler matrix may be made to have exactly the same frequency response with the same losses when constructed with resonators of the same Q-factor. Thus, instead of the loss of bandpass filters 353 adding to losses of Butler Matrix 450, the bandpass Butler Matrix 455 has the same loss as a bandpass filter 355 with the same frequency response, which is equivalent to eliminating the loss of Butler matrix 450. Moreover, the inventive Butler matrix directly outputs quadriphase signals I+, Q+, I−, and Q− suitable for driving the crossed dipoles directly, without quadrature coupler 352 or BALUNs 351.

One advantage of the circuit for FIG. 25 is that it is now possible to transmit either of both polarizations, e.g., Right Hand Circular (RHC) or Left Hand Circular (LHC) by using the other input of input coupler 358. If mechanical layout results in the simplified power amplifier chains 465 or the simplified antennas 350 being remote from the bandpass Butler matrix 455, it is suggested that they be connected via quadrifilar coaxial cable, specifically constructed for the quadriphase signals I+, Q+, I−, and Q− described herein. Such a quadrifilar coaxial cable would have four symmetrically disposed inner conductors insulated from one another inside an outer screening sheath.

It is highly desirable to receive, if not to transmit, using both polarizations. This is because the forward link (base station or satellite to mobile terminal) may always be closed by reducing capacity to transmit more power to each of a smaller number of terminals. However, reducing capacity does not assist in closing the uplink (mobile terminal to base station or satellite) where each mobile terminal stands alone. Therefore it is desirable to capture all energy in whatever polarization arrives from the mobile terminal. For dual polarization reception, one receive polarization is the same as a transmit polarization. Thus, the receiver may not simply be coupled to the opposite port of circular polarizer 352.

Figure 26:
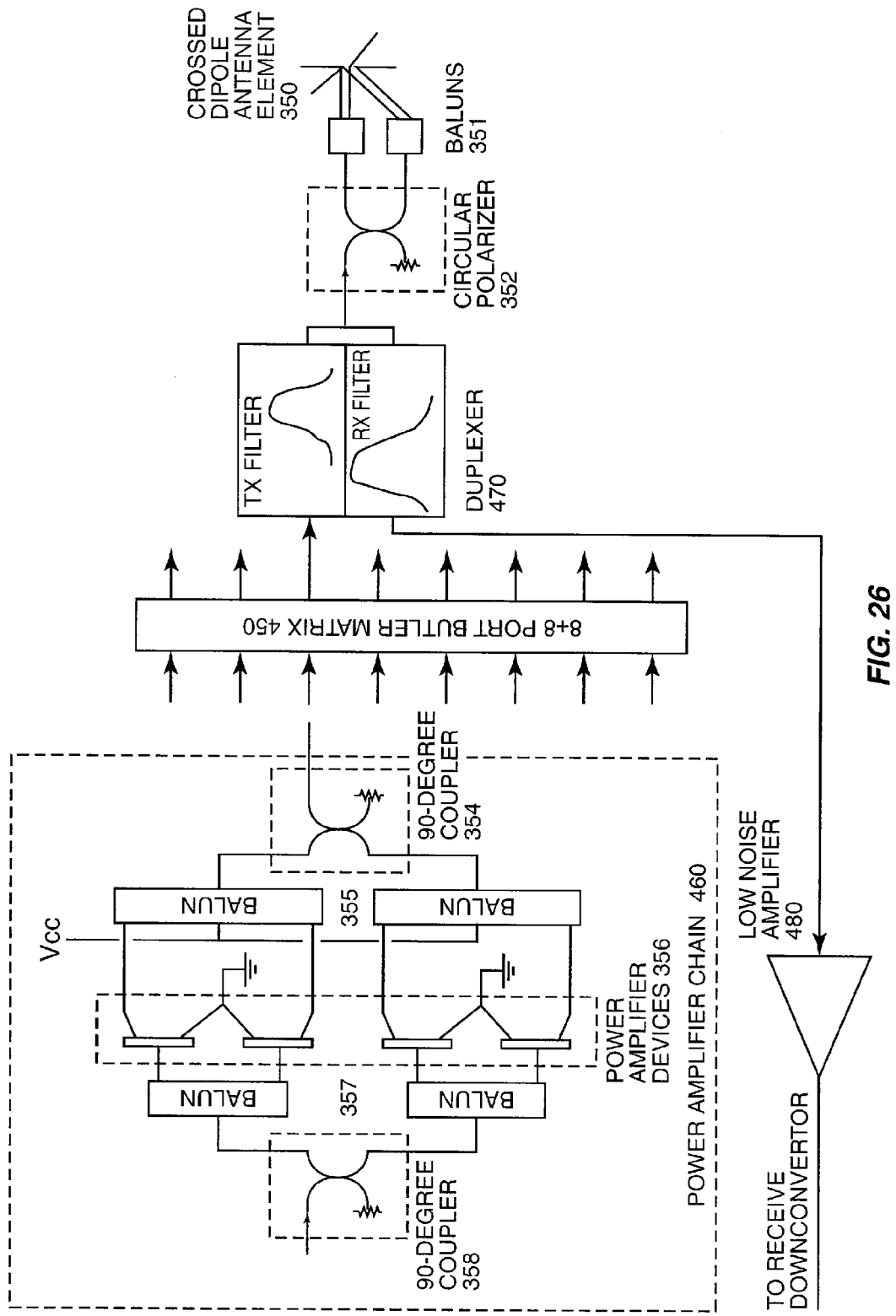
FIG. 26 shows an exemplary transceiver path between the amplifier and antenna.

To connect a transmitter and receiver to the same antenna polarization, a duplexing filter is used. The conventional solution would thus be as shown in FIG. 26. In the past, it has not been thought desirable to incur the loss of a Butler Matrix in the receive path, as the issue of geographical power distribution and intermodulation dilution apply only to transmission. Therefore, the receive path would be split off prior to the transmit Butler Matrix using duplexing filters 470. Thus the bandpass filter and Butler matrix in FIG. 26 are in the reverse order to that of FIG. 24. The duplexer 470 comprises a transmit filter similar to transmit filter 353, and a receive filter, the outputs of which are connected together to the antenna in a special way to avoid one filter adversely affecting the other. For example, they may be connected using transmission line lengths chosen such that the receive filter impedance at the transmit frequency is infinity at their common junction, and vice versa. Received signals separated from transmit signals by duplexer 470 are then fed to low-noise amplifier 480 and then to the rest of the receiving system. For dual polarization reception, another receive filter similar to that forming part of duplexer 470 would be connected to the unused port of circular polarizer 352 (shown terminated in a resistive load in FIG. 26) and to another low noise amplifier. Therefore there is always one receive filter per low noise amplifier/antenna connection.

When using the inventive bandpass Butler matrix, the collection of receive filters may be converted into a dual bandpass Butler matrix, one for each polarization, with in principle no additional loss. A set of bandpass filters is turned into a bandpass Butler matrix simply by altering the coupling between filter sections to provide inter-filter as well as intersection coupling in the correct proportions correspond to Fourier coefficients.

Figure 27:
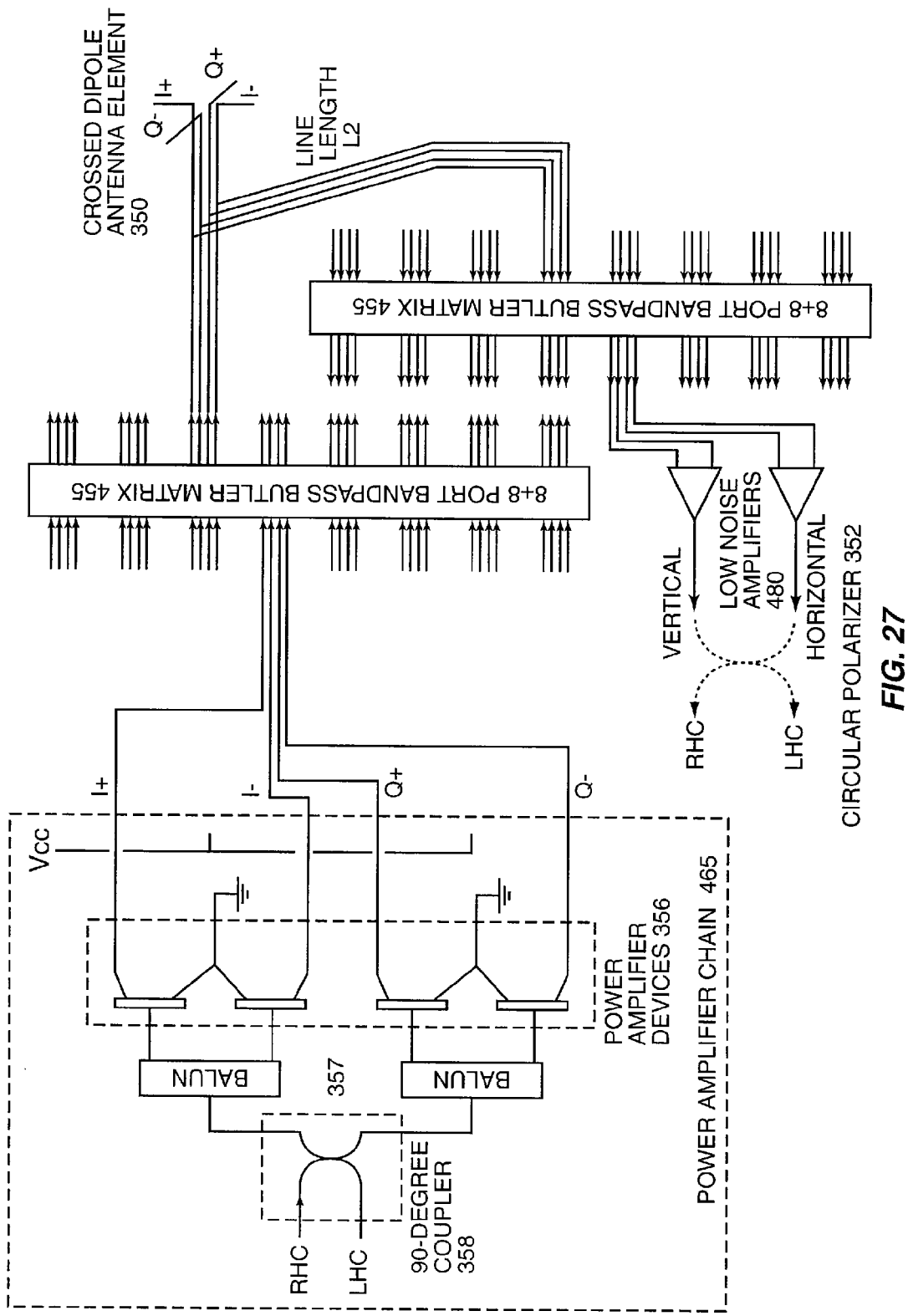
FIG. 27 shows an exemplary transceiver path using separate transmit and receive Butler matrices.

FIG. 27 shows how the inventive bandpass Butler Matrices may be used to facilitate dual polarization receive and transmit. In FIG. 27, a receive bandpass Butler matrix 456 is now connected together with the transmit bandpass Butler matrix to each dual-polarization antenna element 350. Because each bandpass Butler Matrix has substantially the same selectivity and port impedance characteristics as the prototype bandpass filter from which it was derived, a port of the receive Butler matrix may be connected to a port of the transmit Butler matrix in exactly the same way as a transmit filter is connected to a receive filter to form a duplexer such as duplexer 470. The connection occurs via a line length L1 from the transmit Butler matrix port to the common junction, where L1 is chosen so that the impedance at the common junction reflected from a transmit port is infinity at the receive frequency, and via a line length L2 from the receive Butler matrix port chosen such that the impedance at the common junction reflected from the receive Butler matrix is infinity at the transmit frequency. The I+, I− signal from each receive Butler matrix output port is fed to a low noise amplifier 480 for one receive polarization, and the Q+, Q− signal is fed to a second low noise amplifier 480 for the other receive polarization. If these polarizations are linear, e.g., horizontal and vertical, then a circular polarizer 352 may optionally be connected to the low noise amplifier outputs to provide RHC and LHC received signals. The small loss of the polarizer 352 is not so significant after low noise amplification.

It is not necessary for a given receive Butler matrix 456 to connect to the same group of antenna elements 350 as a transmit Butler matrix. For example, an 8+8 port receive Butler matrix may connect to antenna elements number 1, 9, 18, 37, 52, 61, 73 and 90 while a transmit Butler matrix may connect to antenna elements 1, 10, 21, 33, 52, 61, 75 and 91, some being the same, and some being different. It is assumed that transmit beamforming ahead of power amplifiers 465 and receive beamforming after LNAs 480 may handle any combination of connections to form any desired beams.

It is not even necessary for a quadriphase Butler matrix port to connect to the two polarizations of the same antenna element. There are cases when it would be desirable to connect each transmit Butler matrix output port to opposite polarizations of different antenna elements, and cases where one port should be connected to both polarizations of the same antenna element. For example, if the ground terminal receive antennas have a well defined polarization and responds only to signals of that polarization, it may be advantageous if intermodulation that occurs between different signals passing through power amplifiers 465 is divided between the two polarizations, thus reducing the amount of intermodulation by 3 dB in the polarization to which the receiver is sensitive. On the other hand, if the ground receiving terminals have indeterminate polarization, it is better if intermodulation has the same polarization as the wanted signal, so that they are both attenuated equally by polarization mismatch. In the former case, it may even be possible to drive power amplifiers 465 so that, in any given direction, the wanted signals are radiated with one polarization and intermodulation is radiated with the opposite polarization, by using the techniques described in U.S. Pat. Nos. 5,568,088; 5,570,062; 5,631,604; 5,732,325; 5,771,444; 5,818,298; 5,842,140; 5,933,766; and 6,233,436, all to current Applicant, and all of which are hereby incorporated herein by reference. The basic technique is to direct unwanted modulation to outputs, antennas, directions, or in this case polarizations, that are not used for wanted signals.

Mobile communications systems usually operate at high frequencies in the 1 GHz to 2 GHz region, where spectrum is available to achieve high capacity. In this frequency range it may not be convenient to construct circuits using lumped inductors and capacitors. Typically, coaxial resonators would be used, and sometimes, and particularly at higher microwave frequencies, waveguide cavity resonators are used. An encyclopedia of high frequency filter design techniques is authored by Mattheai, Young, and Jones, entitled "Microwave Filters, Impedance Matching Networks and Coupling Structures" and provides guidance on the techniques suitable for different frequency ranges. A particular requirement for constructing Butler matrices to the current invention is the provision of resonant circuits that have a balanced, or in-phase and anti-phase terminal, e.g., I+ and I−, or Q+ and Q−.

Figure 28:
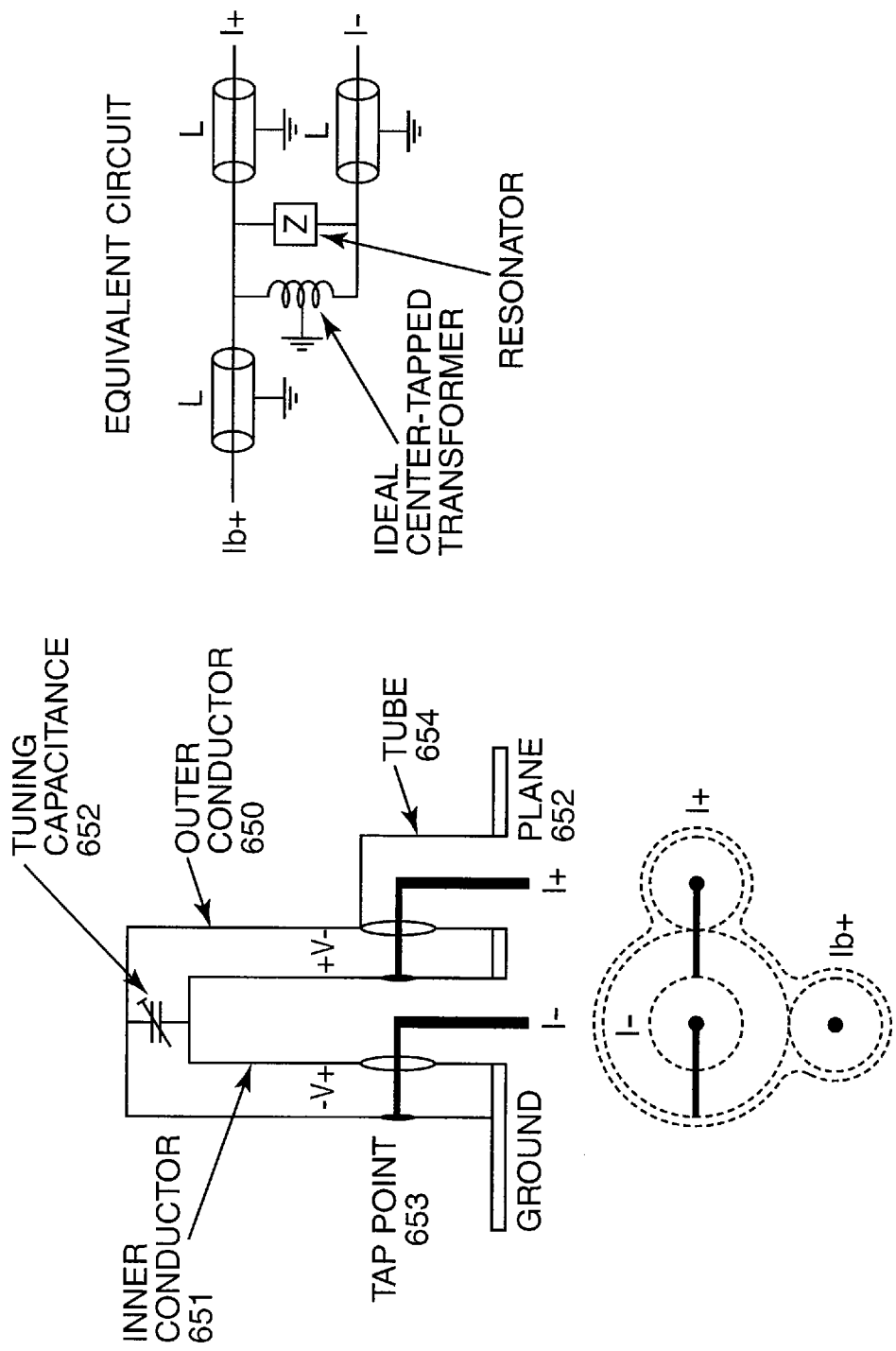
FIG. 28 shows an exemplary coaxial resonator according to the present invention.

Accordingly, FIG. 28 discloses a coaxial resonator which provides this property. A large diameter tube or pot 650 of highly conductive material, such as silver plated metal, forms the outer conductor of a coaxial resonator. An inner tube 651 forms the inner conductor, and is shorted to the outer conductor at the lower end to form a ground plane 652. The inner conductor is free or open circuit at the top end, and resonates at the frequency where it was an odd number of quarter wavelengths long. Tuning capacitance, which may be no more than a screw (652) is used to adjust the resonant frequency by altering the capacitance between the inner and outer conductors at the open end. The impedance of the resonator is high at the open "hot" end, but reduces to zero at the ground plane end. At a suitable intermediate position where the impedance is a desired level, a tap 653 is created. At the tap position, a voltage V exists between the inner and outer conductor, which is denoted + at the inner conductor and − at the outer conductor. FIG. 28 shows two methods of tapping into this intermediate point voltage. The first, labeled the I+ line, taps the voltage V by going through a hole in the outer conductor to the inner conductor. The second, labeled the I− line, goes through a hole in the inner conductor to the outer conductor. Therefore, if the first taps out a voltage +V, the second taps out a voltage −V, and hence the two taps are in anti-phase, as desired. The I− tap is brought out through the hollow end of the inner conductor, and forma a short length of coaxial cable with the resonator's inner conductor being the cable's outer conductor. Accordingly, the I+ tap is also brought out through a tube 654 of the same diameter as the resonator's inner conductor so as to preserve total RF equality between the two taps, apart from them being in anti-phase. In order not to disturb symmetry between the I+ and I– connections, a third tap Ib+ is provided at right angle to the I+ and I– taps, as may be seen in lower cross section. The equivalent circuit of the resonator and its two taps is shown on the right of FIG. 28. The short line lengths L correspond to the length of the tap wires. If Ib+ is used as the input, I+ and I– are used as the anti-phase outputs, or vice versa.

A number of such resonators corresponding to the number of sections desired in each filter and the number of Butler matrix ports may be attached in close proximity on the same ground plane with their I+ and I– connections (and Q+ and Q– connections for the quadrature signal resonators) protruding through holes in the ground plane to the other side, where a coupling network may be implemented in stripline technology, for example.

It may be shown that all methods of coupling like resonators to form a filter equate to a quarter wave line, as they all have the chain matrix of an impedance inverter, of the form:

$$\begin{bmatrix} 0 & jZo \\ j/Zo & 0 \end{bmatrix}. \quad (35)$$

Figure 29A:
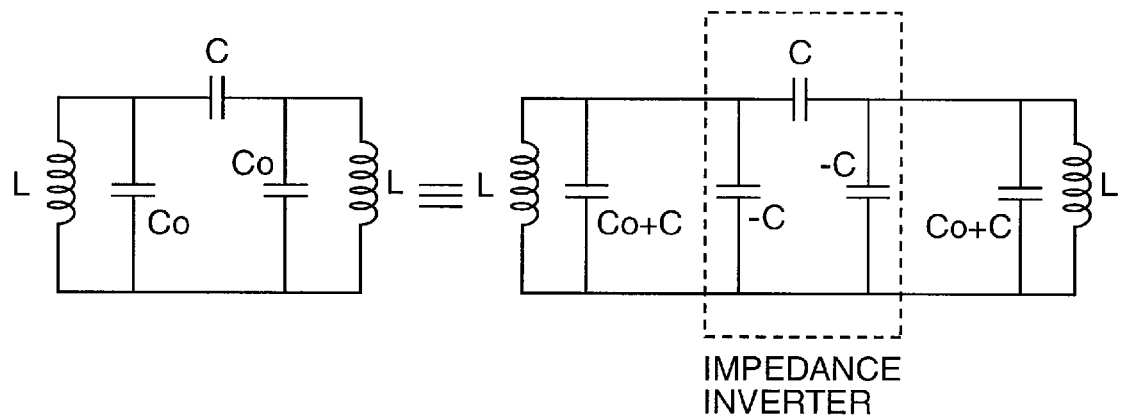
FIG. 29A shows a top-capacitance coupled filter.
Figure 29B:
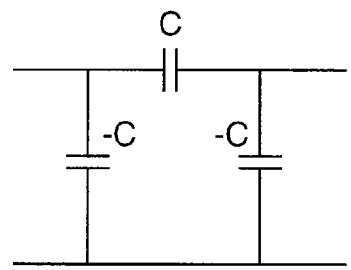
FIGS. 29B and 29C show the effective coupling network and the resonators for the top-capacitance coupled filter of FIG. 29A.
Figure 29C:
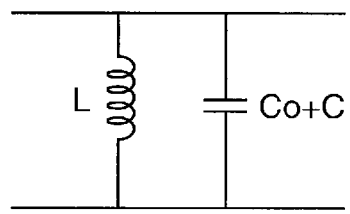

For example, the top-capacitance coupled filter shown in FIG. 29A has an effective coupling network shown in FIG. 29B between resonators shown in FIG. 29C, which has the chain matrix:

$$\begin{bmatrix} 0 & -j/WoC \\ -jWoC & 0 \end{bmatrix}. \quad (36)$$

The equivalent quarter wave line impedance is thus –1/WoC. In high frequency filters however, a true quarter wave line may be used as a coupling element. The impedance at the input of a quarter wave line of impedance Zo terminated with an impedance Z is $Zo^2/Z$. Since Zo appears squared, it does not matter whether the equivalent line impedance is positive, as in the case of a real transmission line, or negative, as in the case of the above capacitive coupling circuit.

Figure 30:
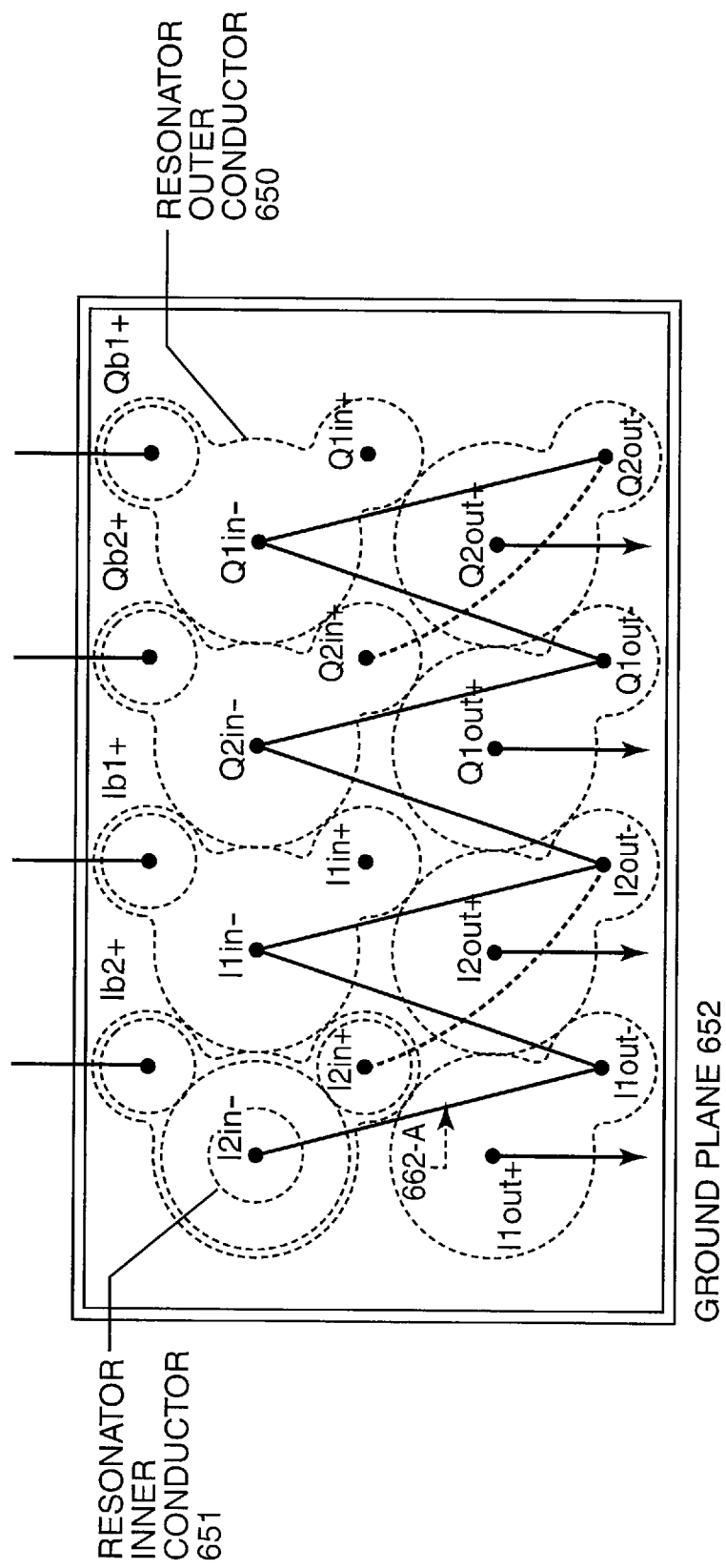
FIG. 30 shows a coupling process for coupling resonators with quarter wave lines.

FIG. 30 shows how the resonators of FIG. 28 may be coupled with quarter wave lines to form couplers having a bandpass characteristic, or filters having a coupling characteristic. Eight resonators of the type of FIG. 28 are attached to a common ground plane 652. The resonator + and – taps protrude through holes in the ground plane so that they connect via quarter wave coupling lines, such as 661-A, 661-B, 662-A, and 662-B. The designation of a pair of resonator taps as a + tap and a – tap is arbitrary, and may be reversed to facilitate layout. Coupling line 661-A and 662-A connect the resonator taps designated as I2in– and I1in– to I1out–. Because these are all of the same sign, this effectively forms the sum of signals I1in and I2in at the I1out port. Coupling lines 661-B and 662-B connect the resonator taps designated I1in– and I2in+ to I2out–. This makes I2out–=I2in+–I1in–, which is equivalent to making I2out+=I1in+–I2in+, thereby forming the difference of the two input signals. Lines 661-A and 662-A and lines 661-B and 662-B are shown with different dash markings to signify that they may be on different layers of a multilayer stripline interconnect pattern, allowing crossovers. The structure of FIG. 30 thus realizes four, second-order bandpass filters plus a sum-and-difference function for pairs of inputs. A sum and difference function is the most primitive operation used in base-2 FFT decompositions of DFTs, known as a Butterfly circuit. In FIG. 30, the coupling line impedances should be $\sqrt{2}$ times the input and output port impedances to provide a second-order flat frequency response characteristic.

Figure 31:
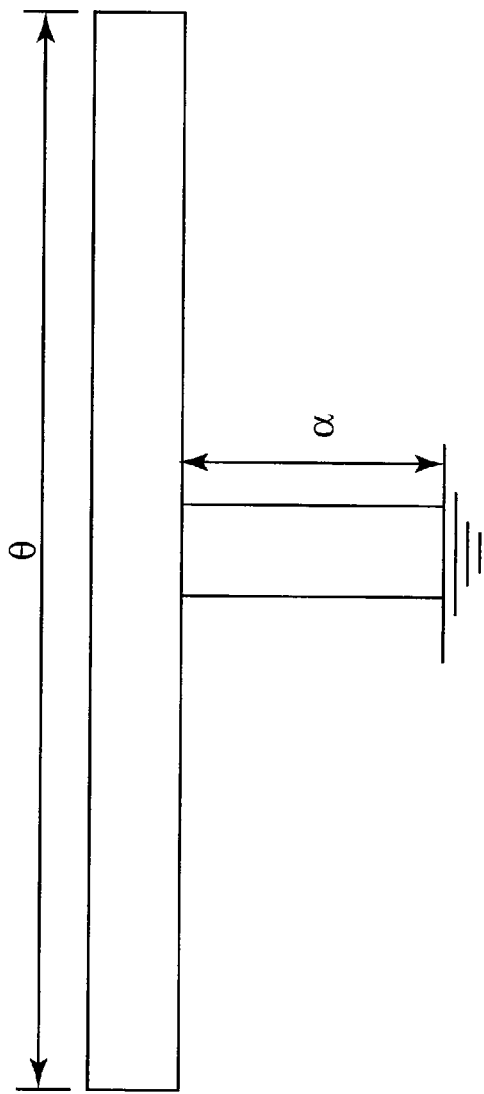
FIG. 31 shows an exemplary coupling line.

In FIG. 30, the distances between pairs of points to be connected are all roughly the same, and so may be interconnected using exactly equal quarter-wave lines, which would be of length 5 cm in air at 1500 MHz for example, or 3.5 cm in a material of dielectric constant equal to 2.0. The equivalent line length L of the tap connection shown in the equivalent circuit of FIG. 28 may be absorbed into the coupling line lengths used with a small approximation. Taps to which coupling lines are attached are preferably not also used as input or output connections. This is the reason that the third tap, Ib+, is provided, and used for the input taps. The I– taps are free to be used for the output connections, and those resonators do not, at least in this instance, need the third Ib+ taps. The existence of three taps however allows coupling line connections other than those shown in FIG. 30 to provide the same functionality. For example, by using all the available taps appropriately for input, output and coupling lines, it is possible to avoid crossovers and allow a single plane of coupling line connections. Thus, no topological difficulties arise in FIG. 30. A topological difficulty may arise when the points to be interconnected by a quarter-wave line are more than a quarter wavelength apart. Solutions to this are to employ ¾-wave lines connected to the inverse resonator tap polarity to compensate for the 180° phase shift of the extra half wave of line length, which is permissible when the bandwidth desired is not great, or to employ the structure of FIG. 31. The structure of FIG. 31 is equivalent to a quarterwave line when:

$$\theta=180°-\arctan(2\tan(\alpha)), \quad (37)$$

and the equivalent quarterwave line characteristic impedance is then:

$$\frac{Zo(\cos(\theta) - \sec(\theta))}{2\tan(\alpha)}. \quad (38)$$

For example, when α=22.5°, θ=140.36°, and the equivalent characteristic impedance is 1.568 Zo. Thus, the line length may be increased substantially over quarterwave (90°) with a small increase in impedance, which in any case is usually desired.

Figure 32:
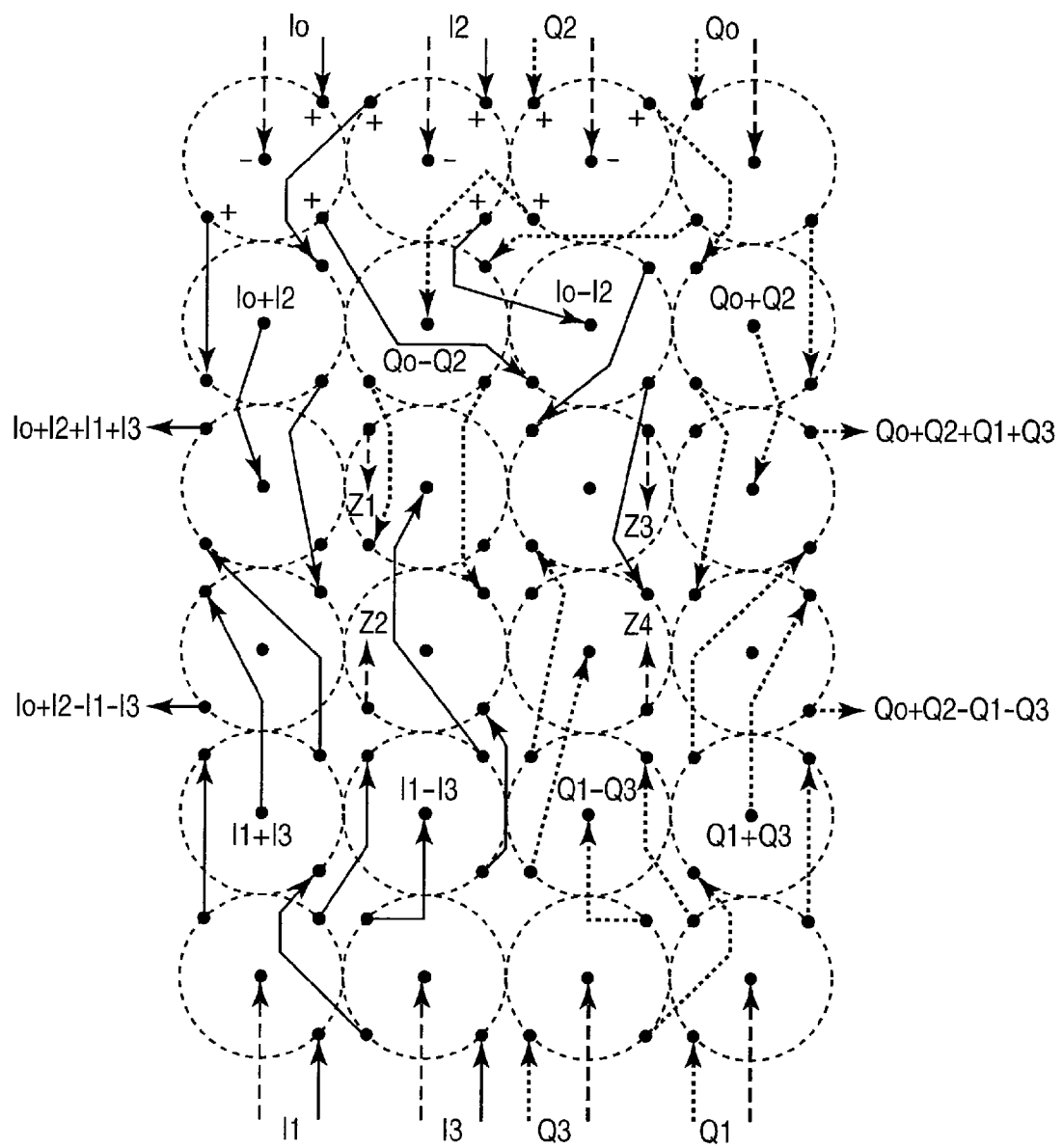
FIG. 32 shows an exemplary 4+4 Butler matrix circuit according to the present invention.

In fact, the other practical realization issue is how to obtain very high coupling line impedances when required, without using impractically thin lines. For α=5.625°, for example, Zo=5.174Zo and θ=168.856°), showing that the issues of high impedance and line length increase may be solved at the same time by using coupling structures such as FIG. 31. FIG. 32 shows a configuration of eight, three-pole filters coupled so as to perform simultaneously two, 4+4 Butler matrix functions. In FIG. 32, the number of taps on each resonator has been extended to four: one, central, phase-inverting tap (–) and three peripheral, non-phase-inverting taps (+). The three + taps are made at 90° points different than that of the – tap. The taps are used in the layout to achieve the following desirable objectives:

Similar distances between points to be interconnected with coupling lines. A regular orientation of the resonator tap positions is shown in FIG. 32 for ease of identification, but slight rotations may minimize the longest line lengths or otherwise achieve greater line length equality.

No tap used for more than one connection. This allows the internal tap line length L to be exactly absorbed into the interconnecting line length.

Single plane coupling line layout

Both + and − taps available for input (or output) to allow connection to a push-pull source or balanced load.

Figure 33:
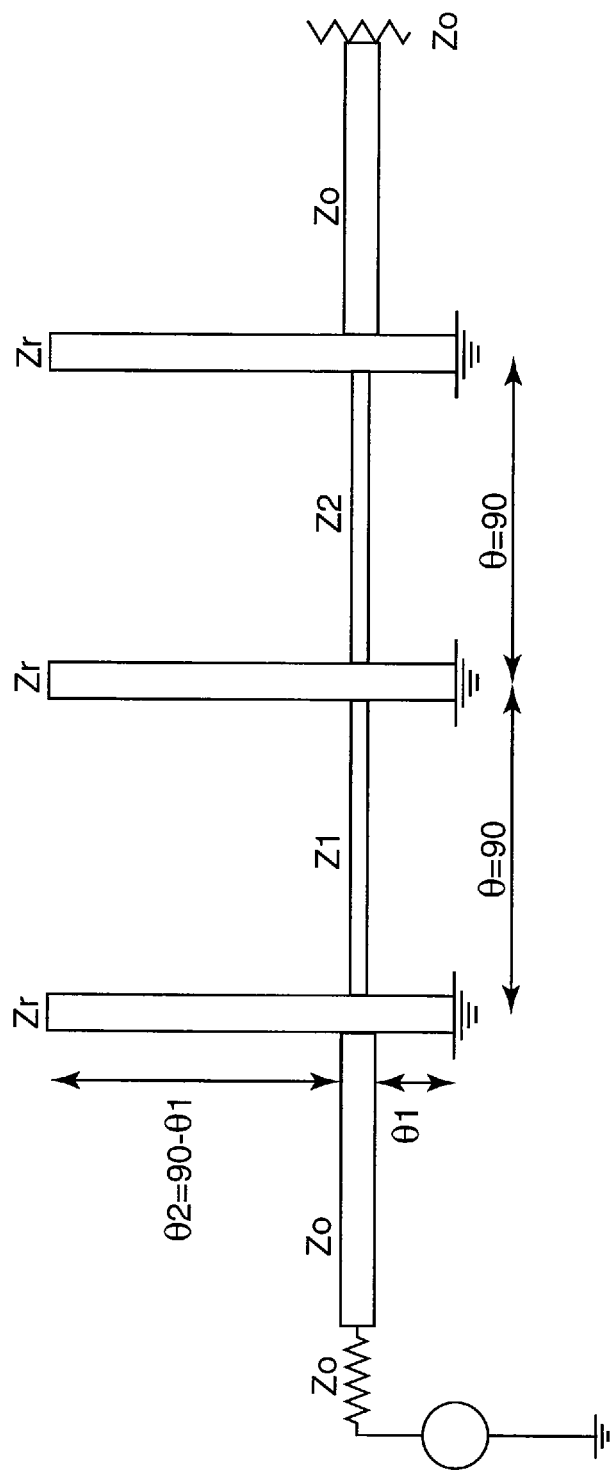
FIG. 33 shows an alternate representation of the circuit for FIG. 32.

For the purpose of computing the frequency response of the bandpass Butler matrix of FIG. 31, the equivalent circuit shown in FIG. 33 provides a good approximation when the bandwidth is not too wide, and so the departure from a quarter wavelength of the coupling lines is small. For wider bandwidths, it may be desirable to adjust the resonator impedance Zr slightly by a function of the impedances Z1 of all the transmission lines connecting to it, in order to compensate for the departure from a quarter wavelength of the coupling lines at band edges. For maximum bandwidth, the resonators should be of maximum impedance consistent with the above adjustment, and θ1 should be as small as possible consistent with being able to absorb the tap length L into the coupling line length.

Simulation shows that, when θ2 is small in order to obtain narrow bandwidths, a spurious response appears in the vicinity of 2Fo. An alternative way to obtain small bandwidths is to reduce the impedance Zr of the resonator, while keeping θ2 and θ1 about equal. However, this increases the line length of the tap connection, which is subtracted from the coupling line lengths, potentially hindering layout. However, a common method to lower the impedance of coaxial resonators while reducing their size is to load the cavity with high dielectric constant ceramic material, which therefore solves both problems—obtaining a low resonator impedance and reducing the tap line length L.

Figure 34:
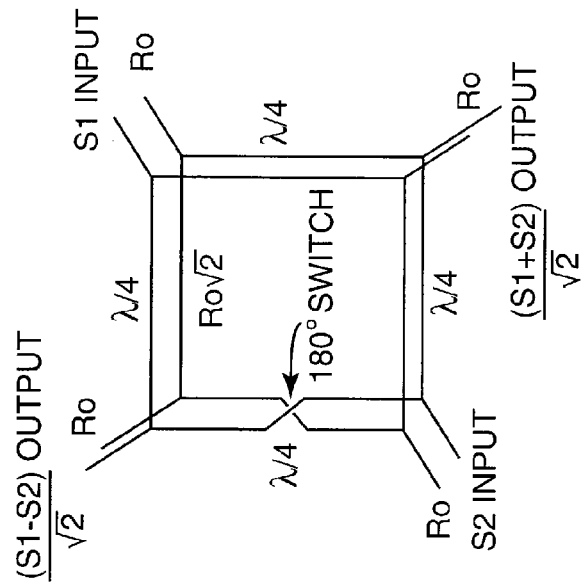
FIG. 34 shows an exemplary conversion circuit.
Figure 34:
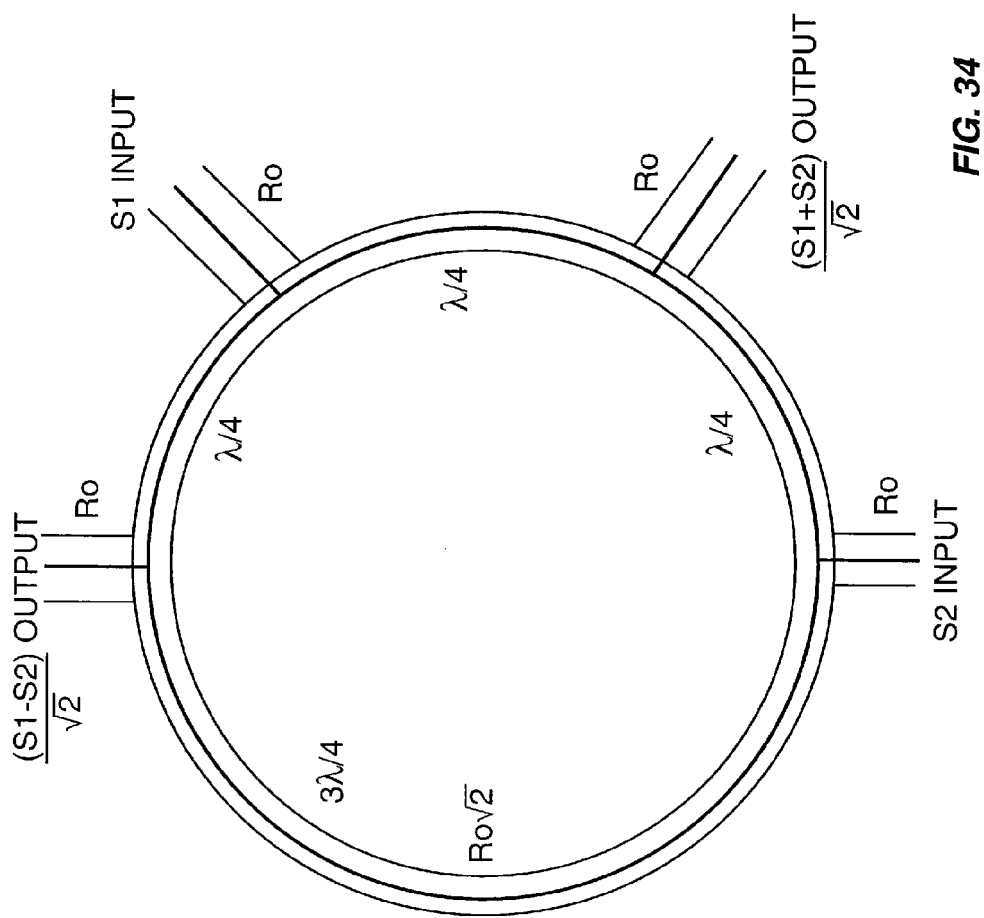

For wider bandwidths, it may be desirable to adjust the resonator impedance Zr slightly by a function of the impedances Z1 of all the transmission lines connecting to it, in order to compensate for the departure from a quarter wavelength of the coupling lines at band edges. For maximum bandwidth, the resonators should be of maximum impedance consistent with the above adjustment, and θ1 should be as small as possible consistent with being able to absorb the tap length L into the coupling line length. In this case, loading the resonator cavity with a ferrite material having a relative permeability greater than 1 reduces the size while increasing the impedance. Since the function of the resonator in circuits with maximum bandwidth is merely to provide phase inverted outputs or inputs, the latter may be achieved by replacing the resonator with a phase-inverting transformer. In a version using balanced coupling lines, as would be used with the resonator of FIG. 35, the resonator does not even need to be replaced with a transformer; a phase inversion may be obtained instead by twisting the balanced line to reverse the phase. As an example of this, FIG. 34 illustrates conversion of an unbalanced, coaxial 180° hybrid, sometimes known as a "rat-race" to balanced form in which the 180° phase reversal in one leg is provided by twisting the balanced line in that leg as opposed to the use of an extra half wavelength of transmission line in the coaxial case, thus forming a "moebius loop" hybrid, which exhibits considerable bandwidth. This principle may be extended to create wideband Butler matrices using only wires as balanced transmission lines.

Figure 35:
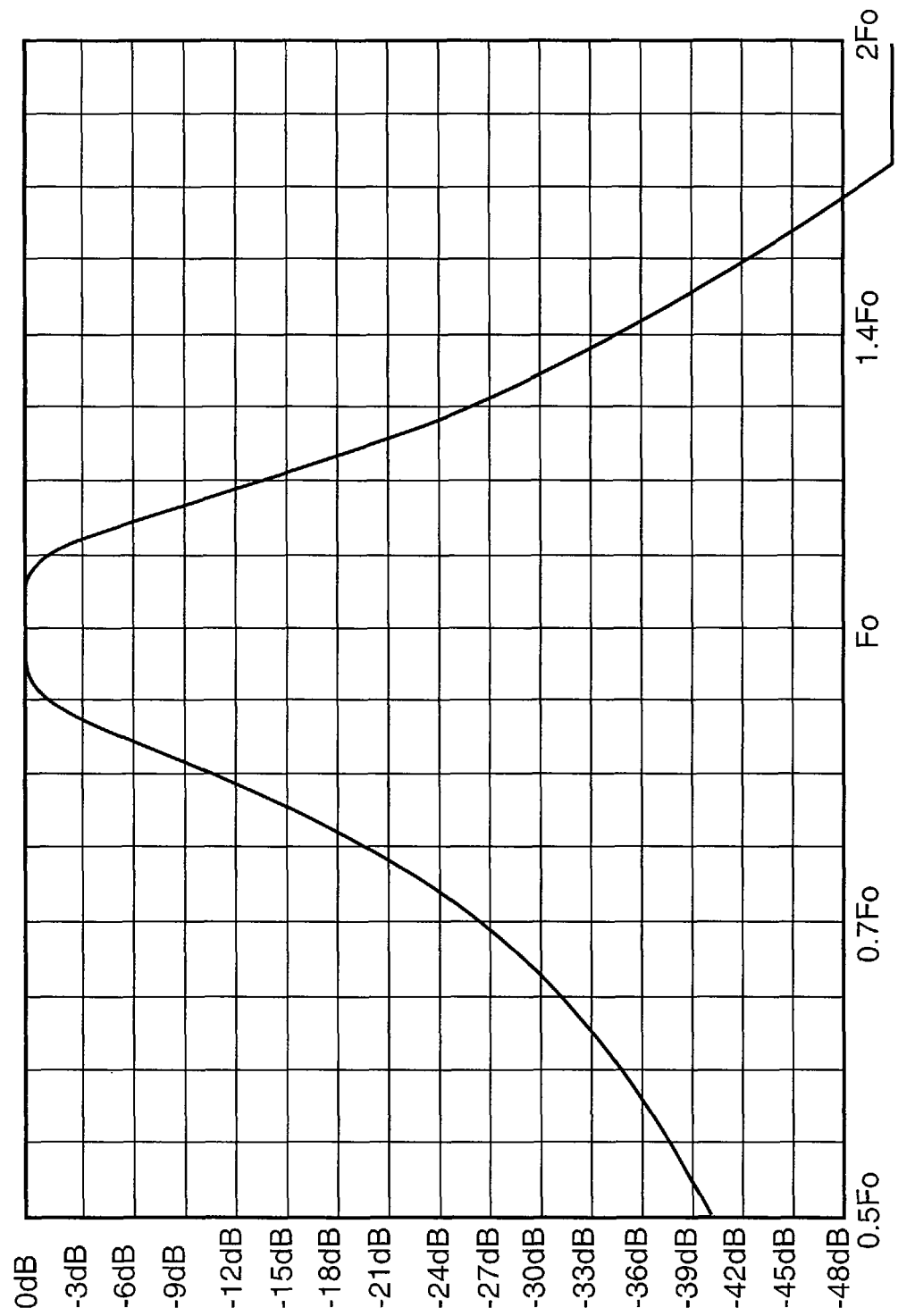
FIG. 35 shows an exemplary frequency response for the circuit of FIG. 33.
Figure 36:
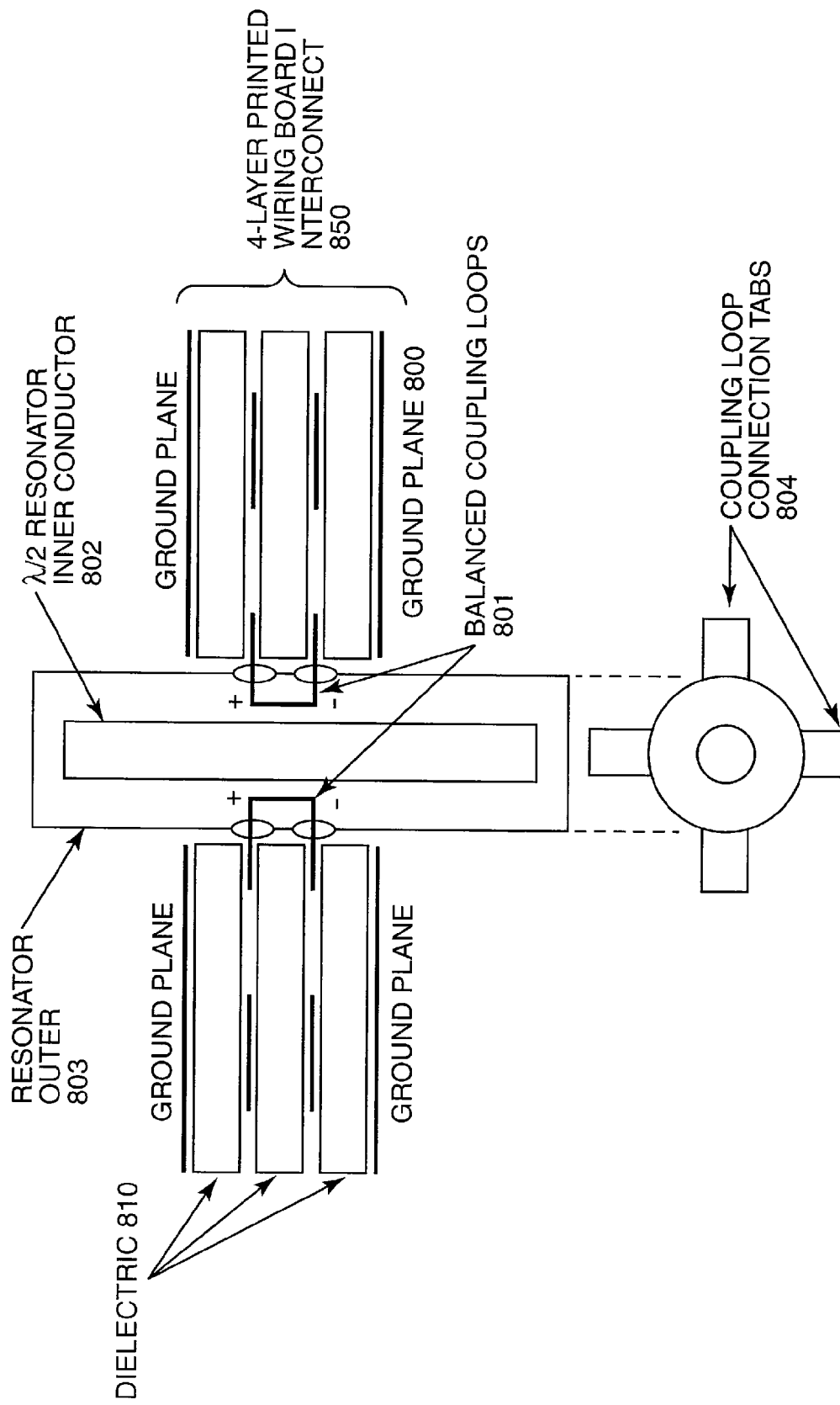
FIG. 36 shows an exemplary half-wave resonator.

For a $3^{rd}$-order flat response, Z1 should be equal to $Z0\sqrt{2}$, as shown in FIG. 35. Other means of tapping in and out of resonators are possible, and may allow non-ceramically-loaded resonators to be used. FIG. 36 shows a half-wave resonator having an outer conductor tube (803), a half wave inner conductor (802), and balanced coupling loops are placed near the current antinode at the center. The coupling loops (801) may be made with flat strip rather than round wire and emerge as flat tabs (804) suitable for sandwiching between a multilayer interconnecting pattern (850). The multilayer board (850) has a ground plane (800) top and bottom, and two interconnect layers sandwiched between dielectric material (810). The resonators are inserted half way through the interconnect board (85) through suitable holes. Each loop 801 has a positive and negative tab, and loops may be brought out at any angle—for example at four 90° positions, thus providing ample flexibility to facilitate layout. When a negative tab has to be connected to the upper interconnect layer, or vice versa, this may be achieved with the aid of plated-though holes in the central dielectric layer.

Thus, both discrete component (L-C) realizations as well as two types of coaxial resonators have been illustrated, which allow construction over a wide range of frequencies. Many other types of resonators are known in the art of bandpass filters, and using the teachings herein, may be adapted by a person skilled in the art to construct a set of mutually coupled bandpass filters to form a bandpass signal coupling matrix such as the Butler or Fourier coupling matrices exemplified herein. For example, surface acoustic wave resonators are often used to form filters, using acoustic coupling, and the acoustic coupling coefficients may conceivably be modified to form a set of mutually coupled, surface acoustic wave bandpass filters. All such structures are considered to fall within the scope and spirit of this invention as defined by the attached claims.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A coupling circuit for coupling a transceiver to an antenna, said coupling circuit comprising:
   a coupling network comprising:
      a plurality of inputs providing quadriphase versions of at least one input signal including phase-inverted and non-phase-inverted In-phase signals and phase-inverted and non-phase-inverted Quadrature signals; and
      a plurality of outputs, each output coupled to at least one of a selected one of the phase-inverted and non-phase-inverted In-phase signals of each input and a selected one of the phase-inverted and non-phase-inverted Quadrature signals of each input such that:
         1) a desired phase shift is produced between each input and each output;
         2) the frequency response for a signal from any input to any output is substantially identical except for the desired phase shift;
         3) an amount of coupling between a given In-phase signal and a given output is proportional to the cosine of the corresponding desired phase shift; and
         4) an amount of coupling between a given Quadrature signal and a given output is proportional to the sine of the corresponding desired phase shift;
   wherein the coupling circuit comprises a plurality of stages connected in cascade, wherein each stage comprises one or more of the coupling networks.

2. The coupling circuit of claim 1 wherein the desired phase shifts are selected such that the coupling circuit performs a Discrete Fourier Transform.

3. The coupling circuit of claim 1 wherein the desired phase shifts are selected such that the coupling circuit implements a Butler matrix.

4. The coupling circuit of claim 1 wherein couplings between different inputs and the same output are orthogonal.

5. The coupling circuit of claim 1 wherein couplings between the plurality of inputs and outputs comprise capacitive couplings.

6. The coupling circuit of claim 1 wherein couplings between the plurality of inputs and outputs comprise quarter-wave line couplings.

7. The coupling circuit of claim 1 wherein couplings between the plurality of inputs and outputs comprise acoustic wave couplings.

8. The coupling circuit of claim 1 further comprising a resonator circuit connected to multiple ones of the inputs and outputs to resonate the inputs and outputs at a desired center frequency.

9. The coupling circuit of claim 8 wherein the resonator circuits are configured such that said frequency response comprises a bandpass frequency response with a desired bandwidth around the desired center frequency.

10. The coupling circuit of claim 8 wherein the resonator circuits comprise at least one of a shunt inductor, a series inductor, an inductor-capacitor combination, a coaxial resonator, and a surface acoustic wave resonator.

11. The coupling circuit of claim 1 wherein the coupling networks and the cascade connections of the stages are configured to perform a Fast Fourier Transform decomposition.

12. The coupling circuit of claim 1 wherein the each of the plurality of inputs comprises the quadriphase versions of the input signal.

13. A method for configuring a coupling circuit that couples a transceiver to an antenna, said method comprising:
providing a plurality of inputs to a coupling network, said plurality of inputs providing quadriphase versions of an input signal including phase-inverted and non-phase-inverted In-phase signals and phase-inverted and non-phase-inverted Quadrature signals;
providing a plurality of outputs from the coupling network; and
coupling each output to a selected one of a selected one of the phase-inverted and non-phase-inverted In-phase signals of each input and a selected one of the phase-inverted and non-phase-inverted Quadrature signals of each input such that:
1) a desired phase shift is produced between the inputs and the outputs;
2) the frequency response for a signal from any input to any output is substantially identical except for the desired phase shift;
3) an amount of coupling between a given In-phase signal and a given output is proportional to the cosine of the corresponding desired phase shift; and
4) an amount of coupling between a given Quadrature signal and a given output is proportional to the sine of the corresponding desired phase shift; and
connecting a plurality of stages in cascade to generate the coupling circuit, wherein each stage comprises one or more of the coupling networks.

14. The method of claim 13 further comprising selecting said desired phase shifts such that the coupling circuit performs a Discrete Fourier Transform.

15. The method of claim 13 further comprising selecting said desired phase shifts such that the coupling circuit implements a Butler matrix.

16. The method of claim 13 wherein couplings between different inputs and the same output are orthogonal.

17. The method of claim 13 wherein couplings between the plurality of inputs and outputs comprise capacitive couplings.

18. The method of claim 13 wherein couplings between the plurality of inputs and outputs comprise a quarter-wave line couplings.

19. The method of claim 13 wherein couplings between the plurality of inputs and outputs comprise acoustic wave couplings.

20. The method of claim 13 further comprising connecting a resonator circuit to multiple ones of the inputs and outputs to resonate the inputs and the outputs at a desired center frequency.

21. The method of claim 20 further comprising configuring the resonator circuits such that said frequency response comprises a bandpass frequency response having a desired bandwidth around the desired center frequency.

22. The method of claim 20 wherein connecting the resonator circuit to multiple ones of the inputs and outputs comprises connecting at least one of a shunt inductor, a series inductor, an inductor-capacitor combination, a coaxial resonator, and a surface acoustic wave resonator to multiple ones of the inputs and to the outputs.

23. The method of claim 13 further comprising configuring the coupling networks and the cascade connections of the stages to perform a Fast Fourier Transform decomposition.

24. The method of claim 13 wherein each of the plurality of inputs comprises the quadriphase versions of the input signal.

* * * * *

UNITED STATES PATENT AND TRADEMARK OFFICE
CERTIFICATE OF CORRECTION

PATENT NO.        : 8,497,743 B2
APPLICATION NO.   : 11/963884
DATED             : July 30, 2013
INVENTOR(S)       : Dent Page 1 of 3

It is certified that error appears in the above-identified patent and that said Letters Patent is hereby corrected as shown below:

In the Drawings

In Fig. 4, Sheet 4 of 36, in Box "370", in Line 1, delete "DFT/AFT" and insert -- DFT/FFT --, therefor.

In Fig. 8, Sheet 8 of 36, delete " Sr4 Sr6 " and insert -- Sr4 Sr5 Sr6 --, therefor.

In Fig. 28, Sheet 28 of 36, delete "TUNING CAPACITANCE 652" and insert -- TUNING CAPACITANCE --, therefor.

In Fig. 36, Sheet 36 of 36, delete " WIRING BOARD INTERCONNECT 850 " and insert -- WIRING BOARD INTERCONNECT 850 --, therefor.

In the Specification

In Column 17, Lines 23-24, Equation (14),
delete "ik=(N2·i1+io)(N1·k1+ko)=N1·N2·i1·k1·io+N2·i1·ko+io·ko." and
insert -- ik=(N2·i1+io)(N1·k1+ko)=N1·N2·i1·k1+N1·k1·io+N2·i1·ko+io·ko. --, therefor.

In Column 19, Line 55, delete "n-section" and insert -- π-section --, therefor.

In Column 21, Line 38, delete "Se$^{i\Phi}$" and insert -- Se$^{j\Phi}$ --, therefor.

In Column 21, Line 39, delete "e$^{i0}$," and insert -- e$^{j0}$, --, therefor.

Signed and Sealed this
Nineteenth Day of November, 2013

Teresa Stanek Rea
*Deputy Director of the United States Patent and Trademark Office*

CERTIFICATE OF CORRECTION (continued)
U.S. Pat. No. 8,497,743 B2

In Column 21, Line 41, delete "$e^{i(\Phi+\theta)}$" and insert -- $e^{j(\Phi+\theta)}$ --, therefor.

In Column 23, Line 56, delete "O-factor" and insert -- Q-factor --, therefor.

In Column 24, Line 16, delete "FIG. 21A to 21B" and insert -- FIGS. 21A to 21B --, therefor.

In Column 24, Line 19, delete "T-network" and insert -- π-network --, therefor.

In Column 25, Line 39, delete "Co·cos(2ijπ/N1+θ$_j$)," and insert -- Co·cos(2ijπ/N1+θ$_j$). --, therefor.

In Column 26, Line 7, delete "Ni" and insert -- N1 --, therefor.

In Column 27, Line 46, delete "BALUNS" and insert -- BALUNs --, therefor.

In Column 27, Lines 48-49, delete "coupler 352 in order to generate circular polarization." and insert -- coupler in order to generate circular polarization 352. --, therefor.

In Column 27, Line 67, delete "BALUNS" and insert -- BALUNs --, therefor.

In Column 28, Line 3, delete "90O0" and insert -- 90° --, therefor.

In Column 28, Line 9, delete "BALUNs 352," and insert -- BALUNs 351, --, therefor.

In Column 28, Line 17, delete "power amplifiers 356" and insert -- power amplifier devices 356 --, therefor.

In Column 28, Line 21, delete "power amplifiers 460" and insert -- power amplifier chains 460 --, therefor.

In Column 28, Line 30, delete "bandpass filter 355" and insert -- bandpass filter 353 --, therefor.

In Column 28, Line 35, delete "quadrature coupler 352" and insert -- quadrature coupler 354 --, therefor.

In Column 29, Line 60, delete "power amplifiers 465" and insert -- power amplifier chains 465 --, therefor.

In Column 30, Line 6, delete "power amplifiers 465" and insert -- power amplifier chains 465 --, therefor.

In Column 30, Line 13, delete "power amplifiers 465" and insert -- power amplifier chains 465 --, therefor.

In Column 30, Line 47, after "screw", delete "(652)".

CERTIFICATE OF CORRECTION (continued)
U.S. Pat. No. 8,497,743 B2

In Column 31, Lines 50-51, delete "661-A, 661-B, 662-A, and 662-B." and insert -- 662-A. --, therefor.

In Column 31, Line 53, after "Coupling Line", delete "661-A and".

In Column 31, Line 57, after "lines", delete "661-B and 662-B.".

In Column 31, Lines 60-61,
delete "661-A and 662-A and lines 661-B and 662-B" and insert -- 662-A --, therefor.

In Column 33, Line 4, delete "layout" and insert -- layout. --, therefor.

In Column 33, Line 61, delete "Z0√2," and insert -- Zo√2, --, therefor.